US012183150B2

(12) United States Patent
Shigeta

(10) Patent No.: US 12,183,150 B2
(45) Date of Patent: *Dec. 31, 2024

(54) GAME TABLE READING SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 249 days.

This patent is subject to a terminal disclaimer.

(21) Appl. No.: 17/310,244

(22) PCT Filed: Sep. 19, 2019

(86) PCT No.: PCT/JP2019/036789
§ 371 (c)(1),
(2) Date: Jul. 27, 2021

(87) PCT Pub. No.: WO2020/158039
PCT Pub. Date: Aug. 6, 2020

(65) Prior Publication Data
US 2022/0139148 A1    May 5, 2022

(30) Foreign Application Priority Data

Jan. 31, 2019   (JP) .................................. 2019-028885
Feb. 21, 2019   (JP) .................................. 2019-045249
(Continued)

(51) Int. Cl.
G06K 7/08      (2006.01)
G06K 7/10      (2006.01)
(Continued)

(52) U.S. Cl.
CPC ....... *G07F 17/322* (2013.01); *G06K 7/10366* (2013.01); *G06K 19/0723* (2013.01);
(Continued)

(58) Field of Classification Search
CPC ............... G07F 17/322; G07F 17/3241; G07F 17/3248; G07F 17/326; G06K 7/10366;
(Continued)

(56) References Cited

U.S. PATENT DOCUMENTS 5,651,548 A     7/1997   French et al.
8,528,909 B2 *  9/2013   Gelinotte .................. A63F 1/06
                                                       463/25
(Continued)

FOREIGN PATENT DOCUMENTS

CN      106960233 A      7/2017
JP      2001178958 A     7/2001
(Continued)

OTHER PUBLICATIONS

International Search Report dated Dec. 3, 2019 issued in PCT Application PCT/JP2019/036789.
(Continued)

*Primary Examiner* — Daniel St Cyr
(74) *Attorney, Agent, or Firm* — NORTON ROSE FULBRIGHT US LLP

(57) ABSTRACT

A game table reading system comprises: a game table having a plurality of read areas including a plurality of betting areas; a plurality of read antennas installed corresponding to each of the plurality of read areas for reading RFID tags embedded in game tokens; a read-restricted antenna that restricts reading by the read antennas so that the read antennas do not read the RFID tags of the game tokens other than the read area corresponding to the read antennas; a read control device that acquires the information stored in the RFID tag; a read restriction control device that controls the read restriction antenna; a database that stores information on RFID tags; and a management control device that updates the database based on the relationship between the informa- (Continued)

tion on the RFID tag read by the read antenna and the read area where the RFID tag was read.

18 Claims, 61 Drawing Sheets

(30) Foreign Application Priority Data

May 20, 2019 (JP) ................................. 2019-106546
Aug. 2, 2019 (WO) .................. PCT/JP2019/030491

(51) Int. Cl.
   *G06K 19/07* (2006.01)
   *G07F 17/32* (2006.01)
(52) U.S. Cl.
   CPC ...... *G07F 17/3237* (2013.01); *G07F 17/3248* (2013.01); *G07F 17/3251* (2013.01)
(58) Field of Classification Search
   CPC ....... G06K 19/07773; G06K 19/07749; G06Q 50/34
   USPC .................................................. 235/451, 383
   See application file for complete search history.

(56) References Cited

U.S. PATENT DOCUMENTS

| 9,165,420 | B1 | 10/2015 | Knust et al. |
| 9,520,025 | B2 | 12/2016 | Koyama et al. |
| 9,919,201 | B2* | 3/2018 | Walker ................. G07F 17/322 |
| 11,288,923 | B1 | 3/2022 | Shigeta |
| 11,348,403 | B2* | 5/2022 | Takine ................. G07F 17/322 |
| 2008/0067745 | A1* | 3/2008 | Wikstrom ................. A63F 1/00 273/292 |
| 2008/0113772 | A1* | 5/2008 | Burrill ................ G07F 17/3237 463/43 |
| 2008/0113783 | A1 | 5/2008 | Czyzewski et al. |
| 2009/0117967 | A1 | 5/2009 | Koyama |
| 2009/0131151 | A1 | 5/2009 | Harris et al. |
| 2010/0093429 | A1 | 4/2010 | Mattice et al. |
| 2010/0105486 | A1 | 4/2010 | Shigeta |
| 2010/0210355 | A1 | 8/2010 | Koyama et al. |
| 2011/0204565 | A1 | 8/2011 | Gelinotte et al. |
| 2014/0370960 | A1 | 12/2014 | Mosley et al. |
| 2016/0016071 | A1 | 1/2016 | Walker |
| 2018/0075690 | A1 | 3/2018 | Moore et al. |
| 2018/0114406 | A1 | 4/2018 | Shigeta |
| 2018/0122187 | A1 | 5/2018 | Moore et al. |
| 2018/0357850 | A1 | 12/2018 | Moore et al. |
| 2019/0073855 | A1 | 3/2019 | Moore et al. |
| 2019/0130700 | A1 | 5/2019 | Oguchi et al. |
| 2019/0005767 | A1 | 6/2019 | Shigeta |
| 2019/0172312 | A1 | 6/2019 | Shigeta |
| 2019/0259238 | A1 | 8/2019 | Shigeta |
| 2020/0193772 | A1 | 6/2020 | Shigeta |

FOREIGN PATENT DOCUMENTS

| JP | 2008188137 A | 8/2008 |
| JP | 2009018021 A | 1/2009 |
| JP | 2010187807 A | 9/2010 |
| JP | 5249555 B2 | 7/2013 |
| JP | 5294915 B2 | 9/2013 |
| JP | 2014085778 A | 5/2014 |
| JP | 2014184034 A | 10/2014 |
| JP | 6006383 B2 | 10/2016 |
| JP | 2017018501 A | 1/2017 |
| JP | 2017211971 A | 11/2017 |
| JP | 7244457 B2 | 3/2023 |
| KR | 1020100085534 A | 7/2010 |
| WO | 2008120749 A1 | 10/2008 |
| WO | 2018025885 A1 | 2/2018 |
| WO | 2018066111 A1 | 4/2018 |
| WO | 2019021820 A1 | 1/2019 |

OTHER PUBLICATIONS

International Search Report dated Feb. 10, 2020 issued in PCT Application PCT/JP2019/047318.
US Office Action dated Oct. 23, 2023 issued in U.S. Appl. No. 17/425,491.
Japanese Office Action dated Dec. 5, 2023 issued in JP Application 2020-027646.
Korean Office Action dated Apr. 12, 2024 issued in KR application No. 10-2021-7026281.
Japanese Office Action dated Jan. 23, 2024 issued in JP application No. 2020-007499.
"UHF RFID Extended Memory Tag Application" by Takehiro Ito, published in Mitsubishi Denki Technical Report, vol. 84, No. 8, pp. 47-50, on Aug. 25, 2010 (Submitting with English translation of Abstract).
Japanese Office Action dated Jan. 30, 2024 issued in JP application No. 2023-036389.
Chinese Office Action dated Sep. 11, 2024 issued in CN application No. 202210062134.0.
US Office Action dated Oct. 8, 2024 issued in U.S. Appl. No. 17/425,491.

* cited by examiner

17

| ID NUMBER | CASINO NAME | TYPE | FACE VALUE | LOCATION INFORMATION HISTORY |
|---|---|---|---|---|
| ⋮ | ⋮ | ⋮ | ⋮ | ⋮ |
| apxx7216-3319 | ABC Casino | ROLLING CHIP FOR VIP | $500 | ○→○→⋯→○→○ |
| apxx7216-3320 | ABC Casino | ROLLING CHIP FOR VIP | $1,000 | ○→○→⋯→○→○ |
| apxx7216-3321 | ABC Casino | ROLLING CHIP FOR VIP | $1,000 | ○→○→⋯→○→○ |
| ⋮ | ⋮ | ⋮ | ⋮ | ⋮ |

FIG.8

CHIP READING RESULT AT BETTING AREA

| PLACE AND ID OF BET CHIP | ONE PIECE ON BANKER (ID3) | TWO PIECES ON BANKER (ID12 AND 13) TWO PIECES ON BANKER PAIR (ID6 AND 18) | TWO PIECES ON PLAYER (ID29 AND 54) | ONE PIECE ON BANKER PAIR (ID75) ONE PIECE ON PLAYER PAIR (ID77) | ONE PIECE ON BANKER (ID97) ONE PIECE ON PLAYER PAIR (ID68) |
|---|---|---|---|---|---|
| READING RESULT BY CAMERA | ONE PIECE ON BANKER | TWO PIECE ON BANKER | TWO PIECES ON PLAYER | NONE | ONE PIECE ON BANKER ONE PIECE ON PLAYER PAIR |
| READING RESULT BY RFID (READ ID) | ID3 | ID6, 12, 13, 18 | ID29, 54 | NONE | ID68, 97 |
| SITTING NUMBER | 6 | 5 | 3 | 2 | 1 |

| GAME RESULT DETERMINED BY GAME RESULT DETERMINATION DEVICE | BANKER WINS |
|---|---|
| ID THAT CHIP TRAY DETERMINATION DEVICE DETERMINES BEING INCREASED FROM BEFORE COLLECTION TO AFTER COLLECTION | ID6, 18, 29, 54, 68, 75, 77 |

FIG.12

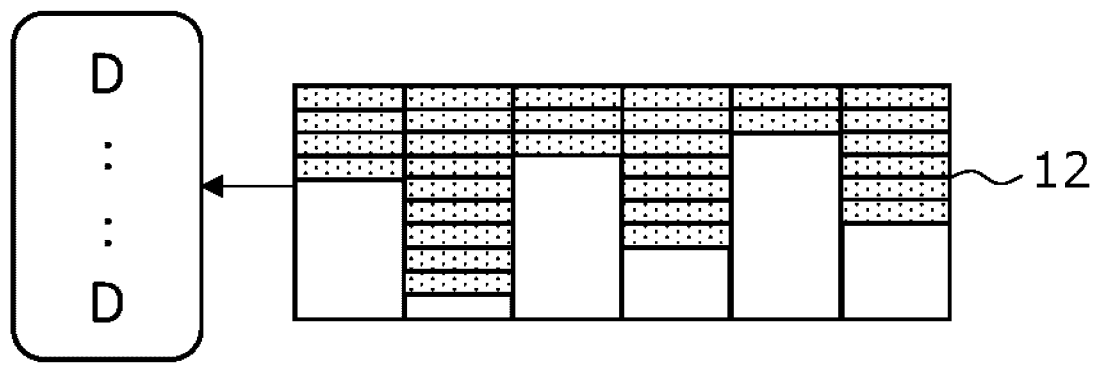
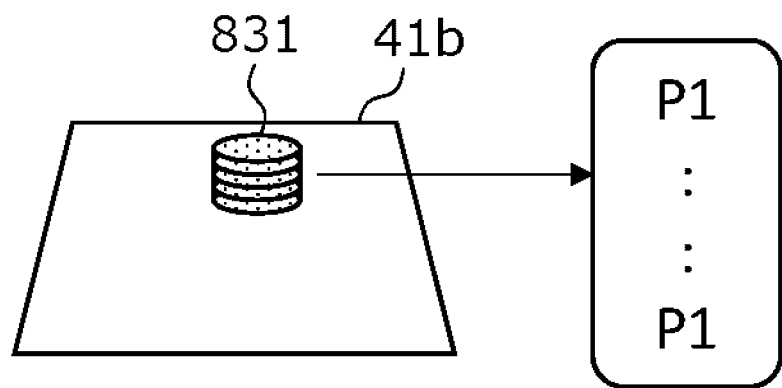
FIG.24

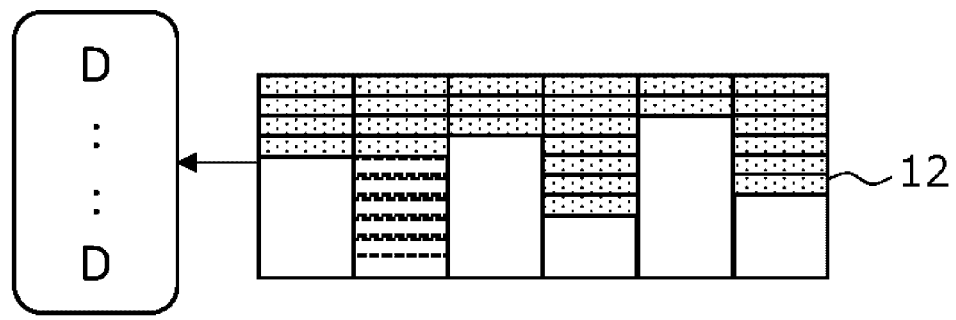
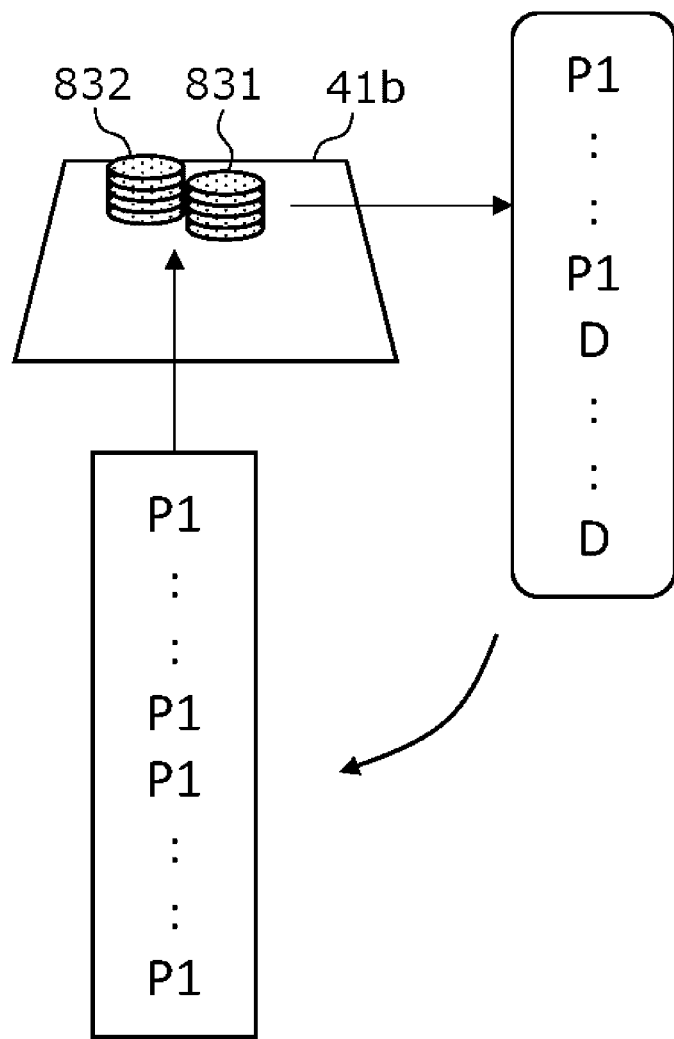
FIG.25

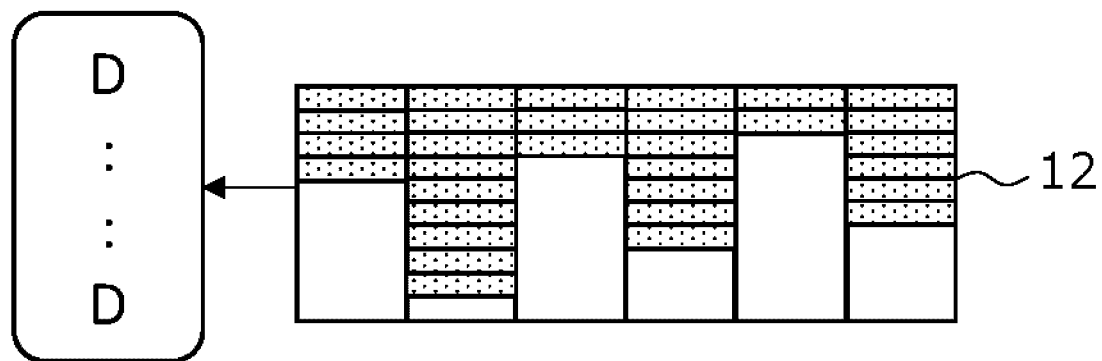
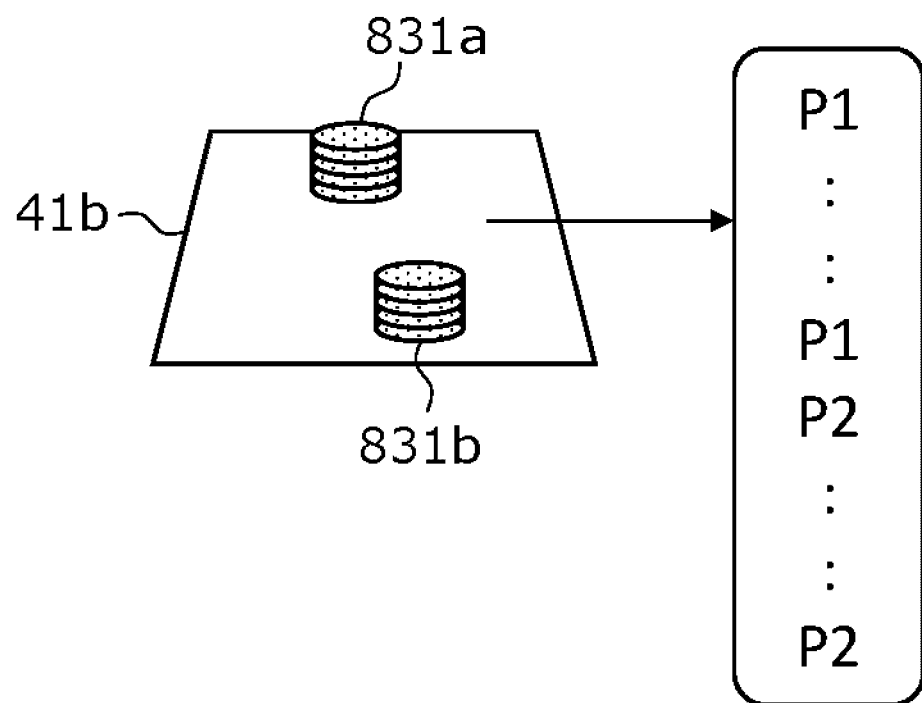
FIG.35

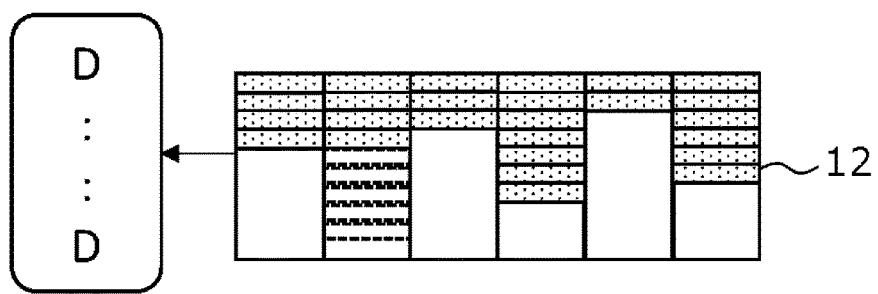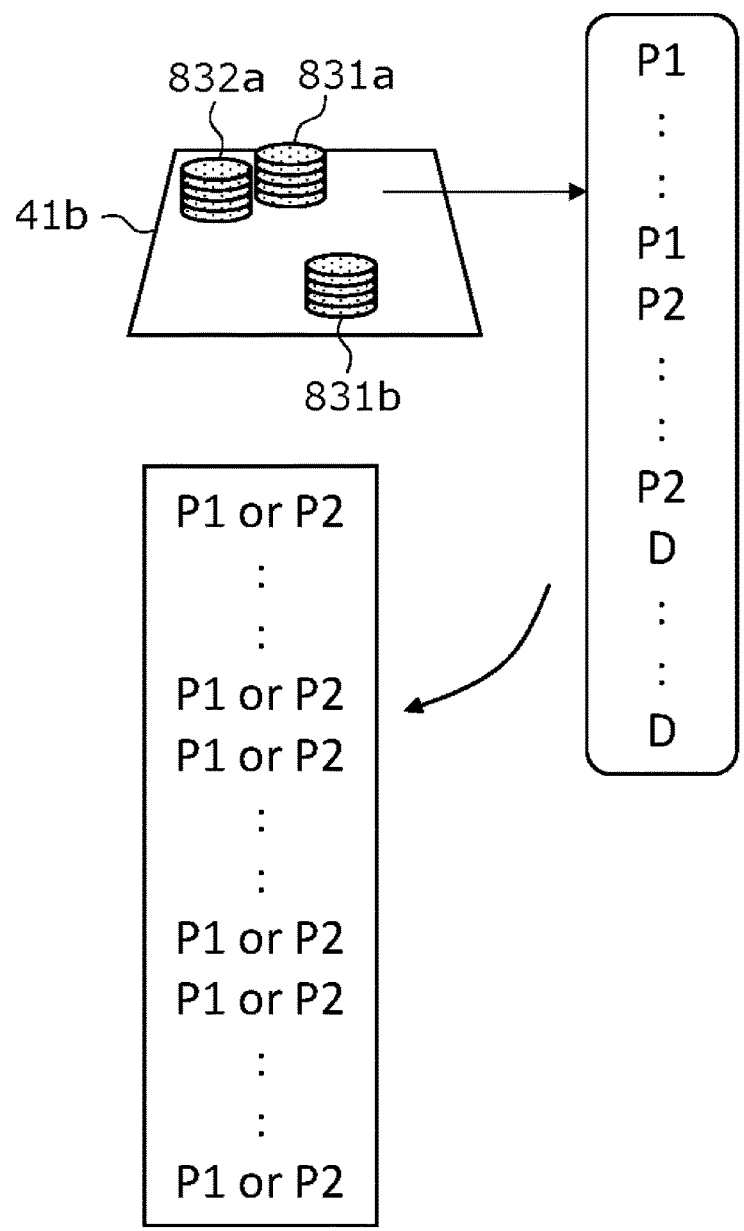
FIG.36

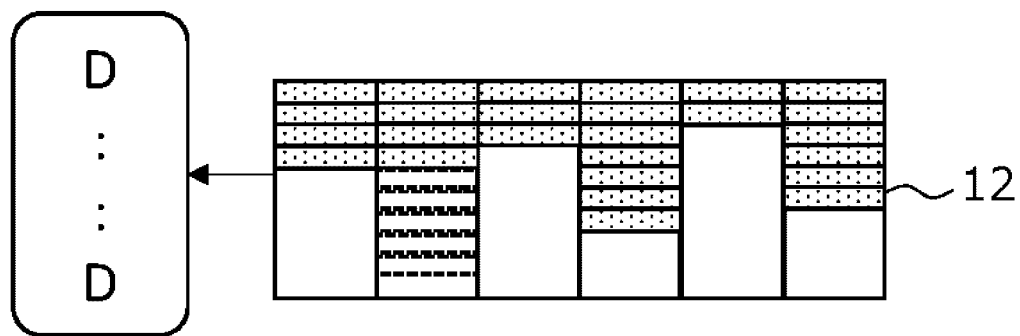
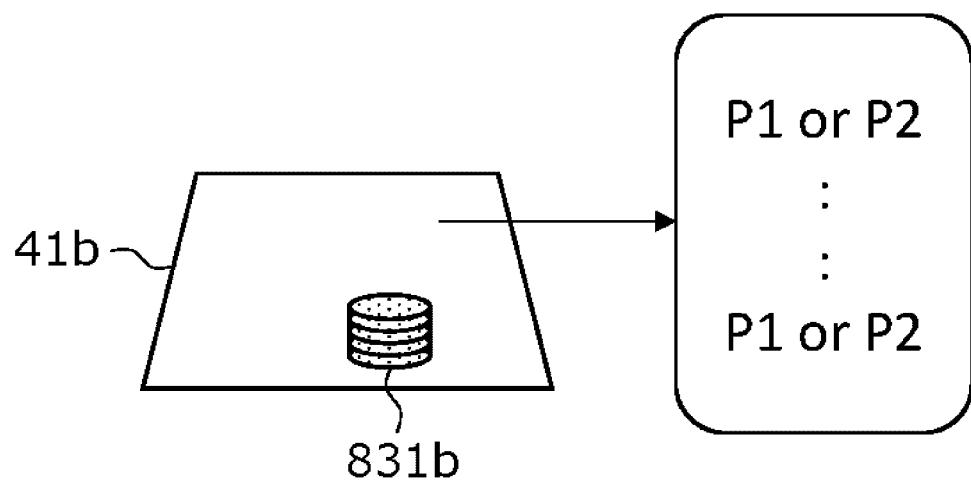
FIG.37

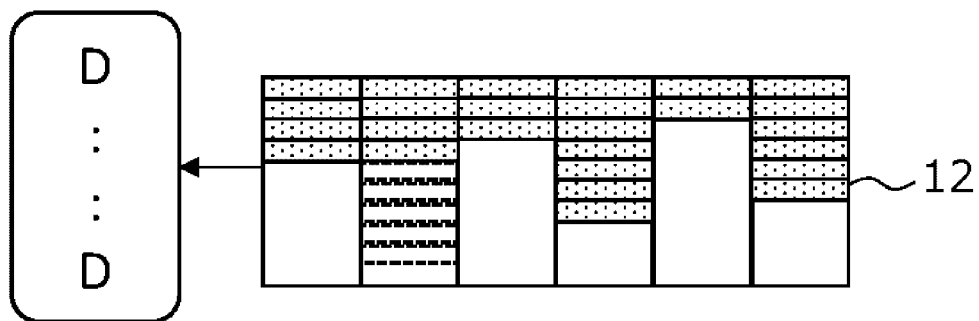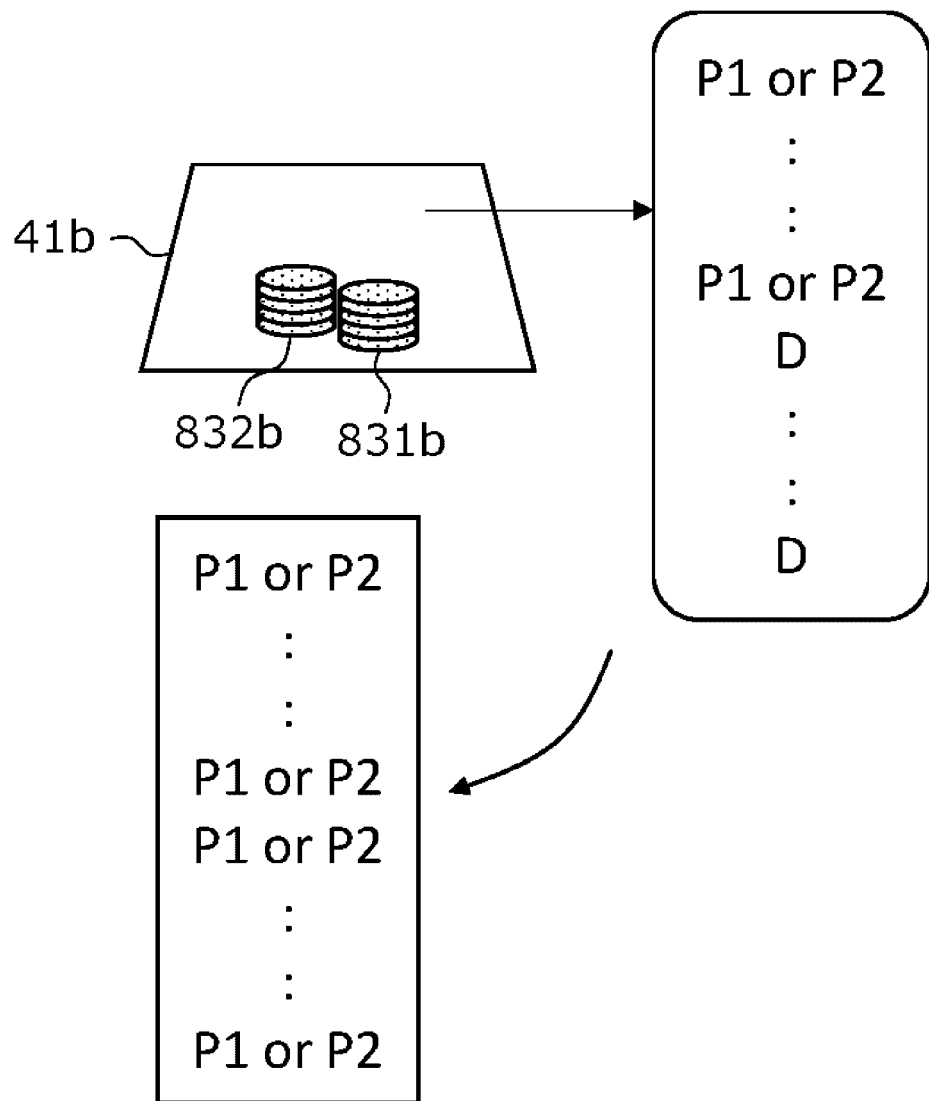
FIG.38

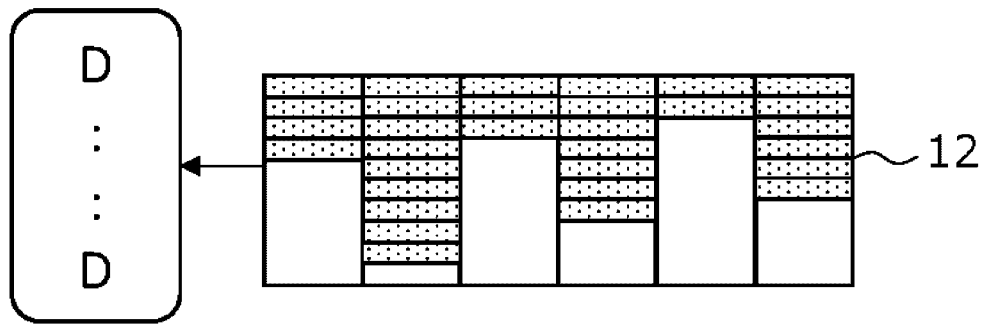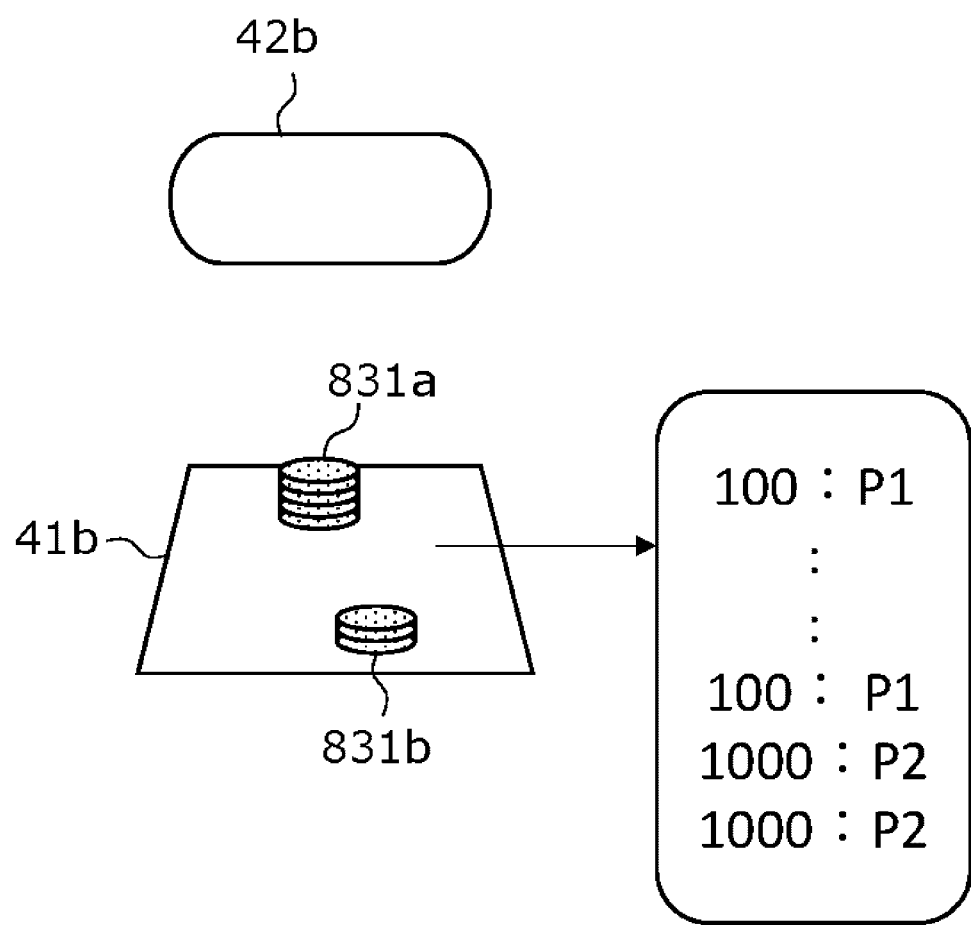
FIG.47

GAME TABLE READING SYSTEM

CROSS-REFERENCE TO RELATED APPLICATIONS

This application is a national phase application under 35 U.S.C. § 371 of International Pat. App. No. PCT/JP2019/036789 filed Sep. 19, 2019, which claims priority to JP Pat. App. No. 2019-028885 filed Jan. 31, 2019, JP Pat. App. No. 2019-045249 filed Feb. 21, 2019, JP Pat. App. No. 2019-106546 filed May 20, 2019, and International Pat. App. No. PCT/JP2019/030491 filed Aug. 2, 2019, the entire contents of each disclosure is specifically incorporated by reference herein without disclaimer.

FIELD

The present disclosure relates to a game table reading system for reading RFID tags in game tables used in table games.

BACKGROUND

In casinos, users place bets using game tokens (gaming chips). Since game tokens are a substitute for money, it is desirable that the casino be able to manage them. In recent years, technology has been developed that allows casinos to know which user (player) has which game tokens, how much game tokens they have, which game tokens they have bet on, how much game tokens they have bet, or which user has which game tokens and where they are.

For these management purposes, an RFID tag is embedded in the game token, which stores the identification information (chip ID) of the game token and the value (amount) of the game token.

The game token is bet by placing it in the area corresponding to the betting target on the game table. The game token (hereinafter referred to as "payout chip") paid out by the dealer for the bet game token (hereinafter referred to as "bet chip") is placed near the bet chips.

In the game table, corresponding to each area, there will be embedded antennas for reading the RIFD tags embedded in the game tokens. A reader is connected to each antenna. The reader reads the information on the RFID tag by controlling each antenna. The read control device determines in which area of the game table the game token is placed, depending on which identification information is read by which antenna.

However, if a plurality of areas on the game table are in close proximity to each other, even if antennas are installed in each of those areas, each antenna may mistakenly read the RFID tags of the game tokens placed in other areas.

Therefore, it is an object of the present disclosure to provide a game table reading system that is advantageous for proper reading and separating even when a plurality of read areas are provided on a game table in close proximity to each other.

SUMMARY OF INVENTION

The game table reading system of one aspect of the present disclosure comprises: a game table having a plurality of read areas, including at least a plurality of betting areas, for positioning game tokens with embedded RFID tags; a plurality of reading antennas installed corresponding to each of the plurality of read areas for reading the RFID tags embedded in the game token placed in the corresponding read areas; a read-restriction antenna configured to restrict the readings by the reading antenna so that the reading antennas do not read the RFID tag of the game token in the read areas other than the read area corresponding to the reading antenna; a reading control device that is connected to the reading antenna and is configured to control the reading antenna to acquire the information stored in the RFID tag from the reading antenna; a read-restriction control device configured to control the read-restriction antenna; a database configured to store information on the RFID tag and related information in association with each other; and a management control device configured to update the database based on a relationship between the information of the RFID tag read by the reading antenna and the read area where the RFID tag was read.

With this configuration, even when a plurality of reading areas are provided in close proximity to each other on the game table, the information on the RFID tags of the game tokens can be read separately in each reading area, and the game tokens can be managed by the database.

In the above game table reading system, the information on the RFID tag may include chip identification information of the game token, the related information may include user identification information of a user in possession of the game token, and the management control device may be configured to update the database so that the chip identification information of the game token paid out to the user who won the game is associated with the user identification information of the user who won the game.

With this configuration, even if the holder of the game token changes depending on the game, the game token possessed by each user can be identified.

In the above game table reading system, the plurality of read areas may include a pay area for reading the game token to be paid out, and the management control device may be configured to update the database so that the chip identification information of the game token read in the pay area is associated with the user identification information.

This configuration ensures that the game token to be paid out is identified.

In the above game table reading system, the plurality of read areas may include a plurality of betting areas corresponding to a plurality of betting targets for each playing position, the game table reading system may further comprise a user identification device configured to identify the user identification information of the user located at the playing position, the management control device may be configured to, when the chip identification information of the game token to be paid out is read in the betting area, update the database so that the chip identification information of the game token to be paid out is associated with the user identification information associated with the game token bet in the bet area.

This configuration allows the database to be updated so that the holder of the game token that has been bet on and the game token that is paid out for the bet are the same.

In the above game table reading system, the plurality of read areas may include a plurality of pay areas, one for each play position, for reading the game token to be paid out, the management control unit may be configured to update the database so as to associate the chip identification information of the game token read at the pay area with the user identification information identified at the play position corresponding to the pay area.

This configuration ensures that the game token to be paid out is identified.

In the above game table reading system, the management control device may be configured to, in the case where the user identification device identifies the user identification information of one of two users simultaneously located in the same play positions and does not identify the user identification information of the other one, and where a plurality of users are betting game tokens in the same betting area, update the database so as to associate the identified user identification information with the chip identification information of the game token that is paid out first to the play position.

With this configuration, in the case of multiple payouts to the same play position, by paying out under the operating rule that the payout is made first to the user whose user identification information is identified, the database can be updated appropriately even when a user whose user identification information can be identified and a user whose user identification information cannot be identified are in the same betting area.

In the above game table reading system, the plurality of betting areas may include a player area, a banker area, and a side betting area, which are provided in close proximity for each other for each play position.

This configuration allows the system to recognize the game token that has been bet for each player position and for each betting target, i.e., for each player, banker, and side bet such as tie, plyer pair, banker pair, etc.

In the above game table reading system, the information on the RFID tag may include chip identification information of the game token, the related information may include location information that can identify a location of the reading antenna, the management control device may be configured to update the database so as to associate the chip identification information of the RFID tag with the location information that can identify the location of the reading antenna by identifying the reading antenna that has read the RFID tag.

In the above game table reading system, the location information may include information identifying the game table, identifying a chip tray, identifying a gate, and/or identifying a cage.

In the above game table reading system, information on value of the game token may be stored in the RFID tag as the information, or information on value of the game token may be stored in the database as the related information associated with the information in the RFID tag, the related information may include user identification information of a user in possession of the game token, the plurality of read areas may include a plurality of betting areas corresponding to a plurality of betting targets for each play position, the management system may further comprise user identification device configured to identify the user identification information of the user located in the play position, the database may be configured to store, for each user, the user identification information of the user and the value of the game token possessed by the user in association with the user identification information, the management control device may be configured to update the database so that value of the game token paid out to the user who wins the game is added to value of the game token in the possession of the user who won the game, and the value of the game token, which is collected from the user who loses the game, is subtracted from the value of the game token in the possession of the user who lost the game.

This configuration allows the database to manage the value of the game token, i.e., the amount possessed, for each user.

In the above game table reading system, information on value of the game token may be stored in the RFID tag as the information of the RFID tag, or the information on value of the game token may be stored in the database as the related information associated with the information of the RFID tag, the related information may include user identification information of a user who bet the game token, the plurality of read areas may include a betting area for each play position, the game table reading system may further comprise a user identification device configured to identify the user identification information of the user located in the play position, the database may be configured to store, for each user, the user identification information of the user and value of the game token bet by the user in association with each other, the management control device may be configured to update the database so as to add the value of the game token read by the reading antenna to the value of the game token bet associated with the user identification information of the user identified for the play position corresponding to the reading antenna.

This configuration allows the database to manage the value of the game token bet, that is, the bet amount, for each user. The bet amount may be managed as a corresponding incentive point.

In the above game table reading system, the information on the RFID tag may include information for determining the authenticity of the game token, the game table reading system may refer to the database to match the information for determining authenticity read by the reading antenna, and may output a warning when the matching is unsuccessful.

With this configuration, a warning can be output when an illegal game token is used on the game table.

A game table reading system of another aspect of the present disclosure comprises: a game table having a plurality of read areas, including at least a plurality of betting areas, for positioning game tokens with built-in RFID tags; a plurality of reading antennas installed corresponding to each of the plurality of read areas and configured to output electromagnetic waves to read the RFID tags embedded in the game token placed in the corresponding read areas; a plurality of reading antennas that are installed to output electromagnetic waves to read RFID tags embedded in the game token placed in the corresponding read area; and a read-restricted antenna configured to output electromagnetic waves to restrict reading by the read antennas so that the reading antennas do not read RFID tags of game token in read areas other than the corresponding read area; a shield member configured to shape the electromagnetic field so that the electromagnetic field generated by the reading antenna is weakened outside the read area corresponding to the reading antenna.

With this configuration, even if a plurality of reading areas are adjacent to each other and densely packed, those reading areas can be read separately.

In the above game table reading system, the shielding member may be a plate, tape, film, coating film, or sheet containing at least one of aluminum, silver, copper, gold, or nickel.

In the above game table reading system, the shielding member may be provided in the same plane as the reading antenna.

In the above game table reading system, the shield member is provided in the same plane as the read-restriction antenna.

In the above game table reading system, the shielding member may shape the electromagnetic field generated by the reading antenna so that the electromagnetic field flattens outside the read area corresponding to the reading antenna.

In the above game table reading system, the game table reading system may have a plurality of the read-restricted antennas corresponding to one read area to shape electromagnetic fields respectively generated by a plurality of the reading antennas each corresponding to a plurality of other read areas adjacent to the one read area.

According to the present disclosure, even when a plurality of reading areas is provided in close proximity to each other on the game table, the information on the RFID tag of the game token can be read separately for each reading area, and the game token can be managed by a database.

BRIEF DESCRIPTION OF THE DRAWINGS

FIG. 8 is a diagram of a database according to the other second embodiment;

FIG. 12 is a diagram of a state of game tokens bet at the game table according to the third embodiment.

FIG. 24 illustrates an example of updating the variation information according to the first example of the fourth embodiment.

FIG. 25 illustrates an example of updating the variation information according to the first example of the fourth embodiment.

FIG. 35 shows an example of updating the variation information according to the sixth example of the fourth embodiment.

FIG. 36 shows an example of updating the variation information according to the sixth example of the fourth embodiment.

FIG. 37 shows an example of updating the variation information according to the sixth example of the fourth embodiment.

FIG. 38 shows an example of updating the variation information according to the sixth example of the fourth embodiment.

FIG. 47 shows an example of updating the variation information according to the ninth example of the fourth embodiment.

DETAILED DESCRIPTION OF NON-LIMITING EXAMPLE EMBODIMENTS

Figure 1:
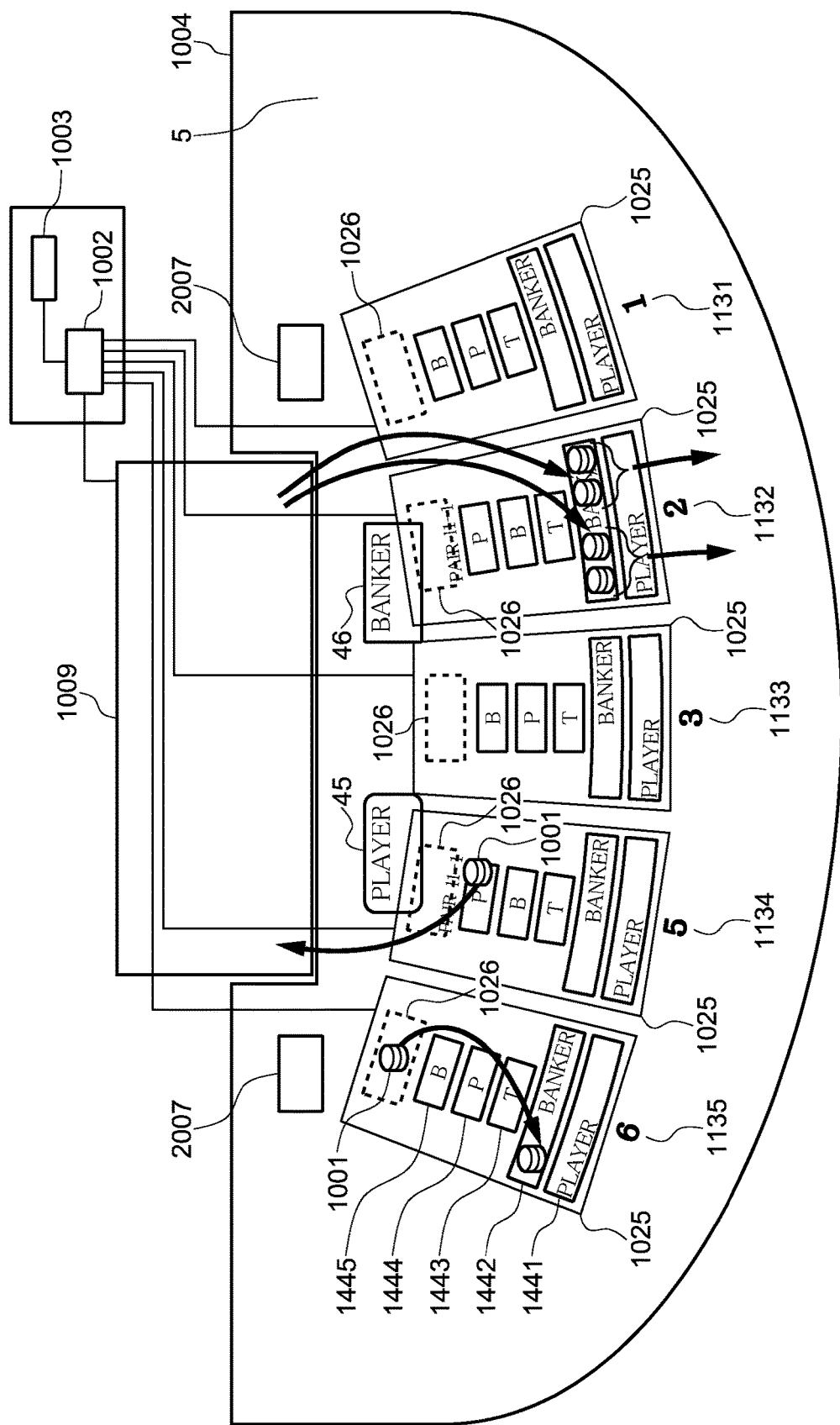
FIG. 1 is a diagram of an overall overview of a table game management system according to an embodiment.

An overall overview of a table game management system according to a first embodiment will be described with reference to FIG. 1. FIG. 1 is a diagram of an overall overview of the table game management system. A game table 1004 for a baccarat game includes betting areas including player 1441, banker 1442, tie 1443, player pair 1444, and banker pair 1445 for each of player positions 1131 to 1135. Each of the player positions is provided with a chip placement area 1025. The table game management system further includes a chip reader 1002 that reads RFID of game tokens 1001 placed on the chip placement areas.

Each of the chip placement areas 1025 includes a payment area 1026 on which a dealer places a game token 1001 removed from a chip tray 1009 of the game table 1004 when the dealer pays the game token 1001 out of the chip tray 1009 to a winning player.

Further, the table game management system includes a controller 1003 that determines a result of reading RFID of the game token 1001 read by the chip reader 1002.

First, a player who participates in a game bets a game token 1001 on a betting area in the chip placement area 1025. By the chip reader 1002 reading RFID of the bet game token 1001, the controller 1003 determines owner information of the game token 1001. The owner information is associated with ID information of the RFID in a database.

In a case where a casino wins based on a result of the game, the dealer collects a game token 1001 bet by a losing player and places the game token 1001 in the chip tray 1009. The chip reader 1002 determines RFIDs of game tokens 1001 in the chip tray 1009, and the controller 1003 records in the database that the game token 1001 collected by the casino is owned by the casino.

If a player wins based on the result of the game, the dealer pays a game token 1001 in an amount corresponding to an amount of a bet chip out of a chip tray to the winning player according to a rule of the game.

At a time of payout, a payout chip may be placed on the above-described payment area 1026 or on a chip placement area 1025 other than the payment area.

Figure 2:
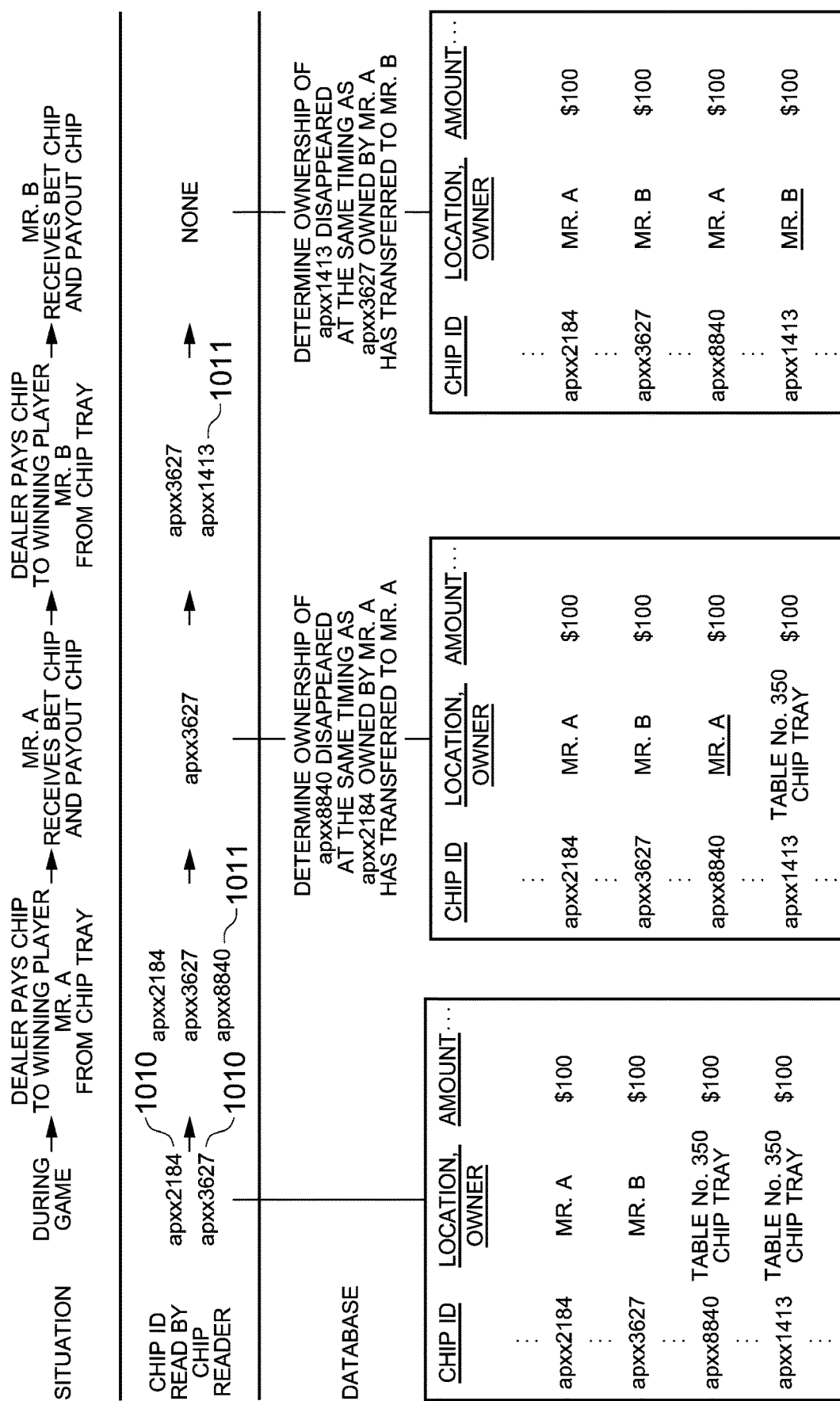
FIG. 2 is a diagram of an overview of a database according to the embodiment.

Here, a method for recording owner information of the payout chip will be described with reference to FIG. 2. FIG. 2 illustrates a method for recording owner information of the game token 1001 when the chip is paid to the winning player.

In a case where a plurality of players place bet chips, and there are two or more stacks of the bet chips in the same player position, the chip reader 1002 collectively reads the game tokens 1001 placed on the chip placement area 1025. Thus, during a game, the chip reader 1002 acquires an ID 1010 of the bet game tokens without determining which game token 1001 belongs to which player. When payment is to be made to a winning player after determination of a win/loss result of the game, the dealer pays out to each winning player (for each stack) from the chip tray 1009. A game token 1001 removed from the chip tray 1009 is placed on a chip placement area 1025. The chip reader 1002 reads an ID 1011 of the payout chip placed on the chip placement area 1025.

The winning player receives the paid out game token 1001 together with the originally bet game token 1001. At this time, because the bet chip and the payout chip transfer outside the chip placement area 1025, an ID of the bet chip and an ID of the payout chip disappear from the reading result by the chip reader 1002. With this arrangement, the controller 1003 determines to which player the payout chip has been paid by associating with the owner information of the bet chip.

The controller 1003 stores the determined owner information of the payout chip in the database by associating the owner information with the ID of the game token.

The above-described arrangement enables traceability of the owner of the game token 1001 and, in a case of wrong transfer of the game token 1001, detection of the owner information stored in the database being different from information of an actual owner.

Note that the actual owner can be identified by using face authentication technology or an ID of a membership card.

In the above description, an ID of each game token is managed in a database. However, the game token 1001 itself may store owner information.

In addition to the above-described case where a payment area 1026 is provided to each player position, a payment area may be provided separately from the player positions, and the chip reader 1002 may perform reading independently.

Use or non-use of the payment area 1026 may be selected depending on reading performance of the chip reader 1002.

The table game management system may be able to use information mutually with an RFID reader that reads chips in the chip tray 1009 by RFID, a camera that reads a bet chip, a win/loss result determination device such as a shoe that determines a win/loss result of a game, or other device, which is connected to the table game management system.

Figure 3:
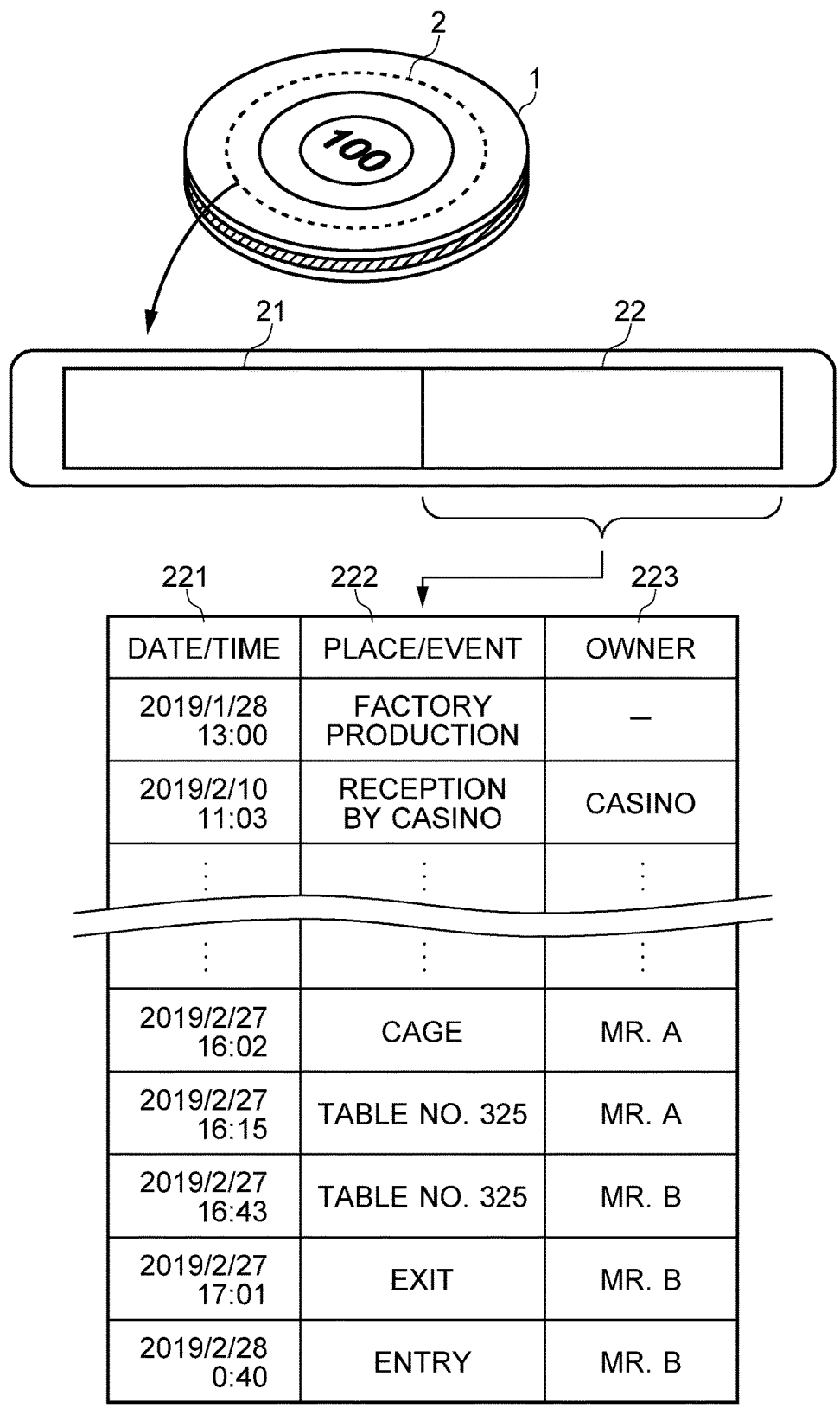
FIG. 3 is an explanatory diagram of an RFID tag included in a game token according to a second embodiment.

First, a game token used in a game token management system according to an embodiment will be described. FIG. 3 illustrates a game token 1 used in the game token management system. In FIG. 3, an RFID tag 2 capable of storing various pieces of information is embedded in the game token 1. The RFID tag 2 has a data non-rewritable area 21 and a data rewritable area 22.

The data non-rewritable area 21 stores, as fixed information 3, information that is not to be changed, that does not change, or that must not be changed while the game token 1 is used. Specifically, the data non-rewritable area 21 stores, as the fixed information 3, production information, product information, casino information, amount information, a serial number, or the like of the game token 1. The production information includes date and time when the game token was manufactured, manufacturing machine used for manufacturing the game token, or other information. The product information includes, for example, information indicating that the game token is a chip for a VIP area of a casino and information indicating a type of the chip (for example, rolling chip or cash chip).

The data non-rewritable area 21 may be a functionally non-writable area due to a specification of the RFID tag, or may be a writable area locked to disable writing of data after necessary information is written.

The data rewritable area 22 stores, as variable information 4, information that changes while the game token 1 is used. For example, as illustrated in FIG. 3, the data rewritable area 22 stores, as the variable information 4, location information 220 including date/time information 221, place/event information 222, owner information 223, or other information.

The fixed information 3 and the variable information 4 may be encrypted in order to prevent wrong reading or writing of information by another person. Further, the fixed information 3 and the variable information 4 may be stored as metadata.

Figure 4:
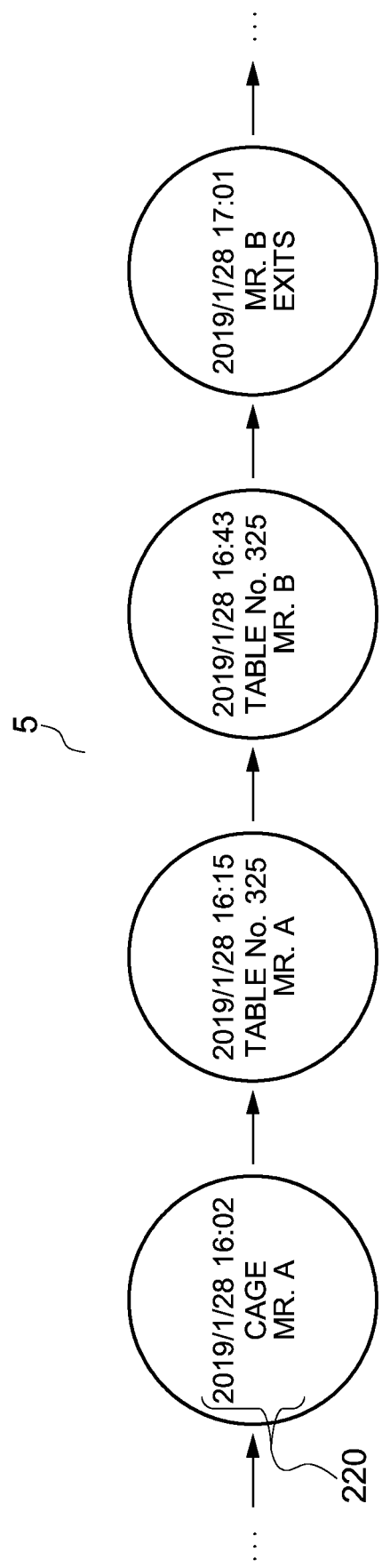
FIG. 4 is a conceptual diagram of a method for recording data of a game token according to the second embodiment.

FIG. 4 illustrates an example of a method for recording data of the variable information 4 of the game token 1. As illustrated in FIG. 4, the location information 220 including date/time information 221, place/event information 222, and owner information 223 is set as a block. Then, blocks of the location information 220 are connected in a chain so that history of the location information 220 of the game token 1 can be determined.

FIG. 4 illustrates an example of the variable information 4 stored in the game token 1, and transference of the game token 1 as described below can be determined. At 16:02 on Jan. 28, 2019, Mr. A exchanges cash and a game token 1 at a cage 5. At 16:15 on the same day, Mr. A makes a bet at table No. 325 by using the game token 1. At 16:43 on the same day, Mr. B receives the game token 1 as a redemption for having won a bet at table No. 325. At 17:01 on the same day, Mr. B exits a casino, carrying the game token 1.

The variable information 4 may be configured to store only latest location information as illustrated in FIG. 4 or store all written location information. Further, some of a plurality of pieces of location information may be selected and stored. In a case where some pieces of the location information 220 are selected and stored among all of the location information, a plurality of pieces of the location information including at least the latest location information 220 may be stored. With the above configuration, history of use or transference of a certain game token 1 is known from variable information 4 of the game token 1. That is, traceability information of the game token 1 is written in the game token 1 itself to be determined.

Figure 5:
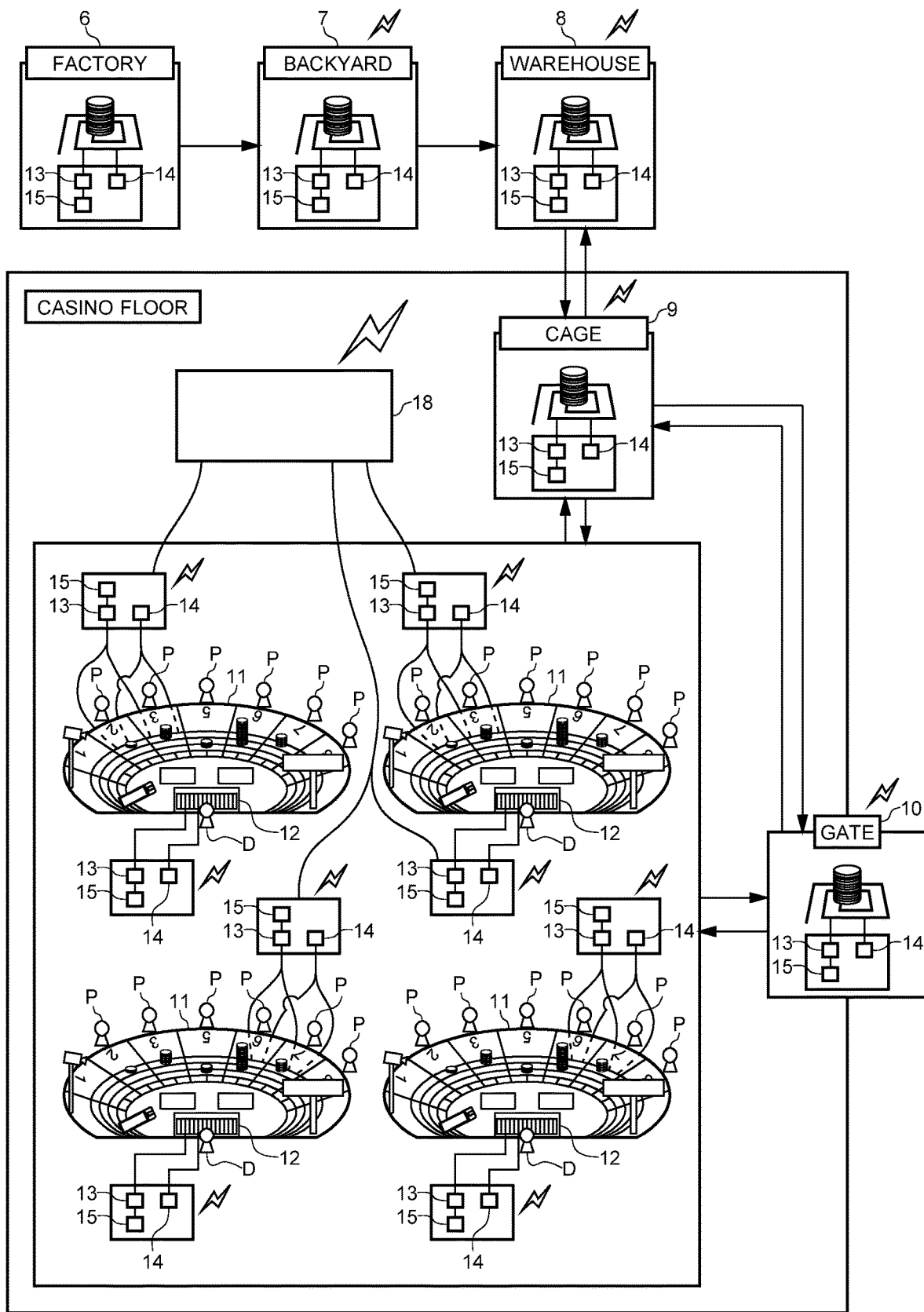
FIG. 5 is a diagram of an overall overview of a game token management system according to the second embodiment.

Next, a management system for the game token 1 of the present embodiment will be described. FIG. 5 illustrates an overall overview of the management system.

First, at a factory 6, a writer 14 writes, in the data rewritable area 22 of the RFID tag 2 of the game token 1, the variable information 4 including information of manufacturing completion or factory shipment as location information 220.

The game token 1 shipped from the factory 6 is subjected to a receiving process in a backyard 7 of the casino. In the backyard 7, a reader 13 reads the variable information 4 stored in the data rewritable area 22 of the game token 1. Then, on the basis of the reading result, a management controller 15 determines whether or not the location information 220 indicating that the information has been written at the factory 6, which is expected to be written, is actually written as latest variable information 4. If there is no record of writing at the factory 6, an error signal is generated indicating that the game token is possibly being wrong. This allows the casino to refuse to receive the game token or to request a factory to conduct investigation. If there is no problem in record of writing, in the data rewritable area 22 of the RFID tag 2, the writer 14 writes location information 220 indicating a backyard. At a time of writing, the location information indicating the backyard may be written either in addition to the location information indicating the factory or after deleting the location information indicating the factory. Further, reading and writing of the game token in the backyard 7 described above can be performed together with usual validation or activation of the game token.

The game token 1 of which receiving inspection has been completed in the backyard 7 is carried to a warehouse 8 or cage 9 of the casino. In the warehouse 8 or the cage 9, the reader 13 reads the variable information 4 stored in the data rewritable area 22 of the game token 1. Then, on the basis of a reading result, a management controller 15 determines whether or not the location information 220 indicating that the information has been written at the backyard 7, which is expected to be written, is actually written as latest variable information 4. Further, it may be also inspected whether information indicating the factory 6 is written in history of the variable information 4. The management controller 15 determines whether or not any abnormality is present in the history of the location information, similarly to the above-described inspection in the backyard 7. If there is no problem in a reading result, the writer 14 writes, in the data rewritable area 22, location information 220 indicating the warehouse 8 or the cage 9.

A player purchases the game token 1 at the cage 9. When the player purchases the game token 1, a writer 14 at the cage 9 writes, as the variable information 4, time at which the game token is purchased and information indicating change of the owner of the game token from the casino to a customer. The player may be identified and recorded by face authentication technology or an ID card such as a membership card of the casino or an official ID card.

The player makes a bet by placing the purchased game token 1 on a betting area 11 at a game table. From the RFID tag 2 of the bet game token 1, a reader 13 reads the location information 220 including date/time information 221, place/event information 222, and owner information 223. The management controller 15 determines whether or not any abnormality is present. It can be determined that abnormality is present, for example, in a case where a certain period has passed since last written date and time of information of use at a game table or information of cashing in at a cage, or in a case where the owner information 223 stored in the game token 1 and the owner information 223 identified by face authentication or an ID card are different from each other.

If there is no problem in a reading result, the writer 14 adds the location information 220 to the data rewritable area 22 of the bet game token 1. The location information 220 includes date/time information 221, place/event information 222, and owner information 223. At the table, for example, the writer 14 writes variable information 4 including information of a player position number where the game token 1 is placed and information of the player. The player information may be identified by an ID card or face authentication. Usually, a plurality of game tokens 1 are stacked and placed on the betting area 11, and therefore writing is performed collectively for the stacked game tokens 1.

When the player takes the game token 1 out of a casino floor, exit processing is performed at a gate 10. At a time of exit of the player, the reader 13 reads the location information 220, and the management controller 15 determines whether or not any abnormality is present with the variable information 4. Further, at the gate 10, the writer 14 writes the variable information 4 including place/event information 222 indicating the exit and owner information 223.

In a case where the player brings in the game token 1, which has been taken out before, and enters the casino floor, the reader 13 reads the location information, and a management controller 15 determines whether or not any abnormality is present with the variable information 4. It is possible to determine that there has been transfer of the game token outside the casino, for example in a case where the owner of the game token 1 once taken out of the casino is different between at the time of exit the casino and at the time of entry to the casino.

The above-described management controller 15 may output an alarm to the cage 9 or to the gate 10 in a case where a reading result by the reader 13 is determined to be abnormal. On the basis of the alarm output by the management controller 15, cashing in may be refused when the owner of the game token 1 attempts to cash in at the cage 9, or a check may be conducted individually when the owner of the game token 1 exits the gate 10. Further, in a case where a determination result is abnormal, the management controller 15 may issue an alarm to a dealer of each game table to interrupt a game or may issue an alarm to a pit, and a pit manager may determine to interrupt or continue a game, or determine to exchange the game token 1. Alternatively, the management controller 15 may be connected to an overall management controller 18 of the casino and may issue an alarm to the overall management controller 18.

Similarly, the management controller 15 may determine whether or not any abnormality is present in the variable information 4 read by the reader 13 when the game token 1 is exchanged for cash at the cage. Specifically, the management controller 15 may determine that abnormality is present in a case where a certain period has passed since latest written date and time of information of use at a game table or information of cashing in at the cage, or in a case where the owner information 223 stored in the game token 1 and information of a person who is going to exchange the game token 1 for cash are different from each other. In a case where abnormality has been determined to be present with the game token 1, the management controller 15 may output an alarm to refuse to exchange the game token 1 for cash.

Further, the above description is given of a case where the reader 13 performs reading, a management controller performs determination, and then the writer 14 performs writing. However, the reading and the writing may be performed simultaneously.

In the following, details of application of an embodiment will be described.

At the factory 6, the RFID tag 2 is read and/or written at a time of production completion or product shipment. The writer 14 writes the production information and the product information as the fixed information 3 and locked it so as not to be rewritten if necessary, and writes the variable information 4.

At the backyard 6, the game token 1 shipped from the factory is received, and the RFID tag 2 is read and/or written when the game token 1 is activated as a usable game token 1.

At the warehouse 8, the RFID tag 2 is read and/or written when the game token 1 is transferred from the warehouse 8 to the cage 9, or from the cage 9 to the warehouse 8. Alternatively, the RFID tag 2 of the game token 1 kept in the warehouse 8 may be read and/or written at regular time intervals or at a predetermined timing.

At the cage 9, the RFID tag 2 is read and/or written when the game token 1 is transferred from or to the warehouse 8 or when cash owned by a customer and the game token 1 are exchanged. In a case where cash and the game token 1 are exchanged at the cage 9, as the variable information 4, place/event information 222 indicating the exchange and owner information 223 indicating a player who exchanged the cash and the game token 1 are written. The owner information 223 can be acquired from a casino ID card of the player, a face authentication system, a credit card, or the like.

At the gate 10, the RFID tag 2 is read and/or written on entry or exit of the player. To all game tokens 1 that a player takes out of the casino when exiting the casino, as the variable information 4, place/event information 222 indicating the taking out and owner information 223 indicating a player who takes out the game tokens 1 are written and registered. Similarly, at a time of entry to the casino, as the variable information 4, place/event information 222 indicating the bringing in and owner information 223 indicating a player who brings in the game token 1 are written and registered to the game token 1 brought in the casino.

At the betting area 11, the RFID tag 2 of the game token 1 that a player placed on the betting area 11 to participate in a betting is read and/or written. The RFID tag 2 of a game token 1 that the dealer has placed on a betting area 11 as redemption to the player is read and/or written.

In a chip tray 12, the RFID tag 2 of each of the game tokens 1 collected in the chip tray and the RFID tag 2 of each of the game tokens 1 kept in the chip tray are read and/or written.

Further, the game table may include a payout area including area 2007 and the payment area 1026, and the RFID tag 2 of a game token 1 that the dealer has placed on the betting area 11 as redemption to a player may be read and/or written.

The management controller 15 has a function to determine whether or not any abnormality is present in location information 220 obtained from a reading result by a reader 13 at each place. Determination of presence of abnormality is made in a case where the game token 1 has not been used for a predetermined period since last writing, or where location information, which is supported to be written, is not written.

A situation where the game token 1 has not been used for a predetermined period since last writing is a situation where: 1) latest location information indicates the cage 9, and a predetermined period has passed before next information is written, 2) latest location information indicates entry at the gate 10, and a predetermined period has passed before next information is written, or 3) latest location information indicates exit at the gate 10, and a predetermined period has passed before next information is written.

A situation where location information, which is supported to be written, is not written is a situation where: 4) at a time of entry to a gaming hall, information indicating exit at the gate 10 is not written as latest location information in data rewritable area 22 of the game token 1, 5) at a time of use at the cage 9, information indicating the backyard 7 is not written, or 6) at a time of exit from the gaming hall, information indicating the cage 9 or the backyard 7 is not written.

On the basis of the owner information 223 obtained from the reader 13, the management controller 15 can determine presence of abnormality when: 1) a person different from a latest owner whose information is stored in the data rewritable area 22 exchanges the game token 1 for cash or another game token in the gaming hall, or exits the gaming hall, or 2) a person different from an owner at a time of exit whose information is stored in the data rewritable area 22 brings the game token in the gaming hall.

On the basis of information obtained from the reader 13 and indicating a place of the betting area 11, or information indicating location of the chip tray 12 or a payout area, the management controller 15 determines presence of abnormality when: 1) a person different from a latest owner whose information is stored in the data rewritable area 22 uses the game token 1 at a game table, 2) a person different from the person who purchased, at the cage 9, a game token 1 without a record of use at the game table attempts to exchange the game token 1 at the cage 9, 3) a game token 1 not including information indicating the cage 9 or the backyard 7 is used in the gaming hall, or 4) latest location information is information indicating the betting area 11 or the payout area, and after a predetermined period has passed, the game token 1 is exchanged for cash at the cage 9 or is used at the game table.

FIG. 8 illustrates a database according to another embodiment. The management system further includes a database 17 that records similar fixed information 3 and variable information 4 outside the game token 1. The management controller 15 is able to record information in the database 17 on the basis of a reading result by the reader 13, check the fixed information 3 and the variable information 4 stored in the game token 1 with information in the database, and determine presence of abnormality.

In the RFID tag 2 according to the embodiment, a functionally non-writable area in the data non-rewritable area 21 may be a tag identifier (TID) area. An area in the data non-rewritable area 21, which is locked to disable further writing of data after necessary information is written, may be an electronic product code (EPC) area or a user area. The data rewritable area 22 may be an EPC area or a user area.

Figure 6:
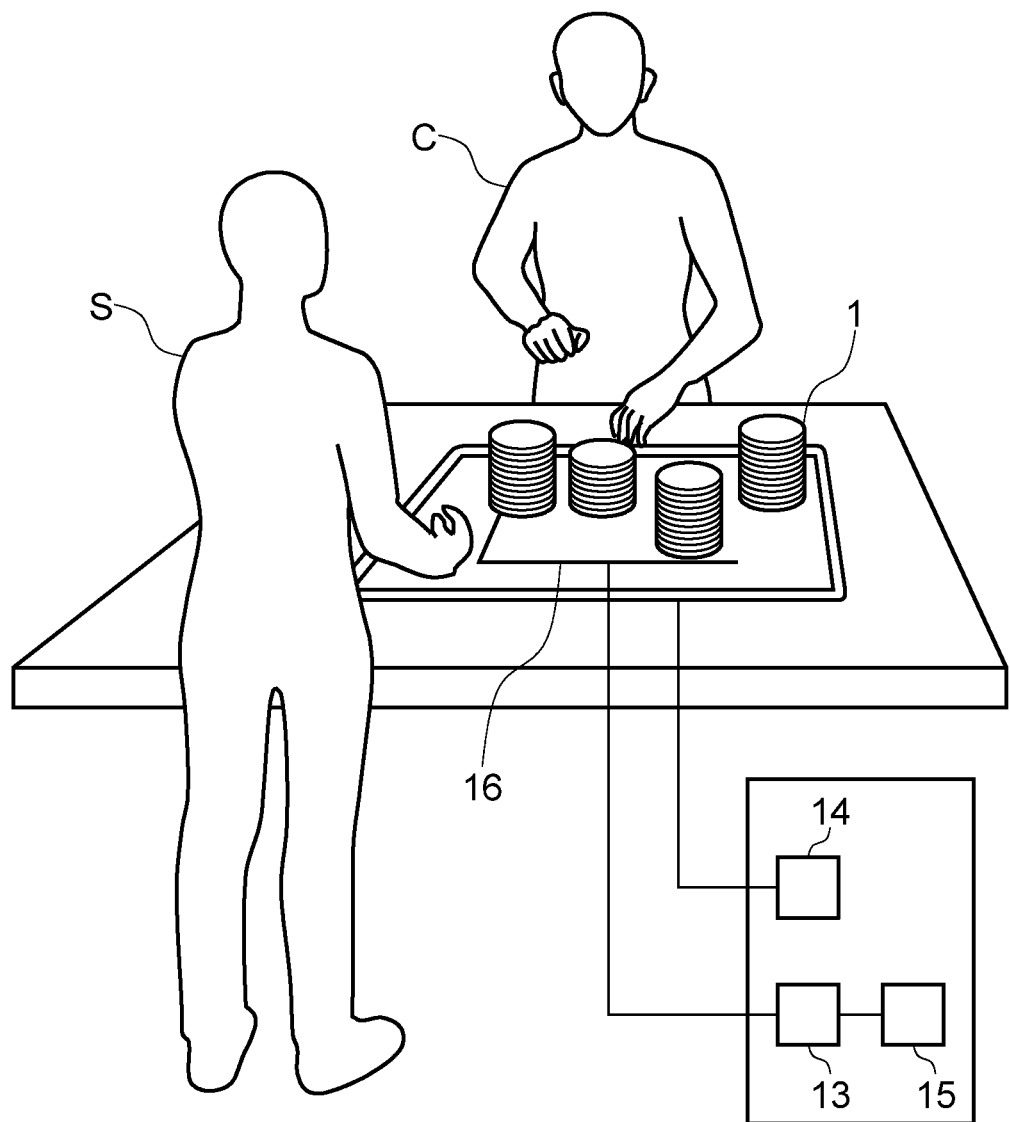
FIG. 6 is a diagram of a reader and writer of the game token according to the second embodiment.

The reader 13 and the writer 14 may be changed in form depending on a place. For example, the reader 13 and the writer 14 may be on a board at the factory 6 as illustrated in FIG. 6, and may be box-shaped at the gate 10. The betting area 11 or the chip tray 12 may include functions of the reader 13 and the writer 14. Further, the game token 1 either may be read and written in a stacked state without any support or may be read and written while being contained, for example, in a chip case. Further, the reader 13 and the writer 14 may be unified.

The above embodiment describes a case where a game token has one RFID tag, and the single RFID tag has an area in which writing to data is impossible and a data rewritable area. Meanwhile, there may be a case where two RFID tags are embedded in the game token. In this case, one RFID tag stores fixed information and then is locked to disable data writing, and another RFID tag is left data-rewritable to record variable information.

Figure 7A:
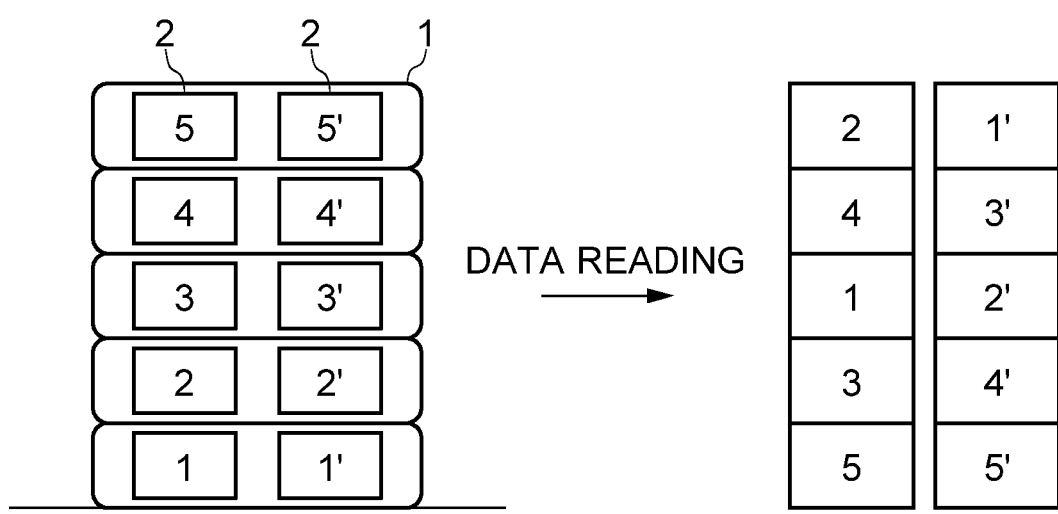
FIG. 7A is an explanatory diagram of configuration of data of the game token according to the second embodiment.

However, in this case, when a plurality of game tokens are read collectively, an information group of fixed information 3 and an information group of variable information 4 are read separately as illustrated in FIG. 7A. Therefore, a problem arises in that a combination of fixed information and variable information of a specific game token cannot be determined, and a game token having abnormal variable information cannot be identified.

Figure 7B:
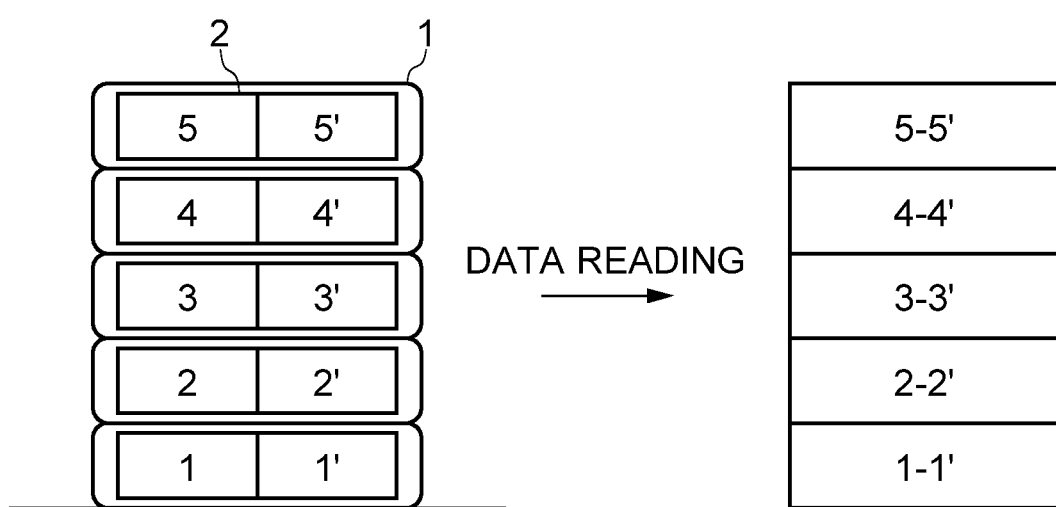
FIG. 7B is an explanatory diagram of configuration of data of a game token according to another second embodiment.

On the other hand, in the case of one RFID tag, as illustrated in FIG. 7B, mutually corresponding fixed information and variable information that are read by a reader can be determined even when a plurality of game tokens are read collectively. Therefore, a game token having a single RFID tag is conceived to be preferable.

In general, an RFID tag with a larger diameter has higher reading accuracy. Therefore, in a case where an RFID tag is embedded in the game token, a diameter of the RFID tag is preferably at least equal to or larger than a radius of the RFID tag. Thus, it is not preferable that two RFID tags are embedded in the game token, in which case, the diameter of each of the RFID tags becomes smaller. Further, the number of RFID tags to be read increases with a game token including two RFID tags, resulting in lower reading speed at a time of reading a plurality of game tokens.

In view of the above, a game token having a single RFID tag is considered to be more effective.

Figure 9:
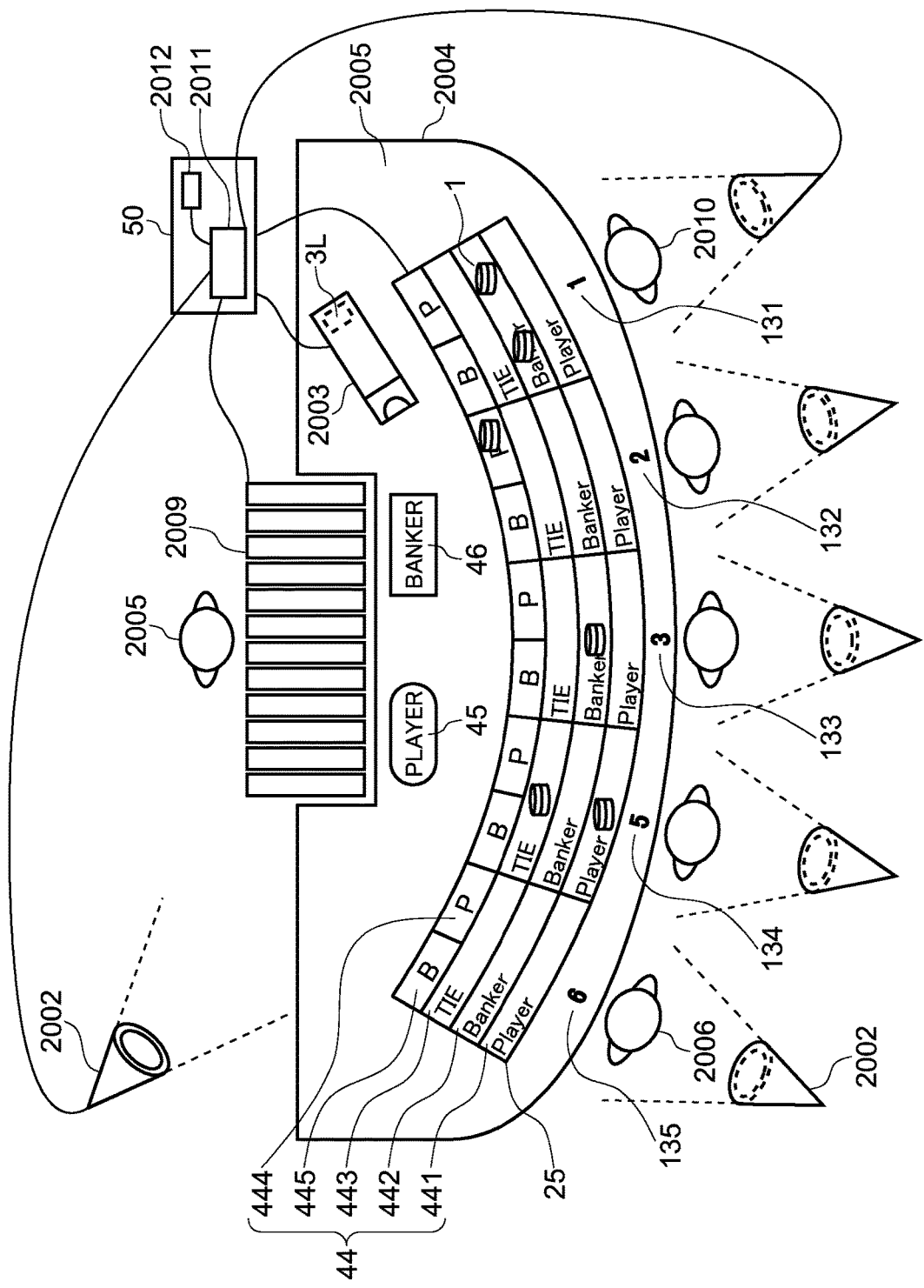
FIG. 9 is a diagram of an overall overview of a table game management system at a gaming hall having a plurality of game tables according to a third embodiment.

Described below is an overall overview of a table game management system at a gaming hall having a plurality of game tables according to an embodiment. FIG. 9 is a diagram illustrating an overall overview of the table game management system. The table game management system having a plurality of game tables 2004 at a gaming hall includes a game recorder 2011 that records an image of a game at a game table 2004 including an image of the game token 1, via a plurality of cameras 2002, an image analyzer 2012 that performs image analysis on the recorded images, a chip reader 25 that reads RFID added to the game token 1, and a game result determination device 18 that determines and displays a result of each game played at the game table 2004.

The game result determination device 18 is, for example, a card distributor 2003, which is a so-called electronic shoe that have been used by persons skilled in the art. A rule of a game is previously programmed in the card distributor 2003, which is configured to read information of a distributed card C and determine win or loss of the game. For example, in a baccarat game, a win of a banker, a win of a player, and a tie (draw) are basically determined by each rank of two to three cards, and a determination result (win/loss result) is displayed by a result display lamp 2013.

In FIG. 9, a game table 2004 is a table for baccarat and provided with five sitting numbers 13, allowing five game participants to participate in a game. The five sitting numbers are "sitting number 1" 131, "sitting number 2" 132, "sitting number 3" 133, "sitting number 5" 134, and "sitting number 6" 135. Abetting area 44 is provided to each sitting number 13. The betting area 44 of a sitting number 13 includes each area for player (PLAYER) 441, banker (BANKER) 442, tie (TIE) 443, player pair (P) 444, and banker pair (B) 445. Each game participant makes a bet by placing a game token 1 in an amount to be bet at a position corresponding to a bet target. In FIG. 9, for example, at a sitting number 5, two game tokens 1 are placed on tie 443 and two game tokens 1 are placed on player 441 for betting. The game table 2004 further includes a player card area 45 for placing a drawn player card and a banker card area 46 for placing a drawn banker card.

Via a camera 2002 and the image analyzer 2012, the controller 2014 is able to determine on which position (player, banker, tie, or pair) in a betting area 2008 each player 2006 has bet a game token 1, and types and the number of the bet game tokens 1. Different colors are assigned to game tokens 1 in different values. That is, to the controller 2014 can determine that, for example, at the sitting number 5, two game tokens 1 are bet on tie 443 and two game tokens 1 are bet on player 441.

As illustrated in FIG. 9, the chip reader 25 is arranged so that RFIDs of the game tokens 1 in a reading area can be collectively read by regarding an entire betting area for each sitting number as one reading area. In the RFID attached to a game token 1, unique ID information, and an amount, type, manufacturing information, owner information, or the like, of the game token 1 are written. Alternatively, the ID information and the amount, type, manufacturing information, owner information, or the like, of the game token 1 may be associated and stored in a database. By reading the RFID attached to the game token 1, the chip reader 25 can determine a total amount or the number of game tokens 1 for each sitting number. That is, for example, a type, an amount, and an ID of each of four game tokens bet at the sitting number 5 can be determined.

Figure 10:
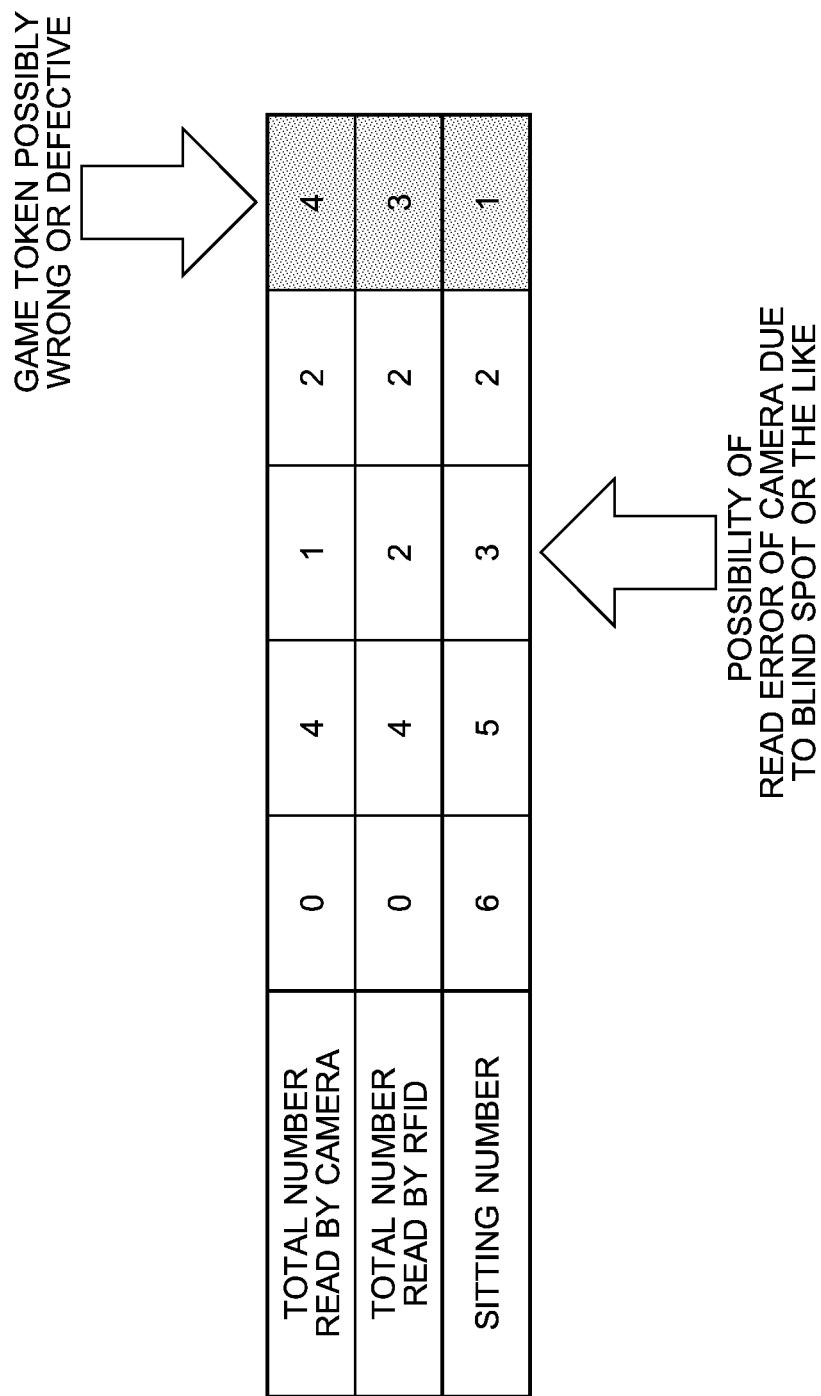
FIG. 10 is a diagram of a result of reading a chip by a camera and RFID according to the third embodiment.

As illustrated in FIG. 10, on the basis of types and the number of the game tokens 1 bet at each betting area of each sitting number based an image analysis result by the image analyzer 2012, the controller 2014 determines a total amount or the total number of the game tokens 1 for each sitting number. Then, to determine agreement, the controller 2014 compares the determined a total amount or the total number of the game tokens 1 with a total amount or the total number of the game tokens 1 for each sitting number based on information of RFIDs of the game tokens 1 read by the chip reader 25. Furthermore, a sitting number for which an amount or the total number of the game tokens 1 determined to be disagreeing can be output, and therefore a sitting number having a problem can be identified.

In a case where the total amount or the total number of the game tokens 1 for each sitting number based on the image analysis result by the chip reader 25 is smaller than the total amount or the total number of the game tokens 1 for each sitting number based on the reading result by an image analyzer 2012, there is a possibility that RFID attached to a game token 1 is broken, the RFID cannot be read, or RFID is not attached to the game token 1. In FIG. 10, the read total number of game tokens 1 bet at sitting number 1, based on image analysis by the image analyzer 2012, is four, whereas the total number of the game tokens 1 based on reading of RFID by the chip reader 25 is three. Therefore, it is conceivable that one of the four game tokens 1 bet at the sitting number 1 has unreadable RFID.

In a case where the total amount or the total number of the game tokens 1 for each sitting number based on the image analysis result by the chip reader 25 is larger than the total amount or the total number of the game tokens 1 for each sitting number based on the reading result by the image analyzer 2012, there is a possibility that the image analyzer 2012 has not been able to read the game token 1 for such reasons that the game token 1 is in a blind spot of a camera. In FIG. 10, the read total number of game tokens 1 bet at sitting number 3, based on image analysis by the image analyzer 2012, is one, whereas the total number of the game tokens 1 based on reading of RFID by the chip reader 25 is two. Therefore, there is a possibility that only one of the two game tokens 1 bet at a sitting number 3 has been recognized by the image analyzer.

ID information of the RFID attached to the game token 1 is registered in a database of a casino. Information of production and shipment at a factory, and information of reception, validation, and activation at the casino are recorded. The controller 2014 can check the information of the RFID read by the chip reader 25 with information in the database and determine authenticity of the registered information of the game token 1 to be used in the casino.

With this configuration, types and the number of the game tokens 1 bet at each betting area can be determined by the camera. Further, on the basis of RFID information of game tokens 1 read by the chip reader 25, a wrong or defective game token 1 can be identified for each sitting number.

The table game management system further includes a game participant identification unit using a face authentication system or a player ID card, and the controller 2014 can associate game participant information identified by the game participant identification unit with a sitting number. For each game participant, the controller 2014 can store the bet amount, redeeming or collecting amount, and win/loss information, which are stored for each sitting number. Further, the controller 2014 can collectively store information of a plurality of games that game participants play at a plurality of tables.

By using a chip tray determination device 12, the controller 2014 can determine a total amount of the game tokens 1 in a chip tray 17 of a dealer 2005 at the game table 2004. After a game end and settlement, the controller 2014 can calculate to Figure out whether a total amount of the game tokens 1 in the chip tray 17 has increased or decreased by comparing an amount of collected lost game tokens 1 that each player 2006 has bet with an amount of payment 9W to a winning player 2006W for won chips, according to a win/loss result of the game. A chip tray determination device may capture an image of the game tokens 1 contained in the chip tray 17 by using the camera 2002 and, on the basis of analysis by an image analyzer 2012, determine the total amount of the game tokens 1 in the chip tray 17. Further, the chip tray determination device may detect the total amount of the game tokens 1 contained in the chip tray 17 by providing an RFID reader to the chip tray 17.

In this example, a wrong or an error is detected on the basis of a win/loss result of the game, information about how many and what type of game token 1 has been bet on which position (player, banker, tie, or pair) in the betting area 2008, and increase or decrease in amount of the game tokens 1 in the chip tray 17 after collection of lost chips and redemption for a won game token 1. Therefore, a wrong or an error can be detected without determining transference of the game tokens 1 after a game end, that is, whether a bet game token 1 has transferred to a player side or a dealer side.

Here, in a case of baccarat for example, a win/loss result of a game can be determined according to a rule of baccarat by the card distributor 2003 reading a rank of the card C drawn out in the game. Further, the win/loss result can be determined by capturing an image of a top of the game table 2004 by a camera 2002, analyzing the image by the image analyzer 2012, and then checking an analysis result with a rule of the game by the controller 2014. In this case, a game result determination device includes the camera 2002, the image analyzer 2012, and the controller 2014. Information of how many and what type of game tokens 1 a player at each sitting number 7 has bet on which position (player, banker, tie, player pair, banker pair) in a betting area 2008 is obtained by the camera 2002 capturing an image of the game tokens 1 placed on the betting area 2008 and the image analyzer 2012 analyzing the image for each play position 7.

Further, increase in amount of the game tokens 1 in the chip tray 17 from before collection to after collection of a lost game token 1 and decrease in amount of the game tokens 1 in the chip tray 17 from before redemption to after redemption for a won game token 1 can be calculated by comparison of a total amount of the game tokens 1 in the chip tray 17 before the collection of the lost game token 1 and redemption for the won game token 1 with a total amount of the game tokens 1 in the chip tray 17 after the collection of the lost game token 1 and redemption for the won game token 1.

For example, assuming that a total amount of the game tokens 1 in the chip tray 17 before start of the game is Bb, and a total amount of the game tokens 1 in the chip tray 17 after the end of the game and collection of lost chips and redemption for a won chip are completed is Ba. Further, assuming that, in this game, a total amount of the game tokens 1 bet on player areas of all play positions 7 is bp, a total amount of the game tokens 1 bet on banker areas of all the play positions 7 is bb, and a total amount of the game tokens 1 bet on tie areas of all the play positions 7 is bt. For example, in a case where a banker is a winner as a win/loss result of the game, Ba−Bb=bp−bb+bt should be established. Alternatively, Ba, which is the total amount of the game tokens 1 in the chip tray 17 after the end of the game, should be (Bb+bp−bb+bt). If this is not the case, it can be determined that there has been a wrong or an error in collection or redemption of the chips.

Figure 14A:
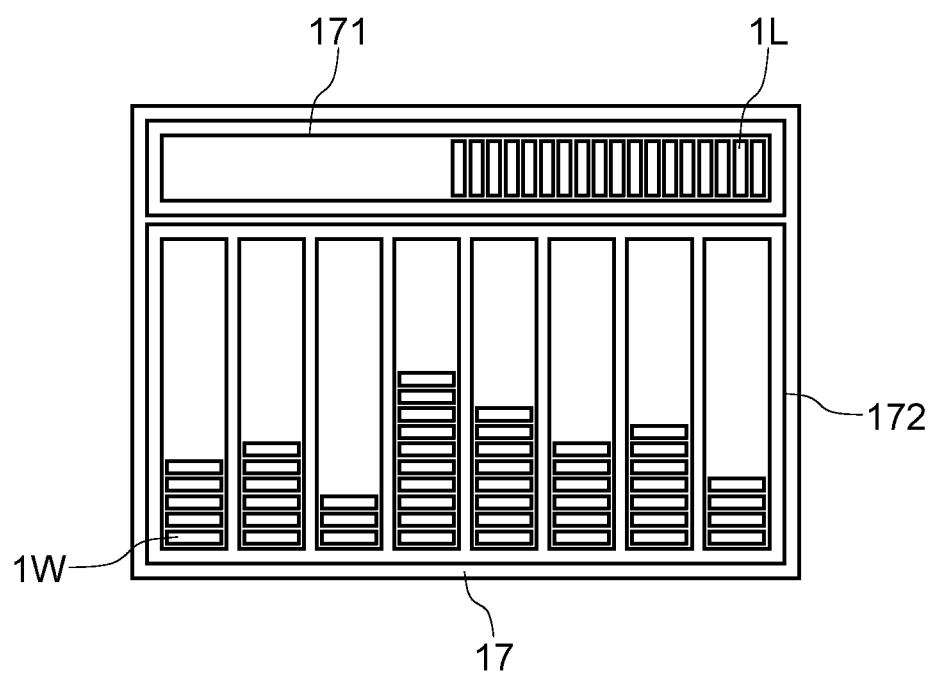
FIG. 14A is a diagram of a detail of the chip tray according to the third embodiment.
Figure 14B:
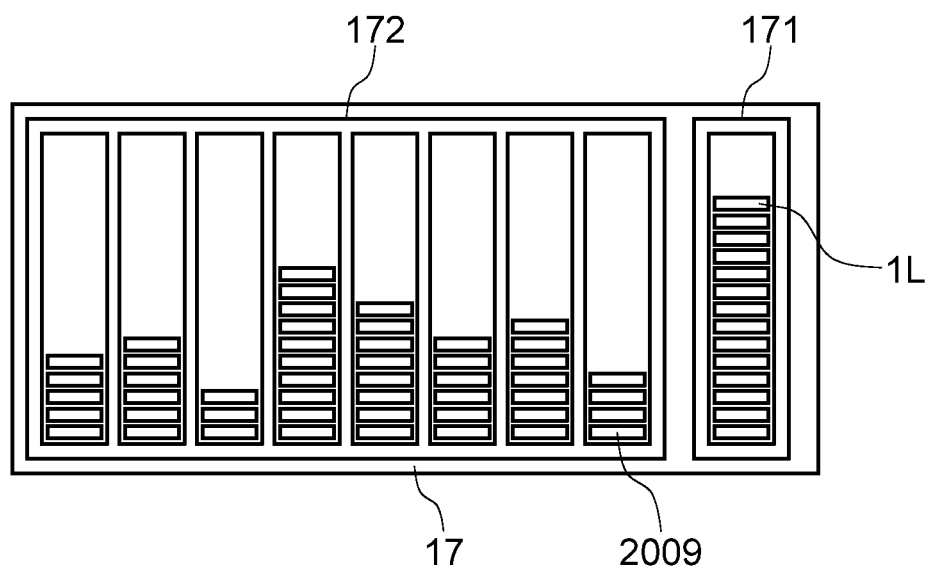
FIG. 14B is a diagram of another example of a chip tray according to the third embodiment.

FIG. 14A is a diagram illustrating details of a chip tray of the present embodiment, and FIG. 14B is a diagram illustrating another example of the chip tray. The chip tray 17 includes a collection chip tray 171 for temporarily keeping a collected game token 1L bet by a losing player 2006L, and a redemption chip tray 172 for keeping a game token 1W to be redeemed. The image analyzer 2012 and the controller 2014 determine positions, types, and the number of the game tokens 1L bet by the losing player 2006L, and calculate an increase in amount of the game token 1L, which is the amount of the game token 1 expected to be in the collection chip tray 171. Further, the image analyzer 2012 and the controller 2014 determine an actual total amount of the game tokens 1 in the collection chip tray 171 after the collection, and compare the expected total amount with the actual total amount to determine whether or not there is a difference.

The controller 2014 further performs redemption for the game token 1 to be redeemed, and after the redemption, compares a total amount of the chips expected to be in the chip tray based on the amount of the chips expected to be redeemed in the game, which is calculated from positions, types, and the number of chips each game participant bet at the game table and based on a game result, with the actual total amount of the chips in the chip tray to determine whether or not there is a difference.

Further, the game token 1W is redeemed to the winning player 2006W by using a game token 1 in a redemption chip tray 172. Thus, it is possible to secure sufficient time for the image analyzer 2012 and the controller 2014 determine an actual total amount of the game tokens 1 in the collection chip tray 171 after the collection.

As described above, in the present embodiment, the controller 2014 calculates, for each game, income and outgo of chips from an amount of bet chips placed on the game table 2004 and a win/loss result of the game, and verifies an increase in balance of the chips in the chip tray 17 after the end of the game. If a difference is detected in this verification, the controller 2014 issues an alarm or adds a record of the difference to a record of a video image captured by the camera 2002. A casino operator can track down a cause of the difference by reviewing the video image.

A table game management system according to the present embodiment calculates, from total amount of the game tokens 1 in the chip tray 17 before settlement for each game, an increase or decrease in amount of chips in the game calculated from positions, types, and the number of game tokens 1 bet by all players 2006 of the game and from a win/loss result of the game obtained by a win/loss result determination device. Then, the table game management system compares an expected total amount of the game tokens 1 in the chip tray 17 after settlement of the game end with an actual total amount of the game tokens 1 in the chip tray 17 at the game end, which is obtained via the image analyzer 2012, to determine whether or not there is a difference.

Via the image analyzer 2012, the controller 2014 determines positions, types, and the number of chips bet by each player, and determines an actual total amount of chips in the chip tray at an end of collection of all lost chips bet by each player. Then, the controller 2014 compares an expected total amount of the game tokens 1 in the chip tray 17, which is obtained by adding an increase in chips in the chip tray 17 determined by positions, types, and the number of chips bet by a losing player, to a total amount of chips of the game in the chip tray before settlement of each game, with an actual total amount of the game tokens 1 in the chip tray 17 to determine whether or not there is a difference.

In a case where the controller 2014 compares an expected total amount of the game tokens 1 in the chip tray 17, which is obtained by adding an increase in chips in the chip tray 17 determined by positions, types, and the number of the game tokens 1 bet by a losing player, to a total amount of the game tokens 1 of the game in the chip tray 17 before settlement of each game, with an actual total amount of the game tokens 1 in the chip tray 17 and determines there is no difference between the expected total amount and the actual total amount, and in addition, compares an expected total amount of the game tokens 1 in the chip tray 17 after settlement at the end of the game with an actual total amount of the game tokens 1 in the chip tray 17 at the end of the game, which is obtained via the image analyzer 2012, and determines that there is a difference between the expected total amount and the actual total amount, the controller 2014 determines there has been a wrong payment and issues an error signal that notifies of the wrong payment.

The chip tray 17 includes the collection chip tray 171 that collects and temporarily keeps the game tokens 1 bet by a losing player. The image analyzer 2012 compares an expected total amount of the game tokens 1 in the collection chip tray 171, which is obtained by adding an increase in amount of the game tokens 1 in the game calculated from positions, types and the number of the game tokens 1L bet by the losing player, with an actual total amount of the game tokens 1 in the collection chip tray 171 to determine whether or not there is a difference between the expected total amount and the actual total amount.

In a case where the controller 2014 determines a difference in which a determined actual total amount of the game tokens 1 in the chip tray 17 of the dealer 2005 at the game table 2004 is not corresponding to an increase or decrease in amount of chips calculated from an amount of chips bet by all players and a win/loss result of the game, the game recorder 2011 can play back with an index or time attached to an acquired image or with a scene of collection or payment of the game token 1 specified, so that a record of the game in which the above different has occurred can be analyzed in the game recorder 2011.

As described above, the controller 2014 obtains a total amount of chips in the chip tray 17 via the image analyzer 2012 after the settlement at the end of the game. In this case, determination after settlement is performed when: 1) redemption for the won game token 1 is completed, 2) the card C used in the game is collected and discarded in a discard area 41 or discard slot 42 of the table, 3) a predetermined button attached to a win/loss result determination device is pressed, or 4) a marker 43 that indicates win or loss is reset.

Further, the controller 2014 has an artificial-intelligence utilization structure or deep-learning structure, which allows the controller 2014 to determine positions (player, banker, or pair) and an amount (types and the number) of chips bet at each play position 7 of the game table 2004, and to extract win/loss history of each player 2006, which is obtained from a win/loss result of each game, and an amount of obtained chips (an amount of won chips) as an unusual situation specified by a casino, compared with statistical data of many games in the past (big data). Typically, the controller 2014 includes an artificial-intelligence utilization structure or deep-learning structure, which can extract, as an unusual situation compared with statistical data (big data, or the like) of games in the past, a case of a winning amount of a certain amount (one million dollars) or more, or a case of a series of several games in which amounts of bet chips are small in losing games and amounts of bet chips are large in winning games at a play position 7 of the game table 2004.

Furthermore, unified with the image analyzer 2012, the controller 2014 of this table game management system is configured to be able to identify an individual player 2006 at the play position 7 which has won a predetermined amount or more or at which an unusual situation is extracted. In identification of such a player 2006, in the image analyzer 2012, feature points of an image of a face is obtained by, for example, extraction of a feature point, and the image is identified by adding an identification number (ID, or the like) to the image. Then, the controller 2014 has an alarm function of notifying another game table of the presence of a specific player when the specific player 2006 leaves the seat and sits at the other game table. Specifically, a pit manager or a person in charge of each table (or a dealer) who manages each game table 2004 is notified to further prevent an unusual situation.

The controller 2014 can identify a collected game token 1 for each sitting number on the basis of information of an ID of RFID of the collected game token 1 determined by the chip tray determination device and information of an ID of RFID of the game token 1 read by the chip reader 25.

Figure 11:
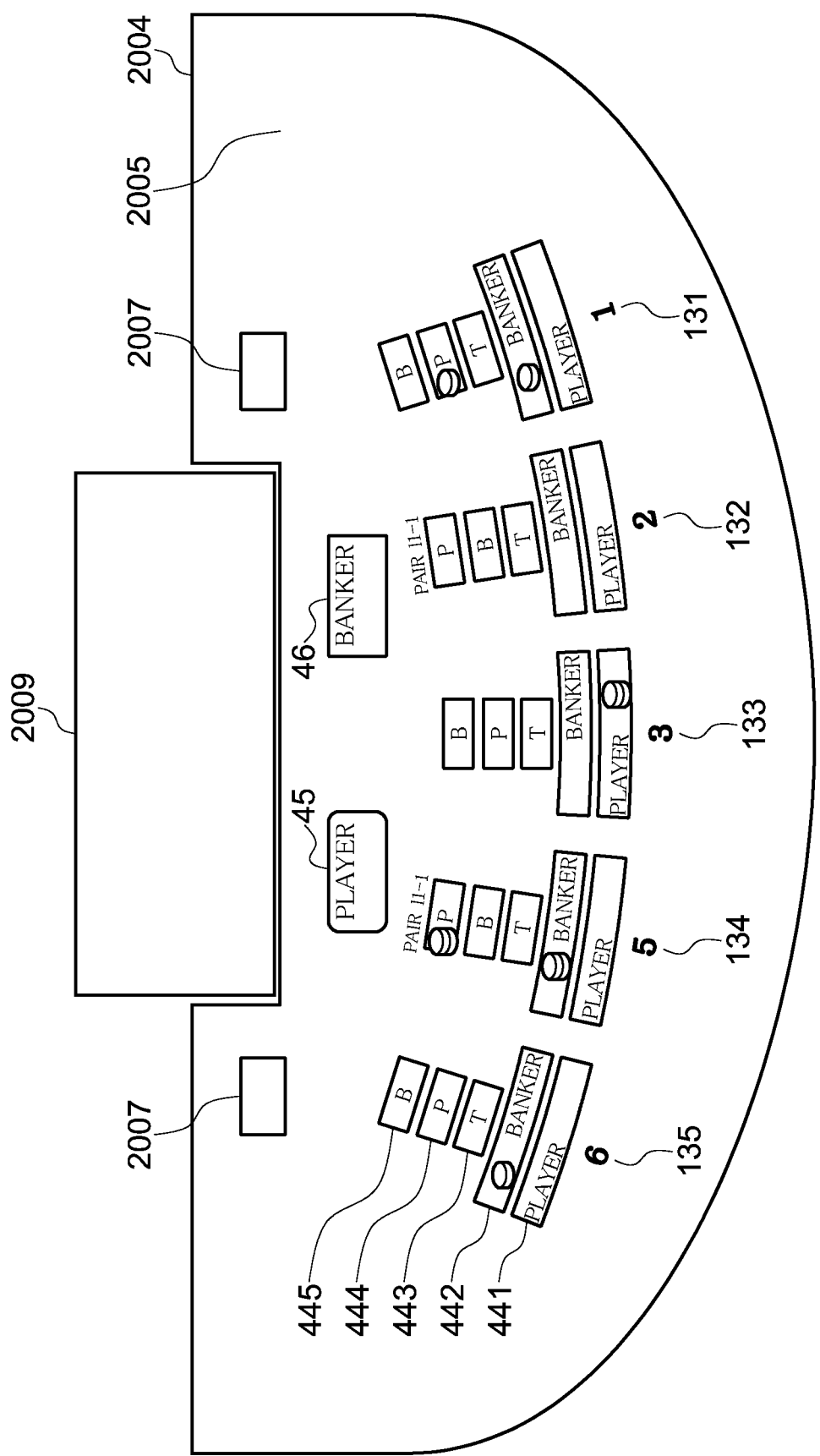
FIG. 11 is a diagram of a game table according to the third embodiment.
Figure 13:
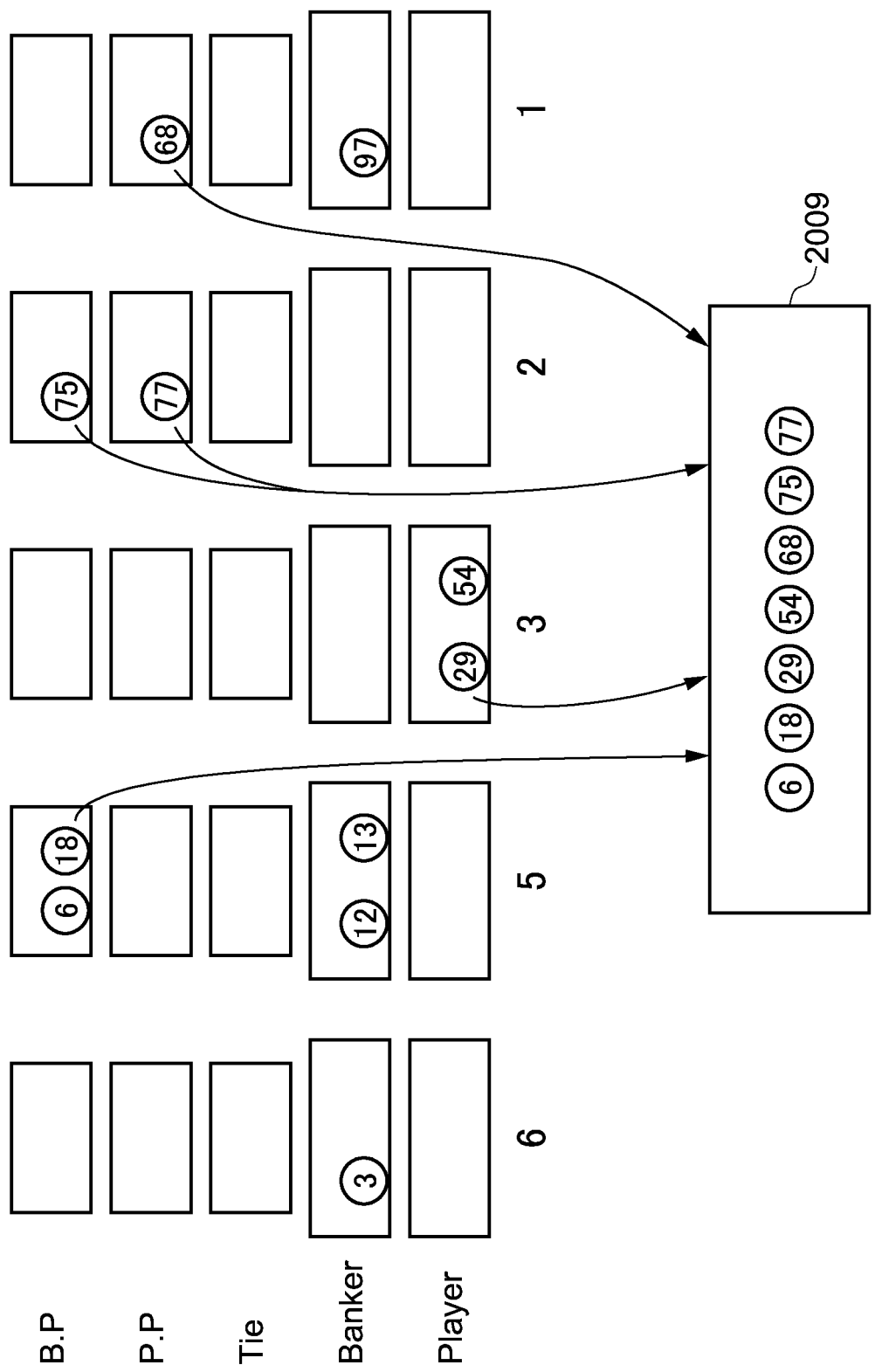
FIG. 13 is a diagram of a state of game tokens bet at the game table according to the third embodiment.

In FIG. 11, game tokens 1 are bet as illustrated in the detail tables in FIGS. 12 and 13. In analysis by the image analyzer 2012, places (player, banker, or the like) where the game tokens 1 are bet and the number (and amount) of the bet game tokens 1 can be determined. Meanwhile, in reading by the chip reader 25, an ID of RFID attached to a game token 1 can be determined for each sitting number. Further, because a chip tray determination device can determine IDs of game tokens 1 in a chip tray 9, the chip tray determination device can determine a collected game token 1 by determining IDs added from before collection to after collection. In a case where a banker has won as a game result in FIGS. 11 to 13, an analysis result by the image analyzer 2012 shows that, among IDs of the collected chips determined by the chip tray determination device, two pieces of chips bet on banker pair should be collected, and that two pieces of chips of ID 6 and ID 18 that the chip reader 25 has read as chips bet at the sitting number 5 have been collected.

The controller 2014 determines the total amount or the total number of the game tokens 1 expected to be collected for each sitting number, which is determined by using a measurement result of positions, an amount, and the number of the game tokens 1 based on a game result obtained from the game result determination device and an image analysis result by the image analyzer. Therefore, the controller 2014 can compare, to determine agreement, the total amount or the total number of the game tokens 1 collected for each sitting number, which is determined based on RFID, with the total amount or the total number of the game tokens 1 expected to be collected based on the image analysis result.

For example, in a case where a reading result by the chip reader 25 of the sitting number 1 is "A, B, C, D, E," an analysis result by the image analyzer 2012 is "two pieces on tie, and two pieces on banker," the game result is "winning of banker," and a reading result by a chip tray determination device 18 is "A, B," it is understood that the chips A and B bet on tie have been correctly collected.

The controller 2014 can determine whether or not information of an ID of RFID of the collected game token 1 determined by the chip tray determination device agrees with information of an ID of RFID of the bet game token 1 read by the chip reader 25. By this determination, it is possible to determine whether or not the game token 1 collected in the chip tray is the game token 1 bet on the game table, and whether or not the game token 1 is wrongly collected from another place.

The controller 2014 can determine, on the basis of the RFID information read by the chip reader 25, a chip type such as a cash chip, a rolling chip, or a promotion chip, and can store an amount of bet money for each type of the determined chips and an amount of money collected or redeemed.

A rolling chip is a special chip that can be purchased by a specific member and cannot be exchanged for cash, and an amount of the purchased rolling chips is managed for each member. A rolling chip must be consumed for betting, and redemption for betting using a rolling chip is made by a cash chip. By storing an amount of the rolling chips bet or collected on the basis of the RFID information read by the chip reader 25, an amount of rolling chips that a specific member is expected to have can be determined.

Figure 15:
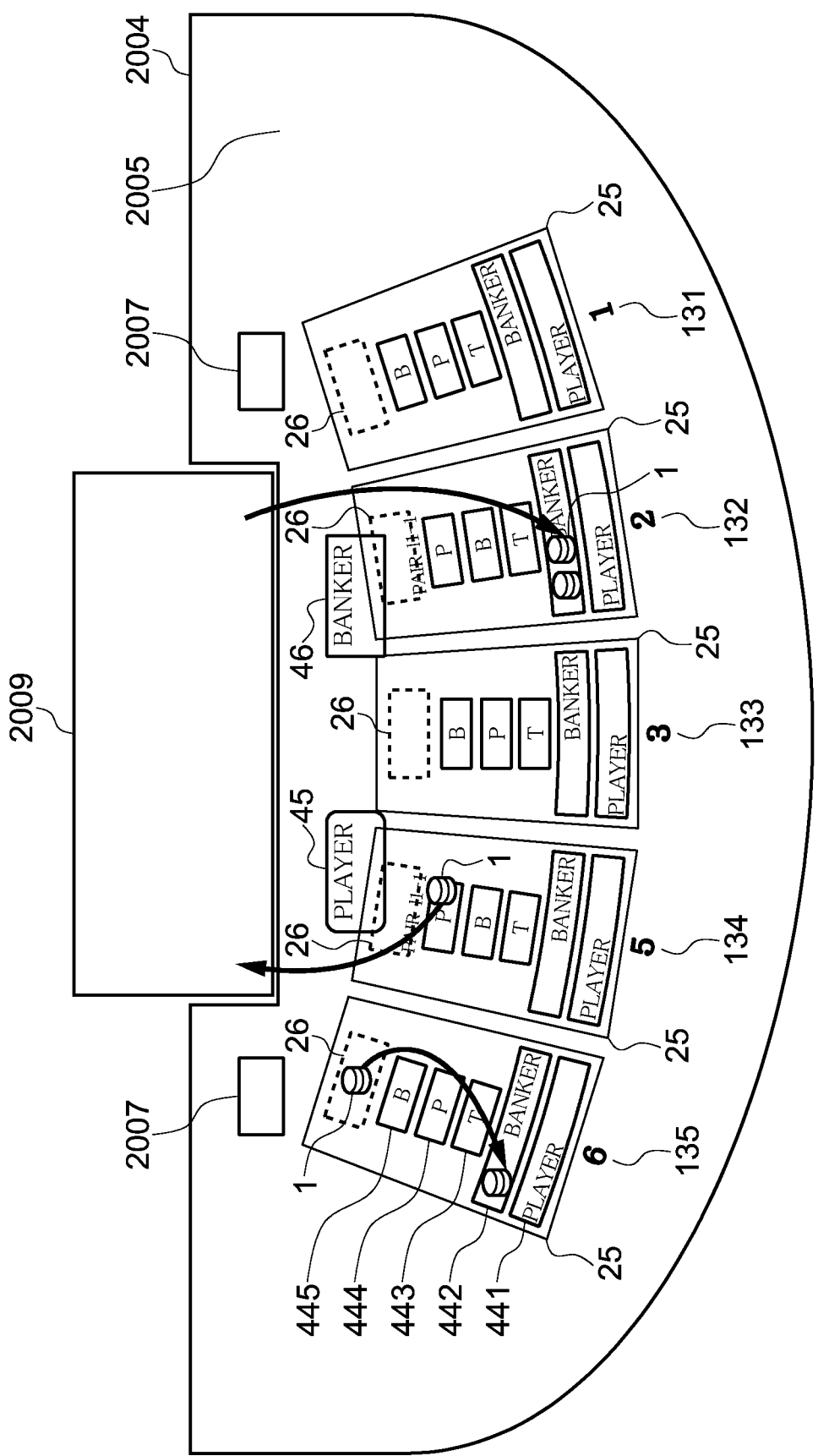
FIG. 15 is a diagram of the game table according to the third embodiment.
Figure 16:
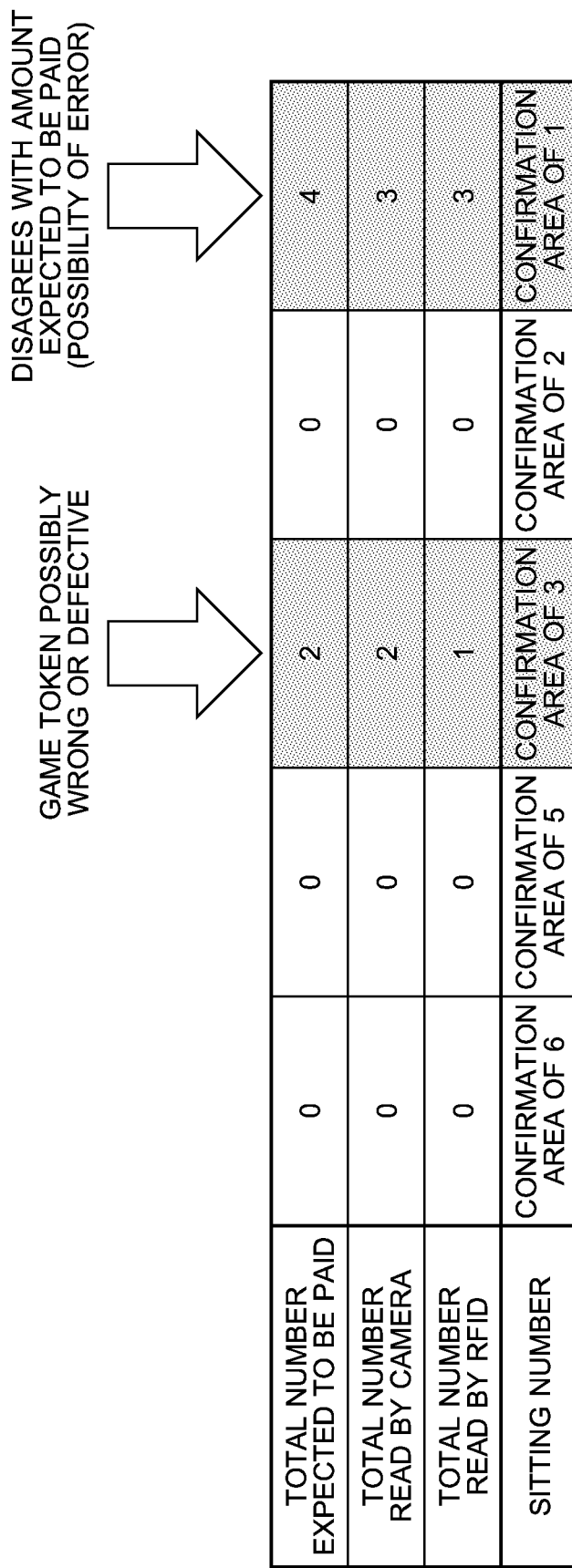
FIG. 16 is a diagram of a result of reading a chip by the camera and RFID according to the third embodiment.

The chip reader 25 has a function of a confirmation area, and can read a game token 1 placed for redemption. As illustrated in FIG. 15, in a case where redemption is made to banker at the sitting number 2, the game token 1 for the redemption is placed and read in the chip reader 25. In FIG. 15, the game tokens 1 are placed next to the won game tokens 1 bet on banker at the sitting number 2. The controller 2014 can compare an amount of redemption, which is determined by using a measurement result of a position, an amount, and the number of the game tokens 1 based on a game result obtained from the game result determination device and the image analysis result by the image analyzer, with an amount of the game tokens 1 placed for each sitting number, which is based on a reading result by the chip reader 25, determine whether or not the amount of the redemption agrees with the amount of the game tokens 1 placed for each sitting number, and output a determined result. In FIG. 16, at the sitting number 1, the total number of the game tokens 1 expected to be paid is four, whereas a reading result by the chip reader 25 is three, which means the total number of the game tokens 1 and the reading result disagree. In a case where an amount of redemption disagrees with an amount of the game tokens 1 placed for each sitting number, a signal indicating the disagreement is output, and the dealer can replace a game token 1 for redemption on the basis of the output signal. In a case where the game token 1 is replaced, determination is performed again, and a determination result can be output. An area for placing the game token 1 for redemption may be anywhere in the chip reader 25. Further, as illustrated in FIG. 15, separately from a betting area, a payment confirmation area 26 may be arranged on a dealer side of the betting area. In FIG. 15, a game token 1 for redemption is placed in a payment confirmation area 26 at a sitting number 6, the chip reader 25 performs reading, the controller 2014 makes determination, and a redemption chip is placed next to the won game token 1 placed in banker.

For the confirmation area, the image analyzer 2012 may perform image analysis, and the controller 2014 may check a result of the image analysis with a reading result by the chip reader 25 to determine whether or not a total number of the result of the image analysis and a total number of the reading result by the chip reader 25 match.

On the basis of the determination made, the controller 2014 can output a signal. The signal may be displayed in a display unit of the chip tray 9 or a display unit of a card distributor 2003, or may be output to the pit manager or to the backyard of the casino.

Figure 17:
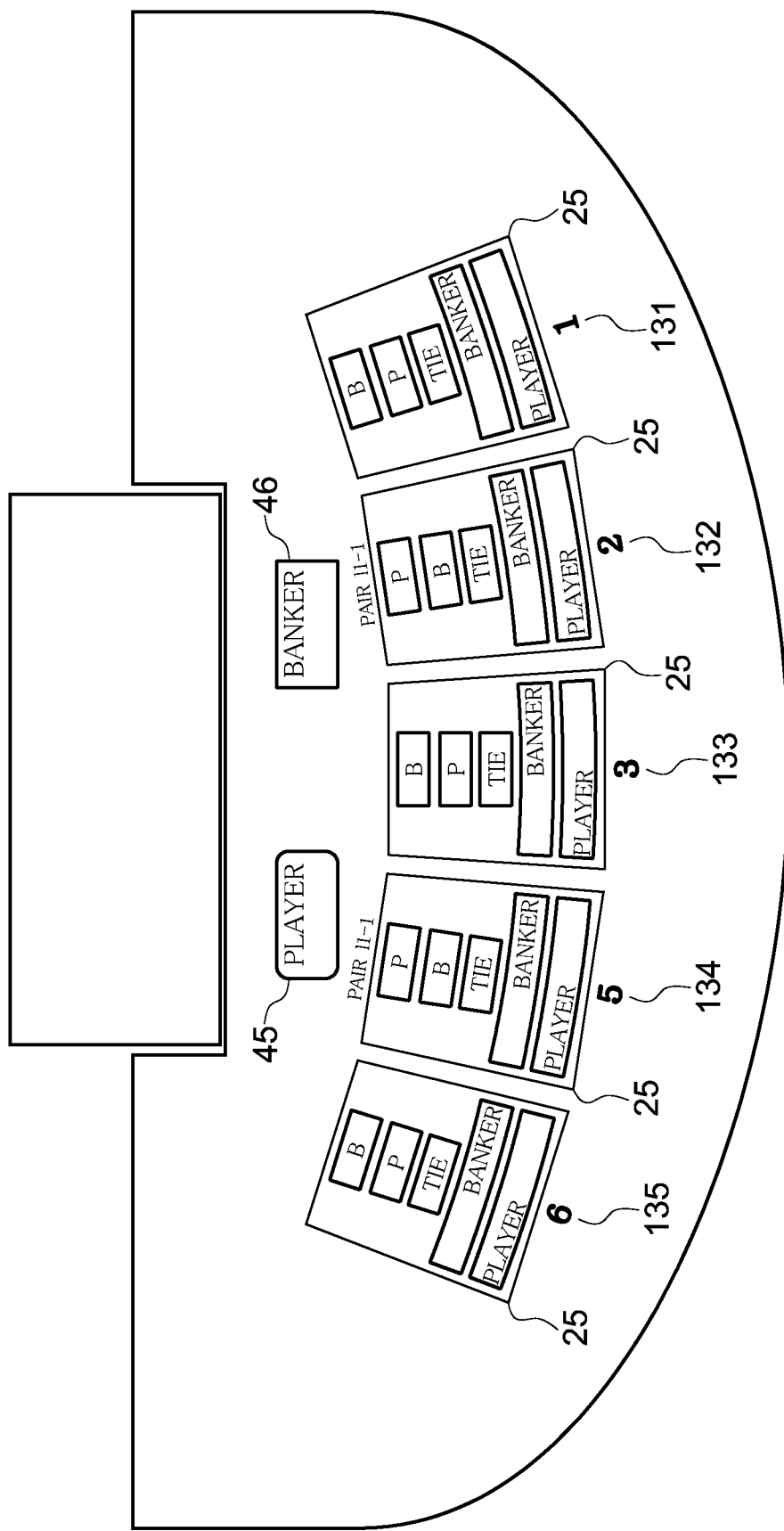
FIG. 17 is a diagram of a game table according to another third embodiment.
Figure 18:
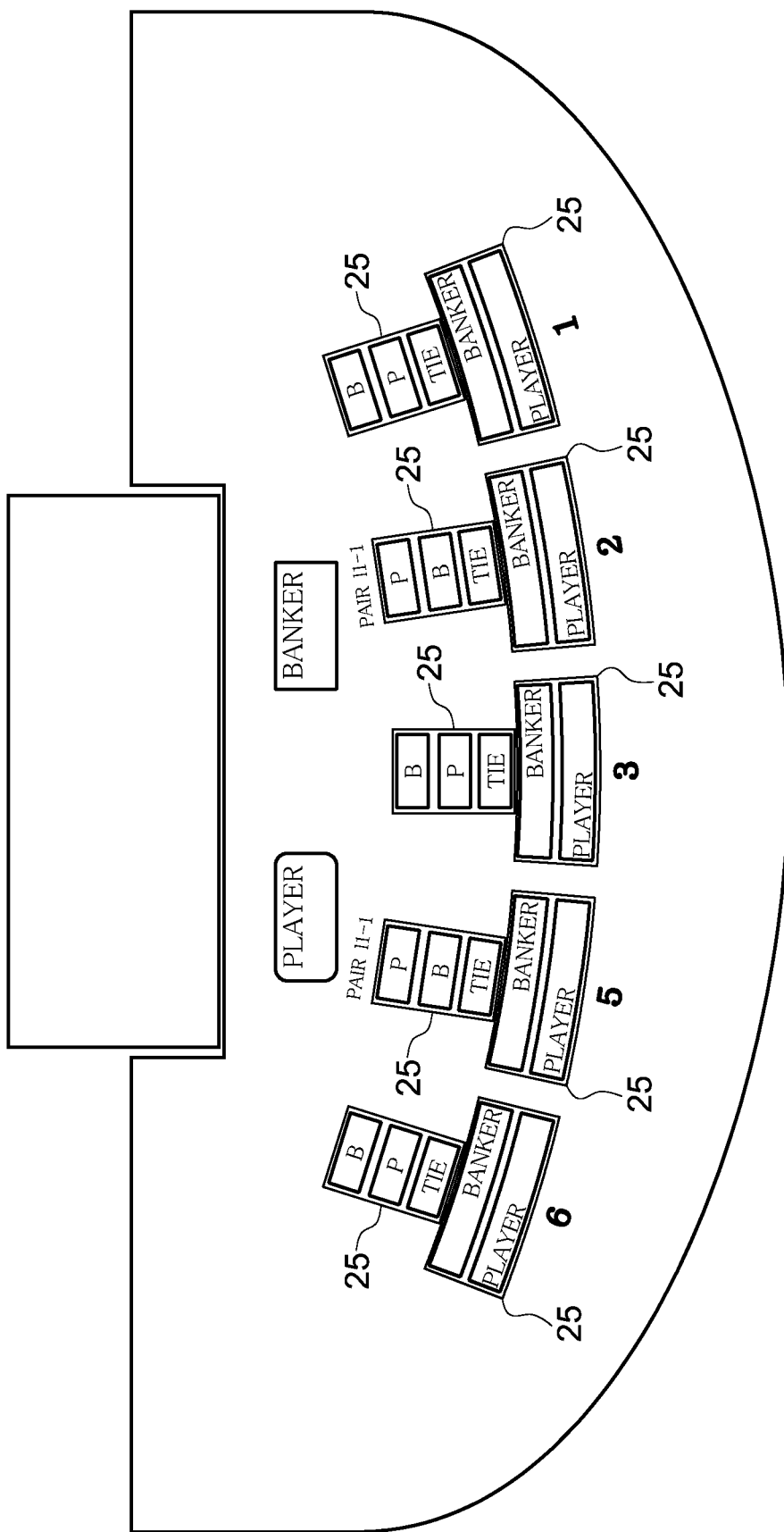
FIG. 18 is a diagram of a game table according to the other third embodiment.
Figure 19:
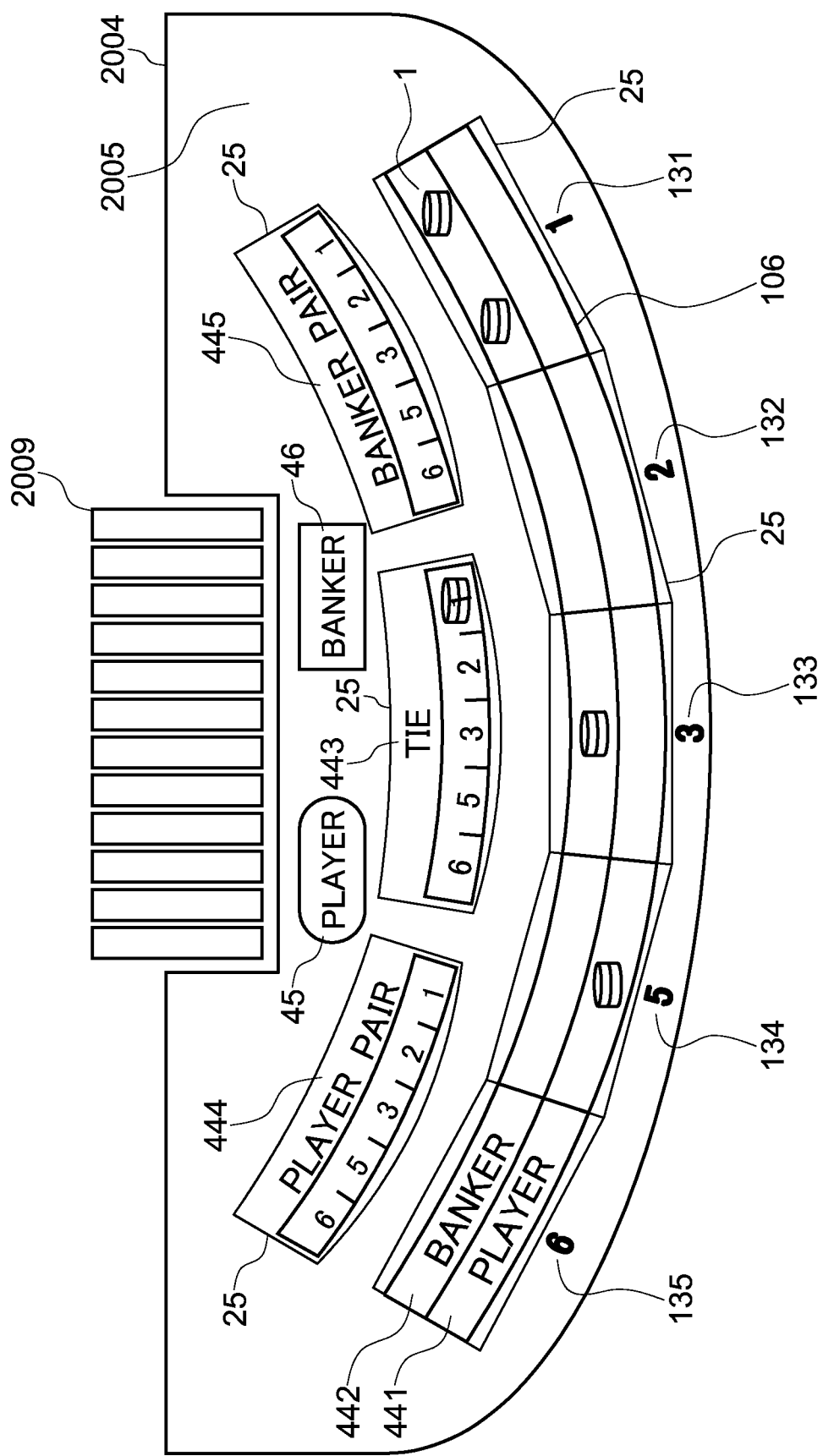
FIG. 19 is a diagram of a game table according to the other third embodiment.
Figure 22:
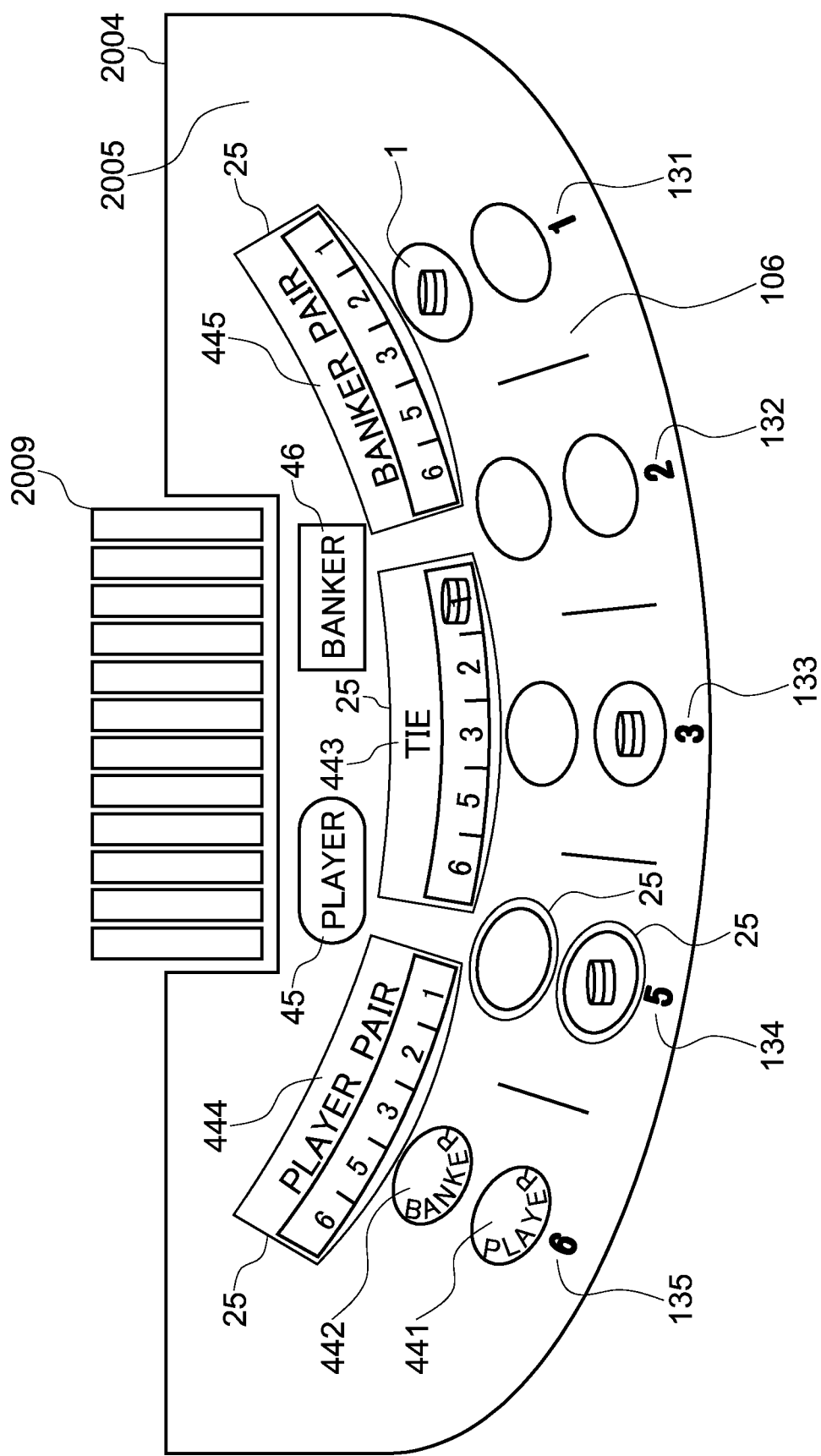
FIG. 22 is a cross-sectional view of the game token according to the third embodiment.

The chip reader 25 may use an entire betting area as one reading area for each sitting number as illustrated in FIG. 17, or may use, for each sitting number, a set of a player betting area and a banker betting area as one reading area, and a set of tie betting area, player pair betting area, and a banker pair betting area as one reading area as illustrated in FIG. 18. Further, as illustrated in FIGS. 19 and 22, each side betting area for a tie betting area, a player pair betting area, and a banker pair betting area may be treated as one reading area.

Figure 20:
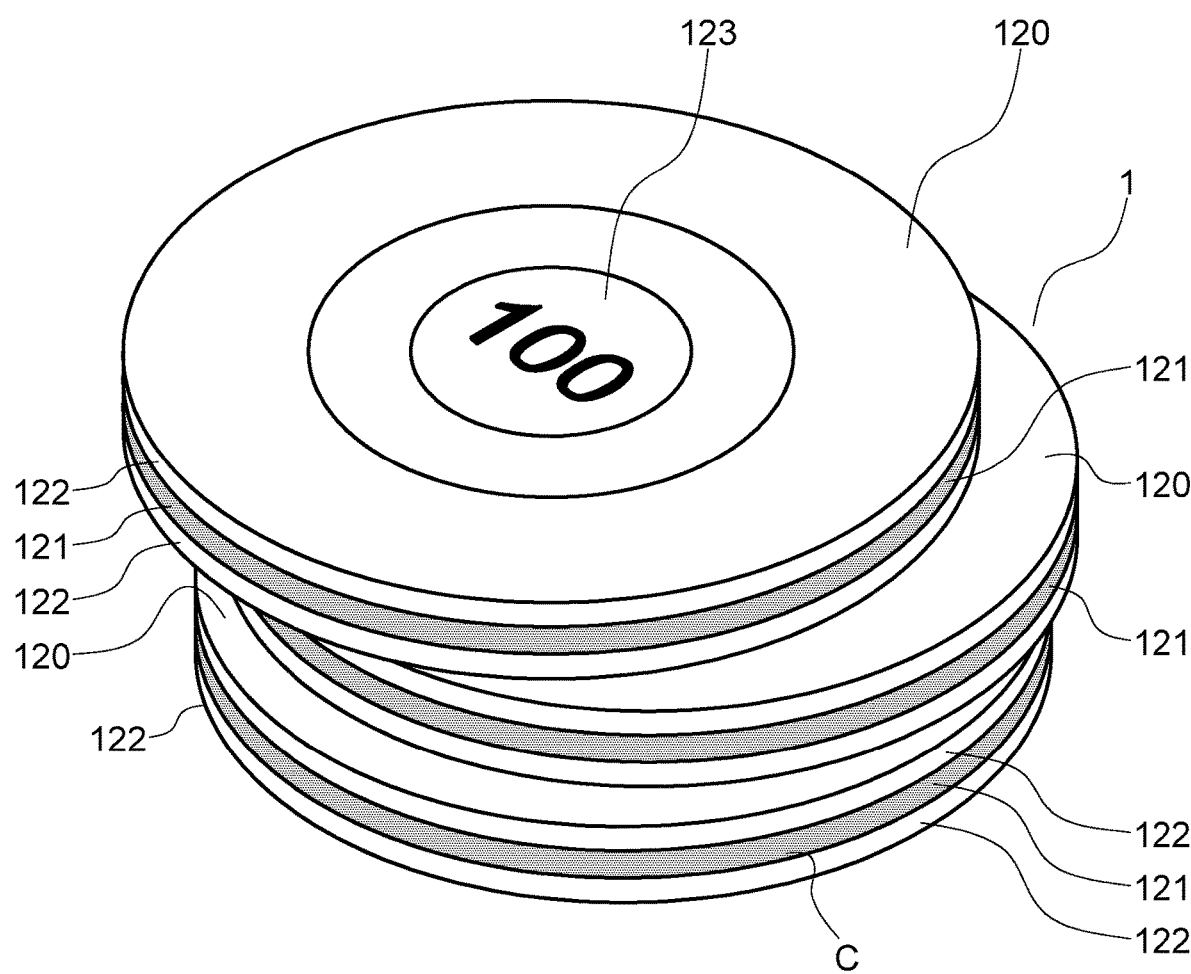
FIG. 20 is a perspective view of a game token according to the third embodiment.
Figure 21:
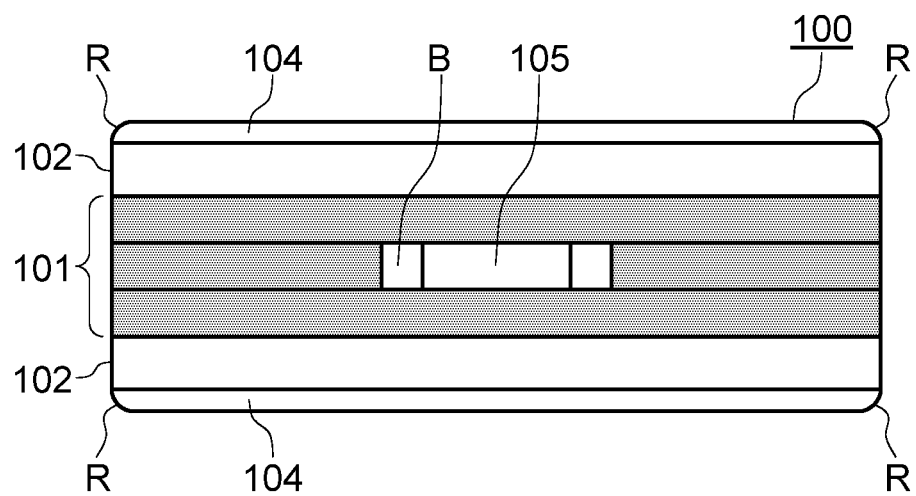
FIG. 21 is a cross-sectional view of the game token according to the third embodiment.

A game token 1 used in an embodiment will be described below. FIG. 20 is an external view of and FIG. 21 is a front sectional view of a game token 1 used in this system. The game token 1 has a multi-layer structure in which a plurality of plastic layers in different colors are laminated. The game token 1 includes at least an intermediate color layer 101 and white layers 102 or light color layers on both sides of the color layer 101. The light color layers, which are not illustrated, are required at least to be layers in color lighter than color of the color layer 101. With the multi-layer structure in which the intermediate color layer 101 and the white layers 102 or light color layers, which is not illustrated and required at least to be layers in color lighter than color of the color layer 101, on both sides of the color layer 101 are laminated, as illustrated in FIG. 20, to form a stripe pattern in a lamination direction on a side surface, and different colors (red, green, yellow, blue, or the like) are used for the color layer 101, a type (10 points, 20 points, 100 points, 1,000 points, or the like) of the game token 1 can be identifiable.

As illustrated in FIG. 21, the color layer 101 may be formed of a plurality of colored layers (FIG. 21 illustrates three layers). Because the plurality of the colored layers (three layers in FIG. 21) are thermally press-bonded to one another, three-layer structure is not visible as illustrated in FIG. 21 that illustrates the three layers for description. Furthermore, a bore B is partially provided in a middle of the three layers of the color layer 101, and RFID is embedded therein.

A structure of the game token 1 is not limited to a structure in which plastic is laminated, and may be similar to the color layer 101 in appearance.

A method for analyzing the game token 1 by the image analyzer 2012 will be described below in detail. The image analyzer 2012 analyzes an image recorded on a recorder 11 and recognizes at least two colors, which are a specific color 121 that is at least partially attached to the game token 1 and a reference color R that is present in the image and is different from the specific color 121. Note that the specific color 121 is at least partially provided to a predetermined position of a game token 1 or in a predetermined form. For example, the specific color 121 may be provided as the color layer 101, may be provided on a side surface of the game token 1 in a circumferential direction, or may be provided on a surface of the game token 1 as a predetermined mark. Further, the reference color R may be, for example, a color of a specific area of the game table 2004, or may be a color attached to a place different from the specific color 121 in the game token 1.

The image analyzer 2012 includes an artificial intelligence device 12a that identifies a specific color by, for example, deep learning technology, and determines the number and types of the game tokens 1 placed on the game table 2004. A recognition device 12 may further determine a position of the game token 1 on the game table 2004.

The image analyzer 2012 acquires a plurality of images of the game token 1 and reference color R, which are irradiated with different illuminances, learns the acquired images and a correct specific color 121 and reference color R of the game token 1 in each image as teaching data by teaching from a human, and creates a learning model 13a (recognition program). Note that a relative relation of the specific color 121 and the reference color R can be acquired, because in the images of the game token 1 and the reference color R irradiated with an illuminance of the same condition, the specific color 121 and the reference color R are irradiated with the same illuminance. For example, this relative relation may be used for recognition of the specific color 121.

Further, without using artificial intelligence, a chip recognition device 12 may extract a center line C of the game token 1 with a method for measuring a feature of a shape, brightness, saturation, and hue in the images by using a result of an image analysis of the images captured by a camera 2002 and recorded as images.

Furthermore, the artificial intelligence device 12a is configured to recognize at least two colors of the specific color 121 and the reference color R, which is different from the specific color 121 in a peripheral image of a predetermined range around the extracted center line C, by analyzing the peripheral image, which is for example a range of eight pixels orthogonal to the center line as a center. Note that, the extracted peripheral image of the predetermined range around the center line C may be analyzed as is, or after image processing such as color emphasis and noise reduction so that the specific color 121 can be easily recognized.

In summary, the artificial intelligence device 12a of the recognition device 12 is an artificial intelligence device configured to extract the center line C from the image of the game token 1 and recognize at least two colors of the specific color 121 and the reference color R different from the specific color 121, which are in the peripheral image, by analyzing the peripheral image of the predetermined range around the center line C as a center, and taught, as teaching data, the plurality of peripheral images of the game token 1 and the reference color R irradiated with different illuminances.

In another embodiment, the controller 2014 further includes a function to determine at least one among whether or not: 1) in each game, there is transference of a chip from time of start of drawing cards or start of game operation by the dealer to time before display of a win/loss result of the game by a card distributor, 2) after an end of each game, there is transference of a chip by a person other than the dealer while the dealer is collecting the chips bet by a loser among the game participants, 3) after an end of each game, any chip has been added while the dealer is collecting a chip bet by a loser among the game participants, 4) after an end of each game, the dealer has paid to a position of a chip that a winner among the game participants has bet, and 5) after an end of each game, a winner among the game participants has taken a bet chip and a paid chip.

Further, the controller 2014 may be configured to determine at least one of 1) to 5) described above by detecting transference of hands of the dealer and game participant, transference of chips, or transference of the hands and the chips by using an analysis result from the image analyzer 2012.

As a feature function, the controller 2014 has functions described in 1) to 5) below to determine whether or not there is any wrong against a rule of a baccarat game: 1) In each game, the controller 2014 monitors, by information that the image analyzer 2012 obtains by using the camera 2002, whether or not there is transference of a game token 1 from time of a signal that starts drawing of cards obtained from the card distributor 2003, or time of start of game operation by the dealer 2005 pressing a start button 4s to time before display of a win/loss result of the game by the card distributor 2003; 2) After an end of each game, the controller 2014 monitors, by information that the image analyzer 2012 obtains by using the camera 2002, whether or not a loser 6 has wrongly taken a game token 1 while the dealer 2005 is collecting a game token 1 bet by a loser among game participants 2006; 3) After an end of each game, the controller 2014 monitors, by information that the image analyzer 2012 obtains by using the camera 2002, whether or not a person other than the dealer 2005 (winner or loser) has added a won game token 1W or has replaced the game token 1 to a winning position not bet while the dealer 2005 is collecting a game token 1 bet by a loser among the game participants; 4) After an end of each game, the controller 2014 monitors, by information that the image analyzer 2012 obtains by using the camera 2002, whether or not the dealer 2005 has correctly placed a won game token 1W for payment to a position of the game token 1 that a winner among the game participants 2006 has bet; 5) After an end of each game (the dealer 2005 operates the card distributor 2003 to display a win/loss result in a display lamp 13), the controller 2014 monitors, by information that the image analyzer 2012 obtains by using the camera 2002, whether or not a winner 6W among the game participants 2006 has taken a bet game token 1 and a paid game token 1W.

Note that, in the above embodiment, the image analyzer 2012 and the controller 2014 are devices having an artificial-intelligence utilization structure or deep-learning structure. Specifically, the image analyzer 2012 and the controller 2014 may analyze an image or perform various controls described above by using scale-invariant feature transform (SIFT) algorithm, a convolutional neural network (CNN), deep learning, machine learning, or the like. These technologies perform image recognition of a captured image to recognize an object included in the image. In recent years, in particular, deep learning technology using a multilayered neural networks has been used to recognize an object with high accuracy. This deep learning technology generally recognizes an object with high accuracy by, over a plurality of stages, layering in an intermediate layer between an input layer and an output layer of a neural network. Regarding this deep learning technology, a convolutional neural network, in particular, has drawn attention for having higher performance than a conventional object recognizing method based on an amount of image features.

In a convolutional neural network, a recognition object image to which a label is attached is learned, and a main object included in the recognition object image is recognized. If there are a plurality of main objects in a learning image, learning is performed by designating a region with a rectangle and attaching a label to an image corresponding to the designated region. Furthermore, in a convolutional neural network, it is also possible to determine a main object and position of the object in the image.

To further describe a convolutional neural network, an object recognition process involves extraction of candidate regions based on a local feature by performing edge extraction processing, or the like, on a recognition object image, input of the candidate regions to the convolutional neural network, classification of the candidate regions after extracting feature vectors, and obtainment of a classified candidate region with a highest degree of certainty as a recognition result. A degree of certainty is quantity indicating how much similarity of an object in an image learned together with a certain image region and a label is relatively higher than similarity of another class.

As described above, various embodiments have been described. However, it is needless to say that a device of the present embodiments may be modified by a person skilled in the art as appropriate within the scope of the preset disclosure according to a game to which the present disclosure is applied.

In order to solve the above-described conventional problem, a game token management system according to an embodiment has a configuration in which: a single RFID tag having a data non-rewritable area and a data rewritable area is attached to a game token, the data non-rewritable area of the RFID tag stores, as fixed information, at least one of production information of the game token, product information of the game token, casino information, amount information of the game token, or a serial number of the game token, the data rewritable area stores, as variable information, location information of the game token, and the variable information stored in the data rewritable area can be extracted from the fixed information stored in the data non-rewritable area in an identical RFID tag, and the game token management system further includes: a writer that adds the location information of the game token to the data rewritable area, a reader that can collectively reads the fixed information stored in the data non-rewritable area of the plurality of game tokens and, on the basis of the read fixed information, can read the location information, which is a counterpart of the fixed information and stored in the data rewritable area, and a management controller that examines the location information obtained from the reader, in which the data rewritable area stores a plurality of pieces of location information including at least latest location information among all pieces of location information written by the writer, and the management controller includes a function to determine whether or not any abnormality is present in history of the location information obtained from the reader, and is configured to be able to, if there is abnormality, generate an error signal and identify the fixed information of the game token, which has been determined to be abnormal.

The data rewritable area is configured to store, together with the location information, information of time at which the writer writes to the game token, and the management controller is configured to determine, from the location information obtained from the reader, presence of abnormality by determining whether or not the game token has not been used for a predetermined period since last writing, or whether or not the location information, which is supported to be written, is not written.

In the management controller, the location information may include at least one of information indicating a cage, information indicating entry or exit, or information indicating a backyard, a situation where the game token has not been used for a predetermined period since last writing may be a situation where: 1) latest location information is information indicating a cage, and a predetermined period has passed before next information is written, 2) latest location information is information indicating entry, and a predetermined period has passed before next information is written, or 3) latest location information is information indicating exit, and a predetermined period has passed before next information is written, and a situation where location information, which is expected to be written, is not written may be a situation where: 4) at a time of entry to a gaming hall, information indicating exit is not written as latest location information in the data rewritable area of the game token, 5) at a time of use at the cage, information indicating a backyard is not written, or 6) at a time of exit from the gaming hall, information indicating a cage or a backyard is not written.

The location information may include information about an owner who owns the game token.

The management controller may have a function to determine, on the basis of the owner information obtained from the reader, presence of abnormality when: 1) a person different from a latest owner whose information is stored in the data rewritable area exchanges the game token for cash or another game token in the gaming hall, or exits the gaming hall, or 2) a person different from an owner at a time of exit whose information is stored in the data rewritable area brings the game token in the gaming hall.

The information about the owner of the game token may be identified by face authentication or ID card reading.

The location information may further include information indicating a place of a chip tray of a specific game table, information indicating a place of a betting area, or information indicating a payout area.

The management controller may have a function to determine, on the basis of information indicating location of the chip tray of the game table or information indicating a place of the betting area or of the payout area, which is obtained from the reader, presence of abnormality when: 1) a person different from a latest owner whose information is stored in the data rewritable area uses the game token at a game table, 2) a person different from the person who purchased a game token without a record of use at a game table attempts to exchange the game token at a cage, 3) a game token not including information indicating a cage or a backyard is used in the gaming hall, or 4) latest location information is information indicating a betting area or a payout area, and after a predetermined period has passed, the game token 1 is exchanged for cash at a cage or is used at a game table.

Information that the RFID tag has may be encrypted.

The data non-rewritable area may be configured to be functionally non-writable or locked to disable wiring of data.

The reader may be configured to collectively read the fixed information stored in the data non-rewritable area and location information stored in the data rewritable area, and the management controller may be configured to extract and determine, from the plurality of pieces of fixed information of the plurality of game tokens, which are obtained from the reader, the location information stored in the data rewritable area in an identical RFID tag.

In order to solve the above-described conventional problem, the game token according to an embodiment includes a single RFID tag having a data non-rewritable area and a data rewritable area, in which the data non-rewritable area stores, as fixed information, at least one of production information of the game token, product information of the game token, casino information, amount information of the game token, or a serial number of the game token, the data rewritable area is configured to store, as variable information, location information of the game token written by the writer, and configured to extract the variable information stored in the data rewritable area based on the fixed information stored in the data non-rewritable area in an identical RFID tag.

The game token may be configured to be able to collectively read the fixed information stored in the data non-rewritable area of the plurality of game tokens by a reader, and to read the location information stored in the data rewritable area on the basis of the read fixed information.

In order to solve the above-described conventional problem, the table game management system according to an embodiment includes: a game token to which an individually identifiable RFID is attached, a game table for playing a game by using the game token, a game recorder that records, via a camera, an image of a game token bet by each game participant of a game played at the game table, an image analyzer that performs image analysis on the recorded image of the game token, a chip reader that reads RFID attached to the game token bet by each game participant, and a controller that determines an image analysis result by the image analyzer and a reading result by the chip reader, in which the game table includes a plurality of betting areas including at least a player betting area and a banker betting area for each sitting number, the chip reader reads the game token regarding an entire betting area as one reading area for each sitting number, or reads the game token for each of a plurality of reading areas by dividing the entire betting area into a plurality of reading areas which are less than the number of betting areas, and the controller is configured to be able to determine types and the number of the bet game tokens separately for each betting areas including at least the player betting area and the banker betting area, on the basis of an image analysis result by the image analyzer, determine whether or not a total amount or the total number of the game tokens for each of the sitting numbers or for each of the reading areas based on an image analysis result by the image analyzer agrees with a total amount or the total number of the game tokens for each of the sitting numbers or for each of the reading areas based on a reading result by the chip reader, and output a determination result.

The controller may be configured to be able to output a sitting number with a determination result of disagreed amount or number.

The controller may be configured to be able to generate a signal that indicates a possibility that RFID attached to the game token is broken or RFID is not attached to the game token in a case where a total amount or the total number of the game tokens for each of the sitting numbers based on a reading result of the chip reader is smaller than a total amount or the total number of the game tokens for each of the sitting numbers based on an image analysis result by the image analyzer.

The controller may further be configured to be able to generate a signal that indicates a possibility of a reading error by the image analyzer reading the game token in a case where the total amount or the total number of the game tokens for each of the sitting numbers based on a reading result of the chip reader is larger than the total amount or a total number of the game tokens for each of the sitting numbers based on an image analysis result by the image analyzer.

The table game management system may include a database storing an ID of RFID attached to the game token, and the controller may be configured to be able to check an ID of RFID based on a reading result by the chip reader with an ID stored in the database, determine authenticity of the game token, and output a determination result.

The table game management system includes: a chip tray that keeps a game token used by a dealer at a game table, a chip tray determination device that can determine types and the number of the game tokens contained in the chip tray, and a game result determination device that determines a game result of each game at the game table, in which the controller may include: a calculation function that calculates income and outgo at a game table for a casino, at every collection and redemption for each game by using a measurement result of positions, an amount, and the number of game tokens based on a game result obtained from the game result determination device and an image analysis result by the image analyzer, a collection determination function that, after collection of lost chips bet by each game participant, compares an amount of chips at the game expected to be collected, which is calculated from positions, types, and the number of chips bet by each game participant at the game table, and the game result with an amount of actually collected chips in the chip tray, and determines whether or not there is a difference between the amount of the chips expected to be collected and the amount of the actually collected chips to determine whether or not there has been any wrong or an error with the collection of the game token, and a redemption determination function that performs redemption for a chip expected to be redeemed, compares, after the redemption, a total amount of chips expected to be in the chip tray based on an amount of the chips to be redeemed in the game, which is calculated from positions, types, and the number of chips bet by each game participant at the game table, and the game result, with an actual total amount of chips in the chip tray, and if having determined that there is a difference between the expected total amount and the actual total amount, determines that there has been a wrong or an error with the redemption.

The controller may be configured to identify the collected game token for each sitting number on the basis of information of an ID of RFID of the collected game token determined by the chip tray determination device and information of an ID of RFID of the game token read by the chip reader, compare, IDs, an amount, or the number of the identified game tokens with IDs, an amount, or the number of the game tokens expected to be collected for each sitting number, which has been determined by using a measurement result of positions, an amount, or the number of the game tokens based on a game result obtained from the game result determination device and an image analysis result by the image analyzer, and determine whether or not the IDs, an amount, or the number of the identified game tokens agrees with the IDs, an amount, or the number of the game tokens expected to be collected for each sitting number.

The controller may be configured to be able to determine, at each game, a type of the game token classified by application or purpose of use on the basis of information of ID of RFID of the game token read by the chip reader, and store, for each sitting number, an amount of the bet game tokens or an amount of the collected or redeemed game tokens by the type.

The controller may be configured to be able to store a cumulative amount of the game tokens bet by type or a cumulative amount of the collected or redeemed game tokens for each sitting number in a plurality of games.

A type of the game token may be at least a cash chip, a rolling chip, or a promotion chip.

The controller may be configured to be able to identify an owner on the basis of ID information of the rolling chip and store a cumulative amount of bet, collected, or redeemed rolling chip for each owner.

The chip reader may be configured to read the game token for redemption placed on the chip reader for each sitting number, and the controller may be configured to be able to compare an amount of redemption, which is determined by using a measurement result of a position, an amount, and the number of the game tokens based on a game result obtained from the game result determination device and an image analysis result by the image analyzer, with an amount of the game tokens placed for each sitting number, which is based on the reading result by the chip reader, determine whether or not the amount of the redemption agrees with the amount of the game tokens placed for each sitting number, and output a determined result.

Further, the controller may be configured to be able to display disagreement in a case where a determination result of the redemption disagrees, perform determination again in a case where there has been any change in amount of the game tokens placed on and read by the chip reader for each sitting number, and output agreement or disagreement again.

The controller may be configured to be able to compare an amount of the game tokens placed for redemption for each sitting number with increase or decrease in amount of the game tokens in the chip tray from before redemption to after the redemption and determine whether or not there is a difference.

The chip reader may include a payment confirmation area, which is arranged on a dealer side of the betting area, for placing the game token for redemption.

The table game management system may further include a game participant identification unit using a face authentication system or a player ID card, and the controller may be configured to be able to associate the sitting number with information of the game participant identified by the game participant identification unit.

A display unit that displays based on output of the controller may be included.

The game table may include a side betting area, in which the side betting area may be adjacently provided with a betting area for each sitting number, the chip reader may be able to collectively read at least one side betting area, and the controller may be configured to be able to determine types and the number of the game tokens bet at least one side betting area on the basis of an image analysis result by the image analyzer, determine whether or not a total amount or the total number of the game tokens in at least one side betting area based on an image analysis result by the image analyzer agrees with a total amount or the total number of the game tokens in the side betting area based on a reading result by the chip reader, and output a signal of a determination result.

Another embodiment is a table game management system including: a game token to which an individually identifiable RFID is attached, a game table for playing a game by using the game token, a game recorder that records, via a camera, an image of a game token bet by each game participant of a game played at the game table, an image analyzer that performs image analysis on the recorded image of the game token, a chip reader that reads RFID attached to the game token bet by each game participant, and a controller that determines an image analysis result by the image analyzer and a reading result by the chip reader, in which the game table includes a betting area including a player betting area, a banker betting area, and a side betting area, the side betting area is adjacently provided with a betting area for each sitting number, the chip reader is able to collectively read at least one side betting area, and the controller is configured to be able to determine types and the number of the bet game tokens separately for at least one side betting area on the basis of an image analysis result by the image analyzer, determine whether or not a total amount or the total number of the game tokens for at least one side betting area based on an image analysis result by the image analyzer agrees with a total amount or the total number of the game tokens of the side betting based on a reading result by the chip reader, and output a signal of a determination result.

The controller may be configured to be able to output the side betting with a determination result of disagreeing amount or number.

The controller may be configured to be able to generate a signal that indicates a possibility that RFID attached to the game token is broken or RFID is not attached to the game token in a case where a total amount or the total number of the game tokens for each side betting based on a reading result of the chip reader is smaller than a total amount or the total number of the game tokens for each side betting based on an image analysis result by the image analyzer.

The controller may be configured to be able to generate a signal that indicates a possibility of a reading error by the image analyzer reading the game token in a case where a total amount or the total number of the game tokens for each side betting based on a reading result of the chip reader is larger than a total amount or the total number of the game tokens for each side betting based on an image analysis result by the image analyzer.

The controller may include a database storing ID of RFID attached to the game token and may be configured to be able to check an ID of RFID based on a reading result by the chip reader with an ID stored in the database, and determine authenticity of the game token.

The controller may be configured to be able to identify the collected game token for each side betting on the basis of information of an ID of RFID of the collected game token determined by the chip tray determination device and information of an ID of RFID of the game token read by the chip reader, compare IDs, an amount, or the number of the game tokens expected to be collected for each side betting, which has been determined by using a measurement result of positions and an amount of the game tokens based on a game result obtained from the game result determination device and an image analysis result by the image analyzer, with IDs, an amount, or the number of the game tokens collected for each side betting, and determine whether or not a collecting amount agrees for each side betting.

The following is a description of the fourth embodiment of the present invention.

Figure 23:
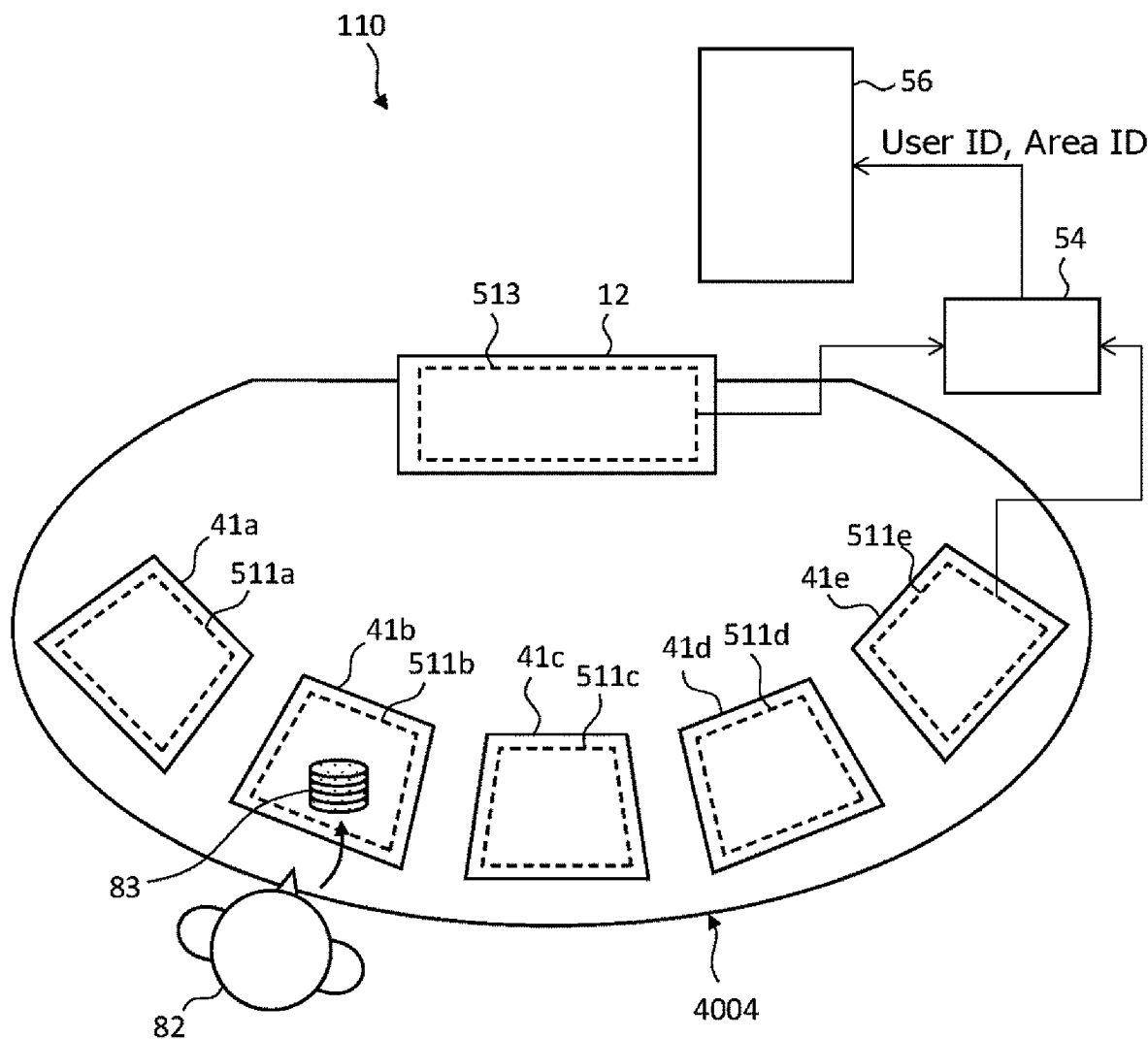
FIG. 23 is the configuration of the management system according to a first example of a fourth embodiment.

FIG. 23 shows the configuration of the management system of the first example of the fourth embodiment of the present invention. The management system 110 traces the holders of game tokens without using a database. For this purpose, the information of the holder is stored in the game token. The management system 110 has a roughly oval-shaped game table 4004. The player 82 is located on one side of the table (lower side in FIG. 23), and the dealer (omitted) is located on the other side. On the top surface of the game table 4004, betting areas 41a to 41e (hereinafter collectively referred to as "betting areas 41") are laid-out for each of multiple playing positions. Betting area 41 is an area for players 82 to bet by placing game tokens 83. A chip tray 12 is provided on the dealer position side of the game table 4004 for placing the dealer's game tokens 82.

The game token 83 has the same configuration as the game token in the form described above. The RFID tag 2 has a non-rewritable area 21 for storing the fixed information 3 and a rewritable area 22 for storing the variable information 4. The RFID tag 2 stores a chip ID (identification information) that uniquely identifies the game token 83 as unique information 3. The RFID tag 2 stores, as unique information 3, a chip ID (identification information) that uniquely identifies the holder of the game token 83 as variable information 4.

In addition, a common user ID is assigned to the casino or dealer, and when the game token 83 is owned by the casino (including when it is stored in the chip tray 12), the user ID indicating the casino or dealer is stored in the variation information 4.

In each of the betting areas 41a to 41e of the game table 4004, RFID antennas 511a to 511e (hereinafter collectively referred to as "RFID antennas 511") are provided. Specifically, the RFID antennas 511 are embedded under a raxa (woolen cloth) of the game table 4004, respectively, where the corresponding betting areas 41 are demarcated. RFID antennas 513 are also provided on the chip tray 12.

The RFID antenna 511 reads and writes data to the RFID tags 2 embedded in the game tokens 83 placed in the corresponding betting area 41. The RFID antenna 513 reads and writes data to the RFID tags 2 embedded in game tokens 83 placed on the chip tray 12.

The RFID antennas 511a-511e and the RFID antenna 513 are connected to the RF control device 54. In FIG. 23, only the line connecting antenna 511e and RF control device 54 is shown, and the line connecting antennas 511a-511d and RF control device 54 is omitted for the sake of clarity of the Figure, but antennas 511a-511d are also connected to RF control device 54 in the same way as antenna 511e. The RF control device 54 performs read and write control for each antenna. For this purpose, each antenna is assigned an area ID that uniquely identifies the area to be read and written by that antenna. When reading, the RF control device 54 performs reading periodically.

By referring to this area ID, it is possible to identify whether the game token 83 that is read is in the chip tray 12 or in the betting area 41, and for the betting area 41, it is also possible to identify which betting area 41a to 41e is for which playing position.

When reading, the RF control device 54 receives from each antenna the data read by that antenna, and also identifies which area the data was read in, i.e., the area ID. In addition, when writing, the RF control device 54 identifies the antenna to be written, i.e., the area ID, and transmits the data to be written. This allows the RF control device 54 to control reading and writing for each antenna individually.

Based on the data read at each antenna, the RF control device 54 outputs the user ID ("User ID" in FIG. 23) of the game token 83 and the area ID ("Area ID" in FIG. 23) of the area where the user ID was read. The management system 110 further has a management control device 56 connected to the RF control device 54. The management control device 56 receives the user ID and area ID from the RF control device 54, and specifies the user ID to be written on the RFID tag 2 to the RF control device 54.

As explained below, the user ID stored in the RFID tag 2 of the game token 83 is changed as the game token 83 is moved, but the RFID tag 2 stores not only the latest user ID but also the past user IDs as variation information 4. Therefore, by referring to this variation information 4, it is possible to examine the change in the holder of each game token 83. In the following explanation, expressions such as "rewriting the user ID" mean changing at least the latest user ID, and do not necessarily mean simultaneously erasing the information on past user IDs.

The management control device 56 updates the variation information 4 of the game token 83 based on the data (user ID and area ID) of the game token 83 received from the RF control device 54. The method of updating the variation information 4 is described below.

Figure 26:
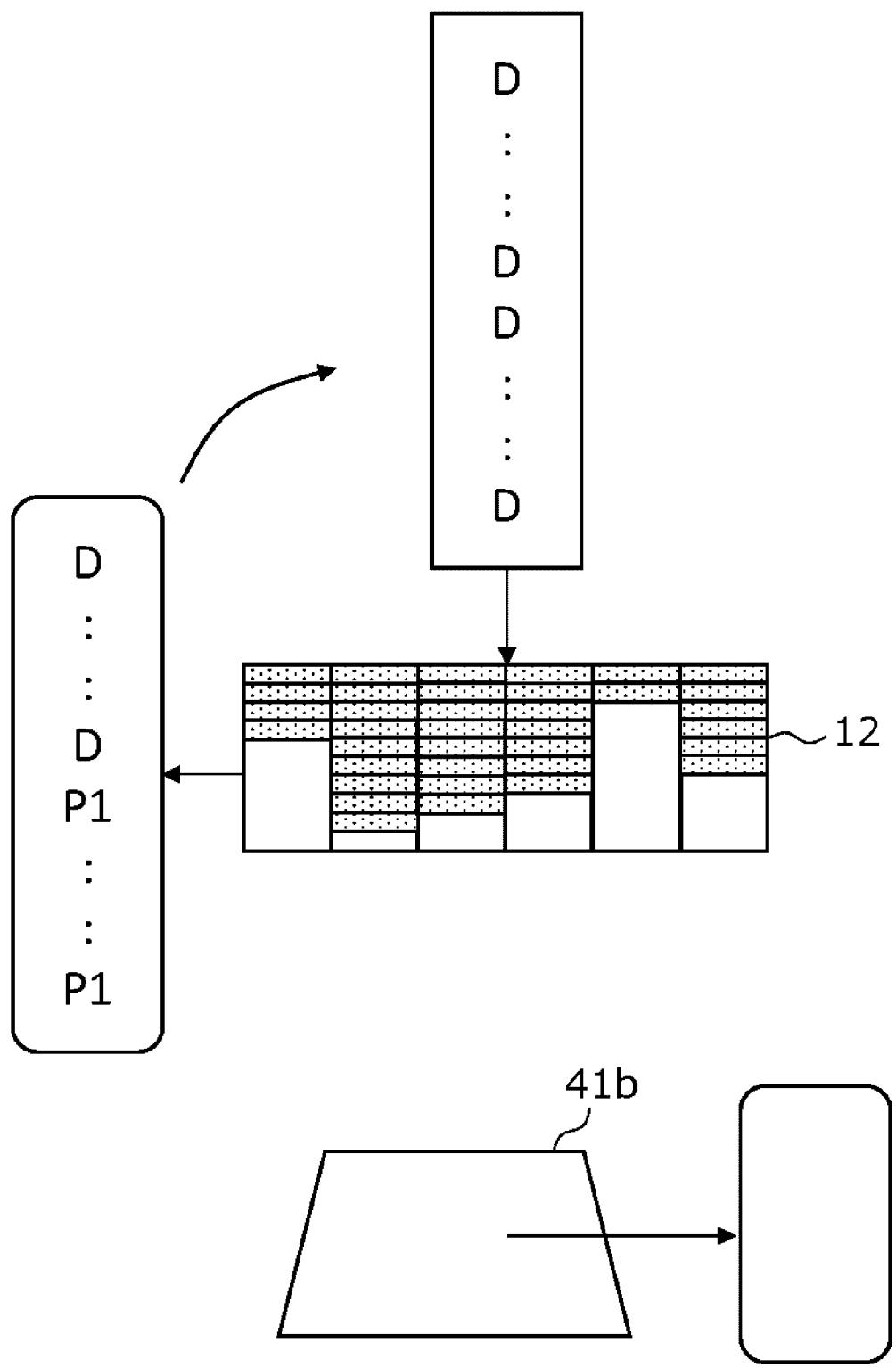
FIG. 26 illustrates an example of updating the variation information according to the first example of the fourth embodiment.

FIGS. 24-26 illustrate examples of updating the variation information. As shown in FIG. 24, a player bets game tokens 831 in the betting area 41b. The user IDs of the bet chips 831 and the area ID of its betting area 41b, obtained by reading the RFID tags 2 of the bet chips 831 (hereinafter referred to as "bet chip 831"), are input to the management control device 56.

At the stage of betting, as shown in FIG. 24, the same user ID (in the example of FIG. 24, "P1") is read from the betting area 41b, and the same ID (in the example of FIG. 24, "D" indicating that the holder is a casino or dealer) is read from the chip tray 12. If the player wins the game, the dealer pays out (redeems) the game tokens (hereinafter referred to as "payout chips 832") from the chip tray 12 to be placed next to the bet chips 831 in the betting area 41b, as shown in FIG. 25.

Then, "D" as well as "P1" will be read from the betting area 41b as the user ID. If there are two types of user IDs of game tokens 83 read from the same betting area 41, and one of them is "D" and the other one is the user ID assigned to the player, the management control device 56 changes the user IDs of all game tokens 83 in the betting area 41 to the user ID assigned to the player ("P1" in the case of FIG. 25). In this case, the same "P1" is further written as the latest user IDs in the bet chips 831 in which "P1" was stored as the user ID.

On the other hand, if the player loses the game, the bet chips 831 are collected by the dealer into the chip tray 12, as shown in FIG. 26. Then, "P1" as well as "D" will be read from the chip tray 12 as the user ID. If there is a user ID assigned to a player ("P1" in the example of FIG. 26) other than "D" in the user IDs of the game tokens 83 read from the chip tray 12, the management control device 56 rewrites the user IDs of all the game tokens 83 in the chip tray 12 to "D."

In addition, a collection float for temporarily storing the game tokens 83 collected in the chip tray 12 may be provided, and an antenna for the collection float may be separated from the antennas for other parts, so that the above process is performed only for the game tokens 83 collected in the collection float.

By the above process of the management control device 56, the user ID stored in the game token 83 is updated according to the change in the actual holder. In other words, in this embodiment, the user ID is stored in the RFID tag 2 of the game token 83 and the user ID is updated for the payout chip 832 so that it is the same holder as the holder of the bet chip 831. This makes it possible to trace the transition of the holder due to the game played on the game table 4004 without using the database or the player identification system described below, and without the management control device 56 having to keep track of the progress of the game (betting phase, game phase, and settlement phase).

When a player purchases a new game token 83, the player is identified using the player identification system described below, and the user ID of the casino or dealer is rewritten to the user ID of the identified player before the game token 83 is given to the player. In addition, when the player redeems the game token 83, the user ID of the game token 83 given by the player is rewritten to the user ID of the casino or dealer.

Figure 27:
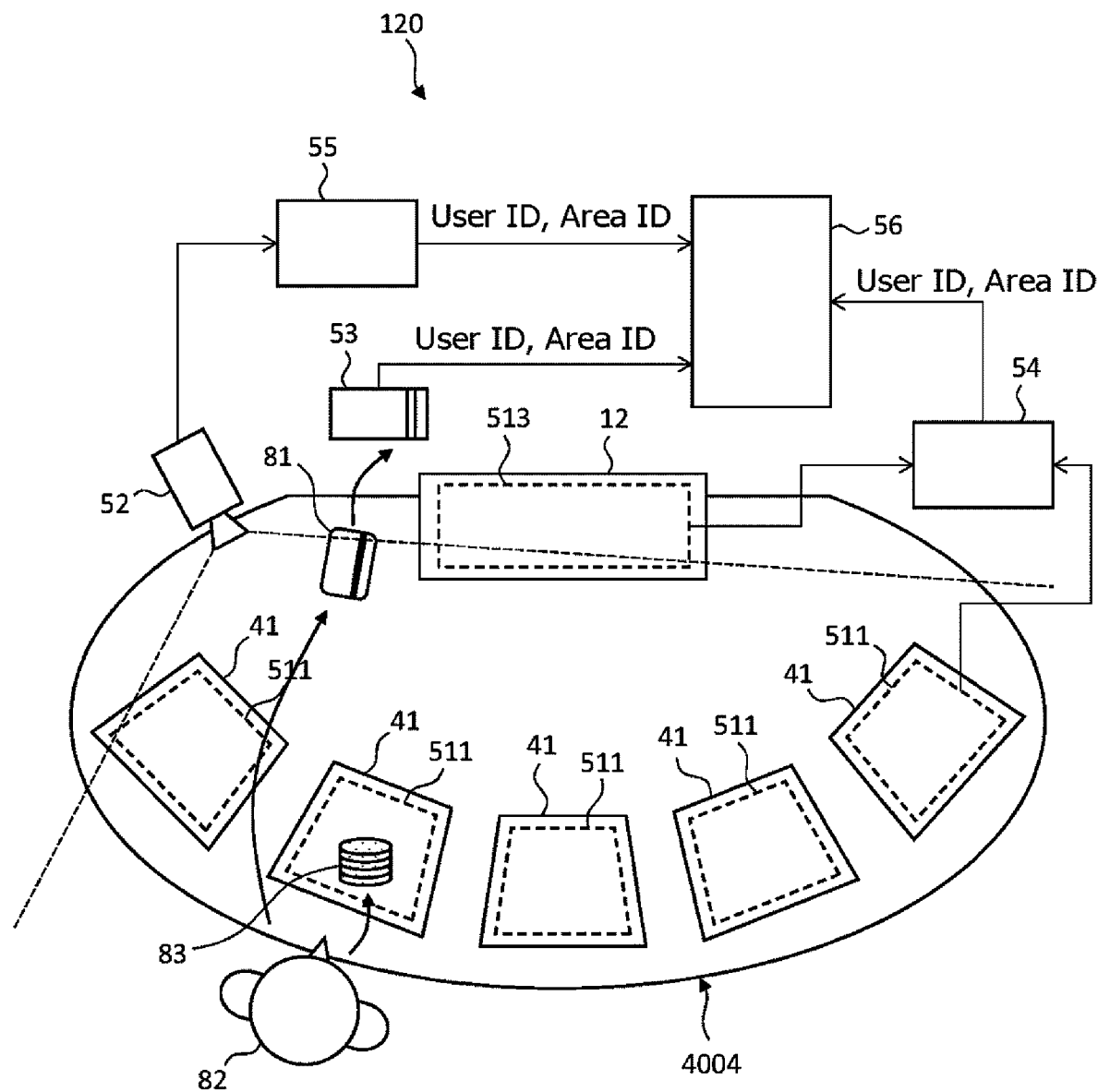
FIG. 27 shows the configuration of the management system according to a second example of the fourth embodiment.

FIG. 27 shows the configuration of the management system of the second example of the fourth embodiment. In the management system 120, a player identification system is introduced in addition to the configuration of the management system 110 of the first example. The player identification system may be either an image recognition system comprising a camera 52 and an image recognition device 55 or a card authentication system comprising a card 81 and a card reader 53.

The camera 52 photographs the face of a player 82 positioned in a playing position and outputs the image generated by the photographing to the image recognition device 55. The image recognition device 55 is equipped with a face recognition engine based on a neural network that has learned the face images of a plurality of pre-registered players 82 (hereinafter referred to as "members"). By inputting a face image from the camera 52 into the neural network, the image recognition device 55 identifies which of the registered members the input face image is. If the image from the camera 52 is not the face image of any of the registered members, the image recognition device 55 outputs the result that the face image is the face image of a non-member.

The image recognition device 55 also identifies the playing position of the member in question based on the position in the image where the face was recognized. The image recognition device 55 outputs the area ID ("Area ID" in FIG. 27) of the identified playing position along with the user ID ("User ID" in FIG. 27) of the member corresponding to the image from the camera 52. If the image recognition device 55 is unable to identify any of the members, it outputs "Unknown" as the user ID.

The card reader 53 scans the member's card 81 handed from the player 82 to the dealer, and reads the information stored in the member's card 81. The member's card 81 is a magnetic card on which a magnetic stripe is formed, and the magnetic stripe stores at least the user ID of the player 82 (member). When the dealer receives the member's card 81 from the player 82, the dealer scans the member's card 81 using the card reader 53 and inputs the playing position of the player 82 into the card reader 53. The card reader 53 outputs the user ID ("User ID" in FIG. 27) read from the member's card 81 and the area ID ("Area ID" in FIG. 27) of the playing position entered by the dealer.

The user ID and the area ID stored in the game token 83 and read using the antenna 511 are input to the management control device 56 from the RF control device 54, the user ID and the area ID identified based on the face image of the player are input from the image recognition device 55, and the user ID obtained by reading the member's card 81 and the area ID specified by the dealer are input from the card reader 53.

If the user ID read from the antenna 511, i.e., the user ID stored as the holder of the game token 83 that is bet in the betting area 41 and the user ID read from the member's card 81 or user ID identified by the image recognition device 55, i.e., the user ID identified by the player identification system do not match for the same area ID, the management control device 56 controls the RF control device 54 to rewrite the user ID stored as the holder in the variable area 4 of the game token 83 bet in the betting area 41 to the user ID of the player identified by the player identification system.

The RF control device 54 uses the antenna 511 to write the user ID of the player identified by the player identification system in the rewritable area 22 of the RFID tag 2 of the game token 83 placed in the betting area 41. At this time, the RF control device 54 also records in the writable area 22 that the user ID as holder information has been rewritten due to a mismatch in the user ID. This allows the casino or dealer to know that there has been a discrepancy in the holder by referring to the history of the change of the holder when the casino or dealer acquires the game token 83, and it is also possible to identify the player who was involved in such a discrepancy.

In the player identification system, only one of the identification of the player by the face recognition system and the identification of the player by reading the member's card 81 may be performed. In other words, the registered members do not necessarily have to be identified by the member's card 81 when they arrive at the playing position, in which case the player is identified only by the face recognition system. In such a case, the player is identified only by the face recognition system. Also, even if the player's face cannot be photographed properly and face recognition cannot be performed, the player may be identified by the member's card 81.

In addition, the player may be identified by both face recognition and the member's card 81. In this case, the user ID of the player identified by face recognition and the user ID of the player identified by the member's card 81 may differ. If the user ID of either of them matches the user ID read from the game token 83, the management control device 56 controls the RF control device 54 to write the user ID of the one that does not match the user ID read from the game token 83 in the writable area 22 of the game token 83. In the case of a player who has not been identified by the player identification system, the player identification system shall record the fact that there was a discrepancy in the identification of the player.

In this example, as in the first example, the user ID stored in the game token 83 is updated according to the actual holder. Furthermore, in this example, when the user ID of the player identified by the player identification system and the user ID stored in the game token 83 do not match, the discrepancy is corrected and the fact that there was such a discrepancy is recorded in the game token 83. Therefore, by referring to this record of the game token 83, it can be known that there has been a transfer of the game token 83 between players, and the player involved can be identified.

When redeeming a game token 83, if the user ID of a player (user who intends to redeem) identified by face recognition or a member's card 81 by using a player identification system described above differs from the user ID stored in the game token 83 to be redeemed, an alarm to notice such a discrepancy may be output and the operator may not approve the redemption.

Figure 28:
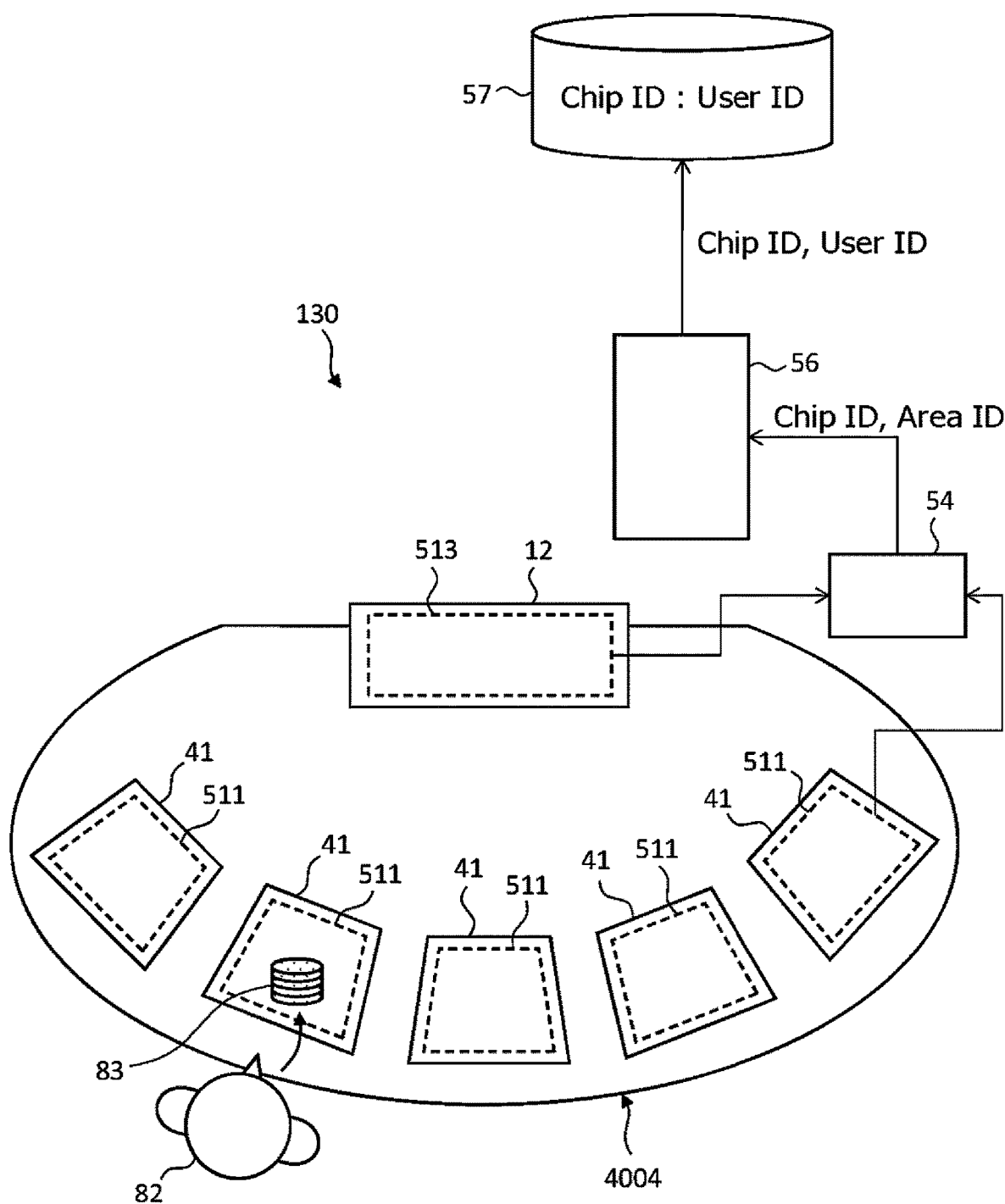
FIG. 28 shows the configuration of the management system according to a third example of the fourth embodiment.

FIG. 28 shows the configuration of the management system of the third example of the fourth embodiment. The management system 130 has a database 57 in addition to the configuration of the management system 110 of the first example. In the database 57, a chip ID ("Chip ID" in FIG. 28) that uniquely identifies the game token 83 and a user ID of a player who possesses the game token 83 are associated and stored. As described above, the holder changes as the game token 83 is purchased, used in games, and redeemed, and the history of past holders is recorded in the database 57. Therefore, by referring to the database 57, it is possible to know the change in the holder of each game token 83s.

In this example, the game token 83 need only have a non-writable area 21 and need not have a writable area 22. In other words, it is sufficient that the game token 83 has at least a chip ID stored in it. In addition, the RF control device 54 need not have the function of writing, and may be an RF reader having only the function of reading.

The management control device 56 updates the database 57 based on the data (chip ID and area ID) of the game token 83 received from the RF control device 54. The method of updating the database 57 is described below.

Figure 29:
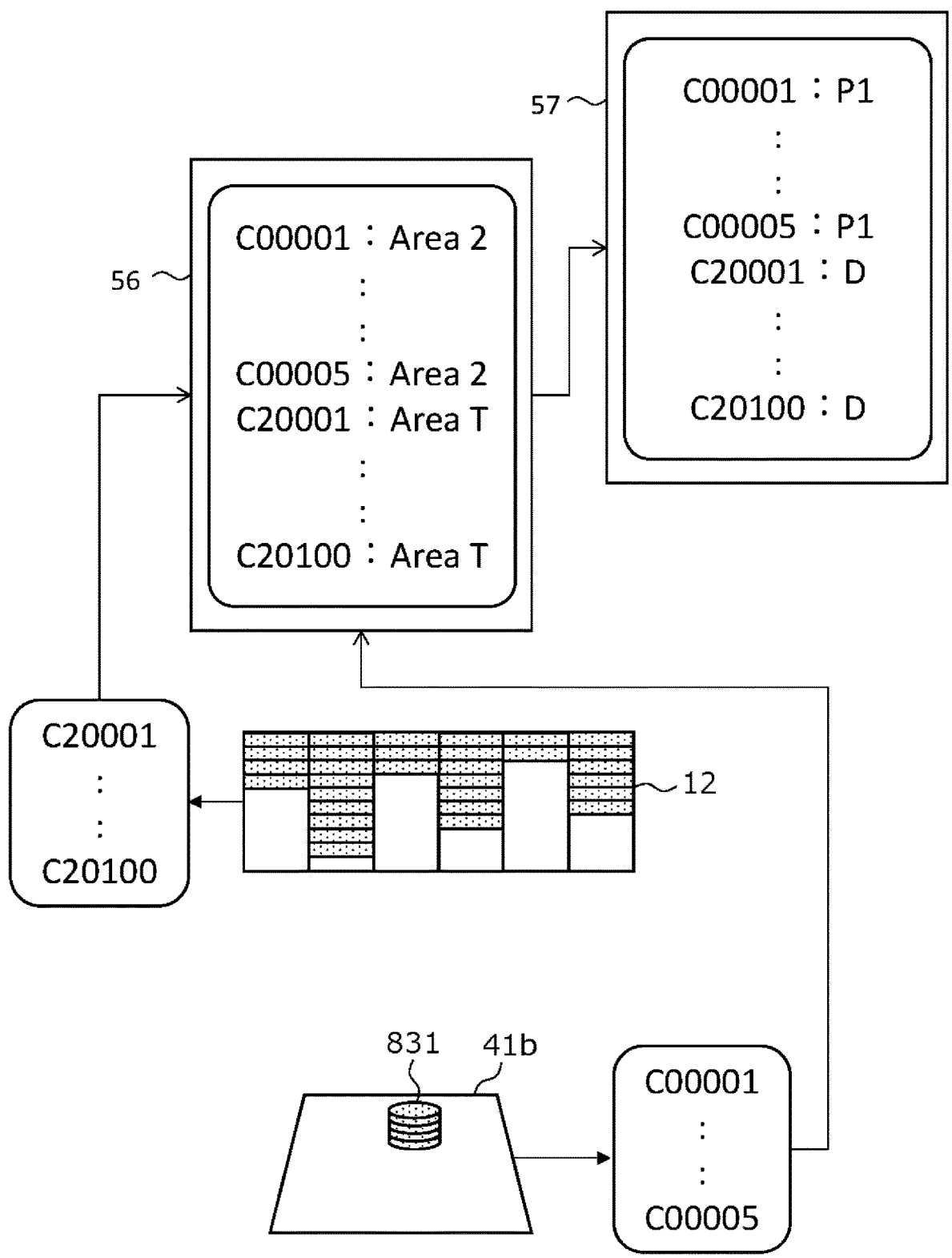
FIG. 29 shows an example of updating the database according to the third example of the fourth embodiment.
Figure 30:
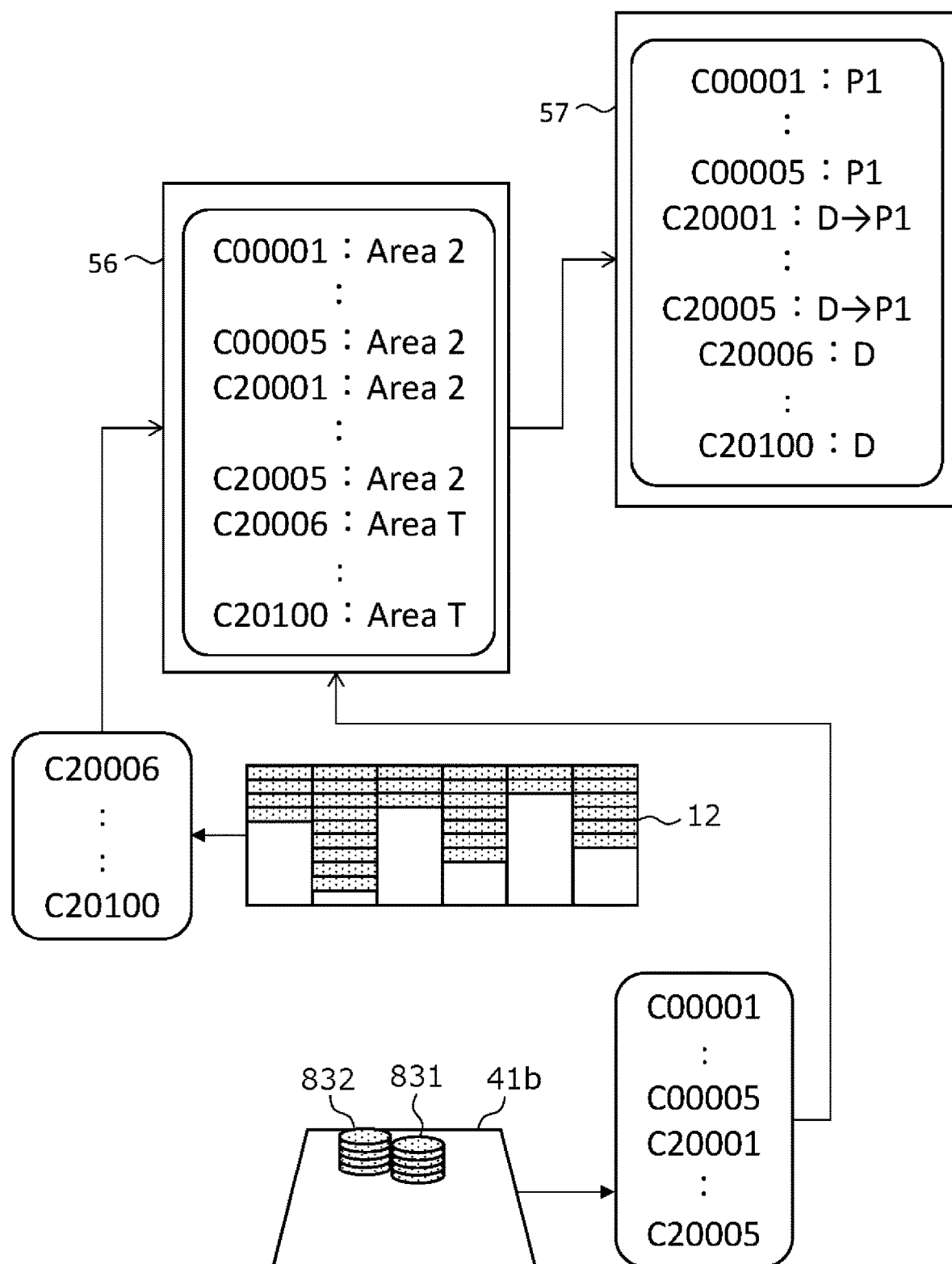
FIG. 30 shows an example of updating the database according to the third example of the fourth embodiment.
Figure 31:
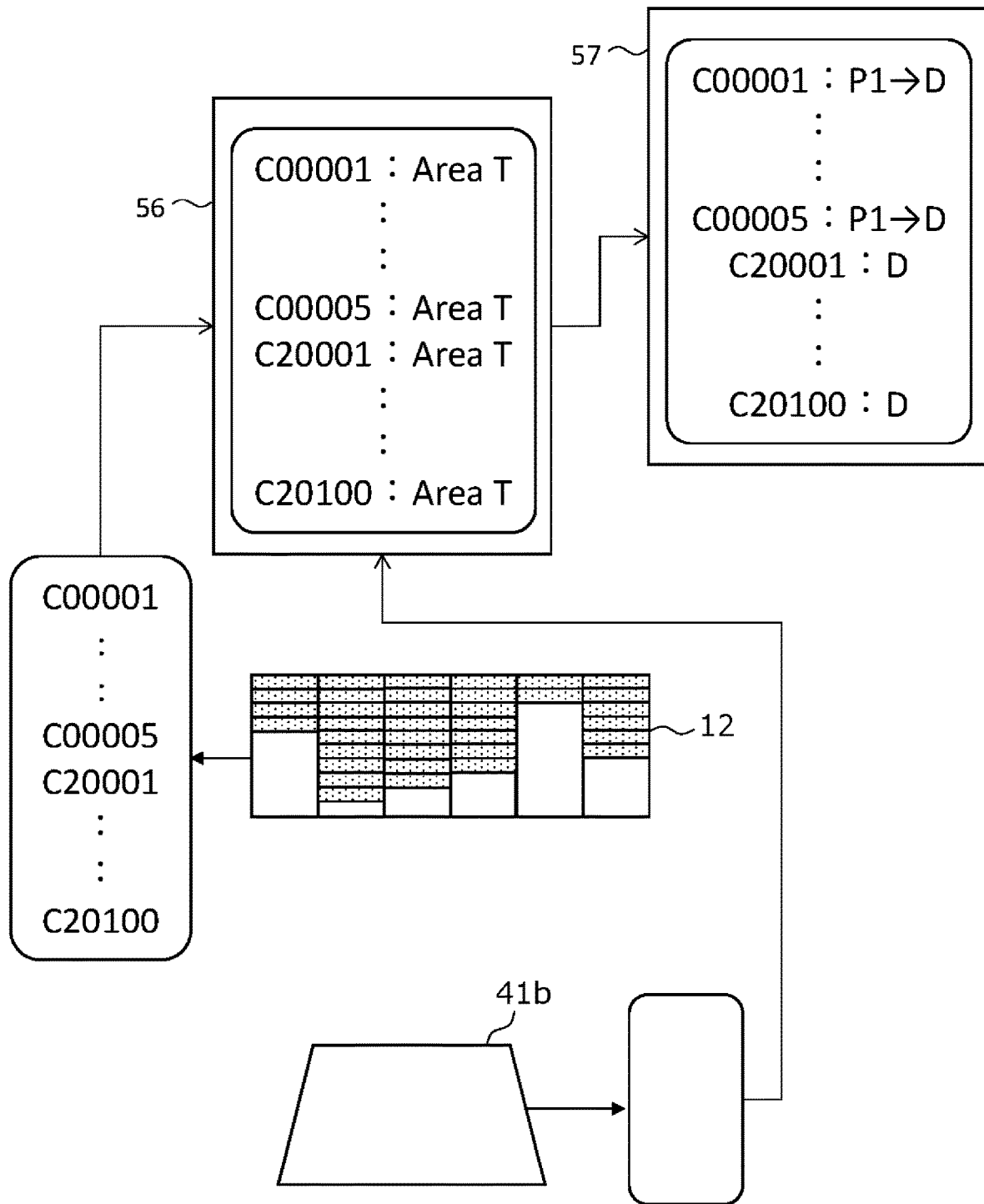
FIG. 31 shows an example of updating the database according to the third example of the fourth embodiment.

FIGS. 29 to 31 illustrate examples of updating the database 57. As shown in FIG. 29, a player bets 831 game tokens in the betting area 41b. The chip ID of the bet chip 831 and the area ID of the betting area 41b thereof, obtained by reading the RFID tag 2 of the bet chip 831 bet by the player in the betting area 41b, are input to the management control device 56.

At the stage of betting, as shown in FIG. 29, "C00001" to "C00005" are read from the betting area 41b as the chip IDs, and "C20001" to "C20100" are read from the chip tray 12 as the chip IDs. The RF control device 54 then outputs the pairs of the chip IDs read by the antennas 511 and 513 and the area IDs corresponding to the antennas 511 and 513 to the management control device 56. In the example of FIG. 29, the RF control device 54 obtains the combination of the chip IDs "C00001" to "C00005" and the area ID "Area 2," and the combination of the chip IDs "C20001" to "C20100" and the area ID "Area T" (area ID representing the chip tray 12), and outputs those to the management control device 56.

If this player wins the game, the payout chips 832 are paid out (redeemed) from the chip tray 12 by the dealer and placed next to the bet chips 831 in the betting area 41b, as shown in FIG. 30. Then, the RF control device 54 obtains the combination of the chip IDs "C00001" to "C00005" and "C20001" to "C20005" with the area ID "Area 2," and the combination of the chip IDs "C20006" to "C20100" with the area ID "Area T," and output those to the management control device 56.

The management control device 56 refers to the database 57 for all the read chip IDs to obtain the user ID associated with the chip ID. Then, the management control device 56 refers to the combination of chip ID and area ID obtained from the RF control unit 54 and updates the database 57 if the user IDs associated with multiple chip IDs with the same area ID are different from each other to make those user IDs the same user ID.

Specifically, if there is a player's user ID and a casino or dealer's user ID as the user IDs of multiple game tokens 83 read with the area ID of the same betting area 41, the management control unit 56 rewrites the casino or dealer's user ID to the player's user ID to unify the user IDs associated with the chip IDs paired with the same area ID.

On the other hand, if the player loses the game, the dealer collects the bet chips 831 in the chip tray 12, as shown in FIG. 31. The RF control device 54 reads the chip IDs "C20001" to "C20100" and "C00001" to "C00005" from the chip tray 12 as well as the area IDs "C20001" to "C20100" and "C00001" to "C00005. The RF control device 54 obtains pairs of these chip IDs "C20001" to "C20100" and "C00001" to "C00005" and the area ID "Area T" of the chip tray 12, and outputs those to the management control device 56.

The management control device 56 refers to the database 57 for all the read chip IDs to obtain the user ID associated with the chip ID. Then, the management control device 56 refers to the combination of chip ID and area ID obtained from the RF control unit 54 and updates the database 57 if the user IDs associated with multiple chip IDs with the same area ID are different from each other to make those user IDs the same user ID.

Specifically, if there is a player's user ID and a casino or dealer's user ID as the user IDs of multiple game tokens 83 read with the area ID of the same betting area 41, the management control unit 56 rewrites the player's user ID to the casino or dealer's user ID, thereby changing the user ID of all chip IDs associated with the area ID of the chip tray to the casino or dealer's user ID.

By the above process of the management control device 56, the user ID stored in the database 57 is updated according to the actual holder. In other words, in this embodiment, the database 57 is rewritten to unify the user IDs of game tokens 83 associated with different user IDs in the same area with one of the user IDs, depending on the area. Thus, without using the player identification system described above and without the management control device 56 having to keep track of the progress of the game (betting stage, game stage, and settlement stage), the transition of the holder due to the game played on the game table 4004 can be traced.

In the above example, the management control unit 56 determined that the chips those were read in the betting area 41 and whose user IDs was "D" in the database 57 are the payout chips 831, and rewrote its user ID to the player's user ID. Alternatively, the chip IDs of the payout chips 832 may be identified based on the difference in chip IDs read from the chip tray 12 before and after the payout.

For example, in the examples of FIGS. 29 and 30, before the payout, as shown in FIG. 29, chip IDs "C20001" to "C20100" are read from chip tray 12, whereas after the payout, as shown in FIG. 30, chip IDs "C20006" to "C20100" are read from the chip tray 12, as shown in FIG. 30. Therefore, the management control device 56 can determine that chip IDs "C20001" to "C20005" have been paid out based on the difference.

Fourth Example

Figure 32:
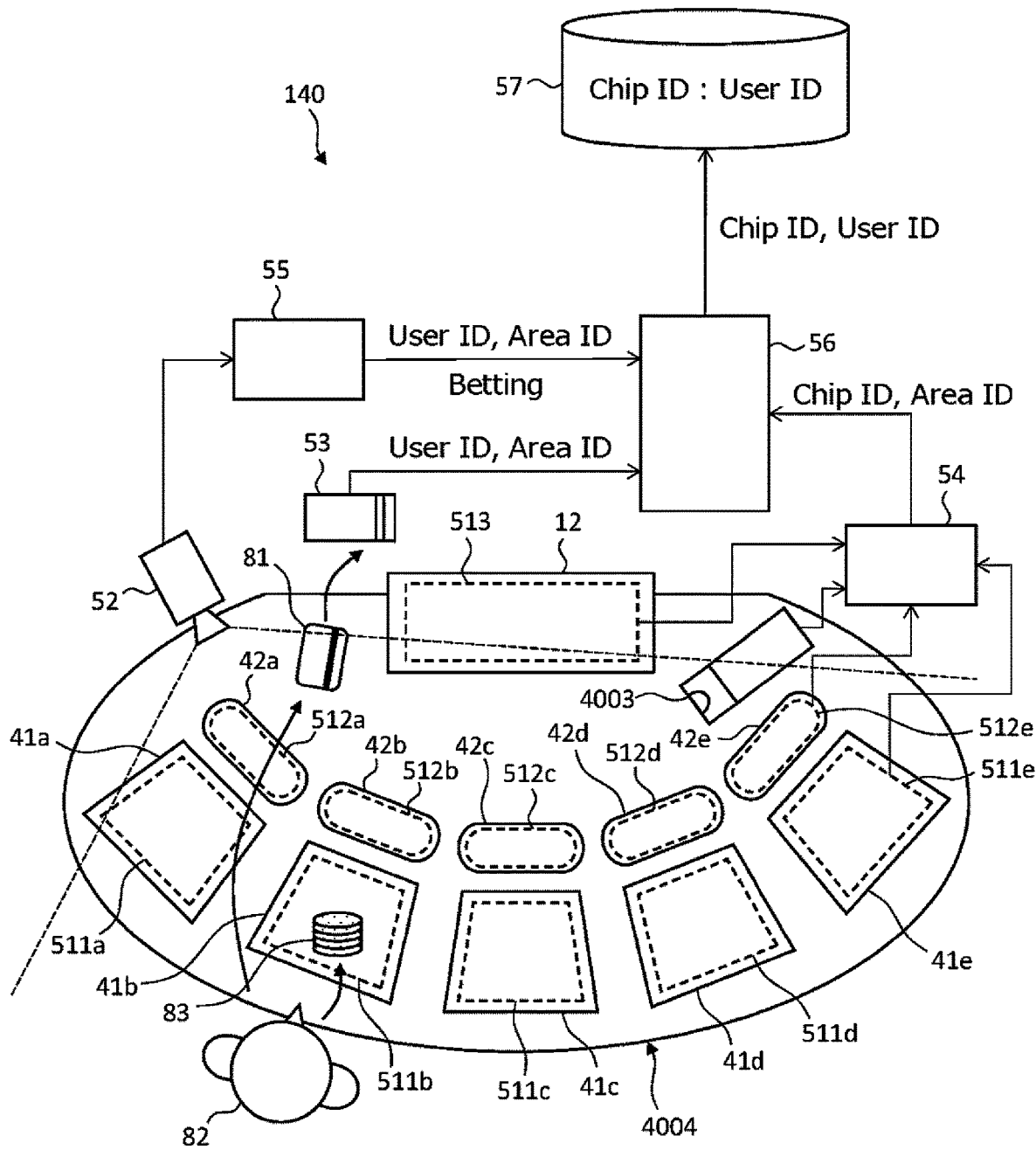
FIG. 32 shows the configuration of the management system according to a fourth example of the fourth embodiment.

FIG. 32 shows the configuration of the management system of the fourth example of the fourth embodiment. In addition to the configuration of the management system 110 of the first example, the management system 140 has a player identification system, a database 57, and a card distribution device (electronic shoe) 4003. In a game table 4004, pay areas 42a to 42e (hereinafter collectively referred to as "pay area 42") are provided on the dealer side from the betting area 41 of each playing position. In addition, antennas 512a to 512e (hereinafter collectively referred to as "antennas 512") are provided in pay areas 42a to 42e, corresponding to the respective areas.

When the dealer pays out (redeems) game token 83 to a player 82 who has won a game, the dealer positions the game tokens 83 taken from the chip tray 12 in the pay area 42 of the winning player 82 and then places it in the betting area 41 of that player 82.

The camera 52 in this example takes a picture of the player 82 as well as the bet chips 831 that have been bet in the betting area 41. The image recognition device 55 performs image recognition processing not only on the player's face but also on the bet chips 831 in the betting area 41, and recognizes which betting target (player, banker, tie, player pair, banker pair, etc.) the bet chips 831 in each betting area 41 have been bet on in the betting area 41. The system recognizes which bet chips 831 in each betting area 41 are wagered on which betting target (player, banker, tie, player pair, banker pair, etc.) in the betting area 41, and outputs the recognition result as the betting contents ("Betting" in FIG. 32).

A camera for capturing the face of the player 82 and a camera for capturing the bet chip 831 may be separate cameras. Also, an image recognition device for identifying the player based on the image of the player's face and the image recognition device for recognizing the bet contents based on the image of the bet chip 831 may be separate devices.

In this example, the card distribution device 4003 determines the progress of the game (i.e., whether the game is in betting, in game, or in settlement) and outputs it to the RF control device 54. The card distribution device 4003 determines that the game has started when the first card is drawn, and determines that the game has ended based on the reading of the drawn card according to the game rules of baccarat. The card distribution device 4003 also determines that the settlement has been completed and betting has started when the button for game start is pressed.

By reading at least the rank of the card drawn, the card distribution device 4003 determines the game outcome, such as player wins, banker wins, tie, player pair, banker pair, etc., according to the rules of the baccarat game.

The management control device 56 determines which playing position will receive a payout based on the bet details obtained from the image recognition device 55 and the game outcome obtained from the card distribution device 4003. The management control device 56 also obtains the user ID of the player for each playing position from the image recognition device 55 and the card reader 53, so it determines which player will receive the payout based on this information as well.

The RF control device 54 activates the antenna 512 of the pay area 42 to read and write to the RFID tag of the game token 83 when the game progress status received from the card distribution unit 4003 is under settlement.

The management control device 56 refers to the database 57, and if the user ID associated with the chip ID of the payout chip 832 read from the pay area 42 is a casino or dealer user ID, the user ID is replaced with the user ID associated with the chip ID of the bet chip 831 placed in the corresponding betting area 41.

When the dealer collects a losing player's bet chip 831, the antenna 512 in the pay area 42 may also read the chip ID of the bet chip 831, but in this case, the chip ID read in the pay area 42 will match the chip ID read in the corresponding betting area 41 immediately before it, therefore based on this, it is determined that the chip ID was read in the pay area 42 during collection, and the user ID of the game token 83 read in the pay area 42 should not be rewritten.

In this example, the management system 140 is described as having a player identification system, a database 57, and a card distribution device (electronic shoe) 4003. However, as in the first example, in a management system without the player identification system, the database 57, and the card distribution device (electronic shoe) 4003, the pay area 42 and the corresponding antenna 512 may be provided to update the user ID as in this example.

In the management system 140 of the present example, the pay area 42 is provided to read and write the RFID tag of the game token 83 separately from the betting area 41, so that the payout chip 832 paid out from the chip tray 12 can be read and written at a high speed. In other words, if the same antenna 512 as the bet chip 831 is used to read and write the payout chip 832 as in the first through third examples above, it is necessary to also read and write the bet chip 831 in order to read and write the payout chip 832, which takes time. However, since only the payout chip 832 needs to be read and written in the payout area 42, the reading and writing can be done in a relatively short time and does not interfere greatly with the game operation.

Fifth Example

Figure 33:
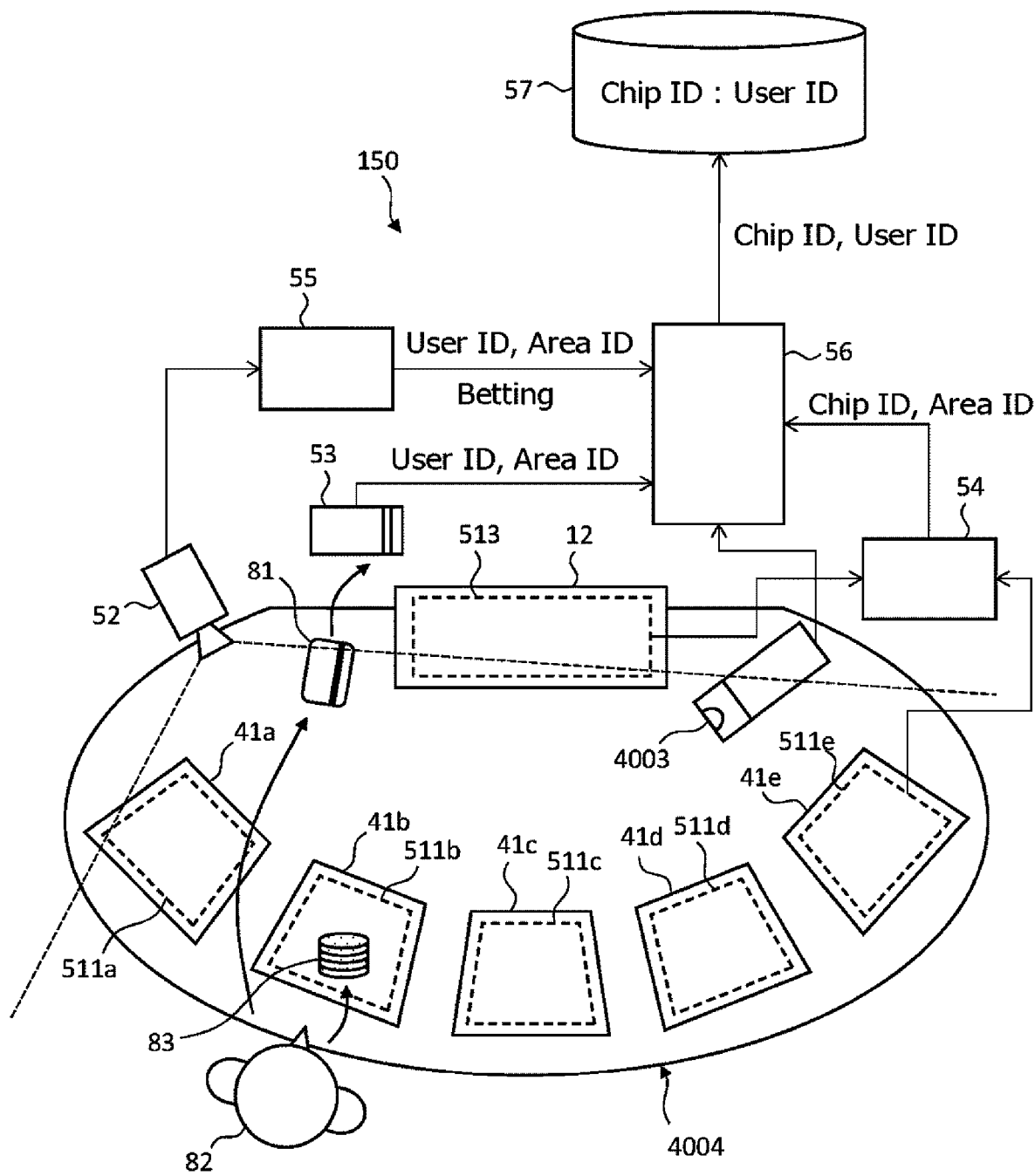
FIG. 33 shows the configuration of the management system according to a fifth example of the fourth embodiment.

FIG. 33 shows the configuration of the management system of the fifth example of the fourth embodiment. The management system 150 has the same configuration as the management system 140 of the fourth example shown in FIG. 32. That is, in addition to the configuration of the management system 110 of the first example, the management system 150 has a player identification system, a database 57, and a card distribution device (electronic shoe) 4003.

The camera 52 in this example captures the bet chips 831 bet in the betting area 41 as well as the player 82. The image recognition device 55 performs image recognition processing not only on the player's face, but also on the bet chips 831 in the betting area 41, and recognizes which betting target (player, banker, tie, player pair, banker pair, etc.) the bet chips 831 in each betting area 41 are placed on in the betting area 41. The system recognizes which bet chips 831 in each betting area 41 are placed on which betting target (player, banker, tie, player pair, banker pair, etc.) in the betting area 41, and outputs the recognition results as betting contents ("Betting" in FIG. 32).

A camera for capturing the face of the player 82 and a camera for capturing the bet chips 831 may be separate cameras. Also, an image recognition device that identifies the player based on the image of the player's face and an image recognition device that recognizes the bet contents based on the image of the bet chip 831 may be separate devices.

The card distribution device 4003 reads at least the rank of the cards drawn in sequence to determine the game outcome, including player wins, banker wins, ties, player pairs, and banker pairs, according to the rules of the baccarat game.

The management control device 56 determines which playing position will receive a payout (redemption) based on the bet details obtained from the image recognition device 55 and the game outcome obtained from the card distribution device 4003. The management control device 56 also obtains the user ID of the player for each playing position from the image recognition device 55 and the card reader 53, and thus determines which player will receive the payout (redemption) based on this information as well.

A pair of the area ID of the betting area 41 and the chip ID of the bet chip 831 read in the betting area 41 is input to the management control device 56 from the RF control device 54 for each betting area 41. As described above, the management control device 56 determines which playing position is to receive a payout, so it refers to the database 57 to obtain the user ID associated with the chip ID read at the playing position that is to receive a payout, and updates the user ID to be associated with the chip ID of the payout chip 832 with the obtained user ID.

The management control unit 56 recognizes the chip ID that is no longer read from the chip tray 12 due to payout as the chip ID of the payout chip 832. When there is a plurality of players who receive payouts, the dealer makes payouts in order from the end in a predetermined direction (for example, payouts are made in order from the right-hand end of the dealer to the left-hand end of the dealer). This makes it possible to determine to which playing position or player the payout chips 832 taken out of the chip tray 12 are to be paid out, even when there are multiple players to receive the payout.

In addition, since the management control device 56 can determine the playing position of the losing player, it updates the database 57 so that the user ID associated with the chip ID read from the betting area 41 of the playing position is "D" representing the casino or dealer.

As described above, in this example, the management control device 56 can determine which player or playing position's bet chips 831 will receive payouts and which player or playing position's bet chips 831 will be collected by ascertaining the betting contents and game outcomes. Since the management control unit 56 can also identify the chip IDs of those bet chips 831 and payout chips 832, it can change the user IDs associated with which chip IDs in the database 57 and determine which user IDs should be changed. This allows the tracing of the holder of the game tokens 83.

Sixth Example

Figure 34:
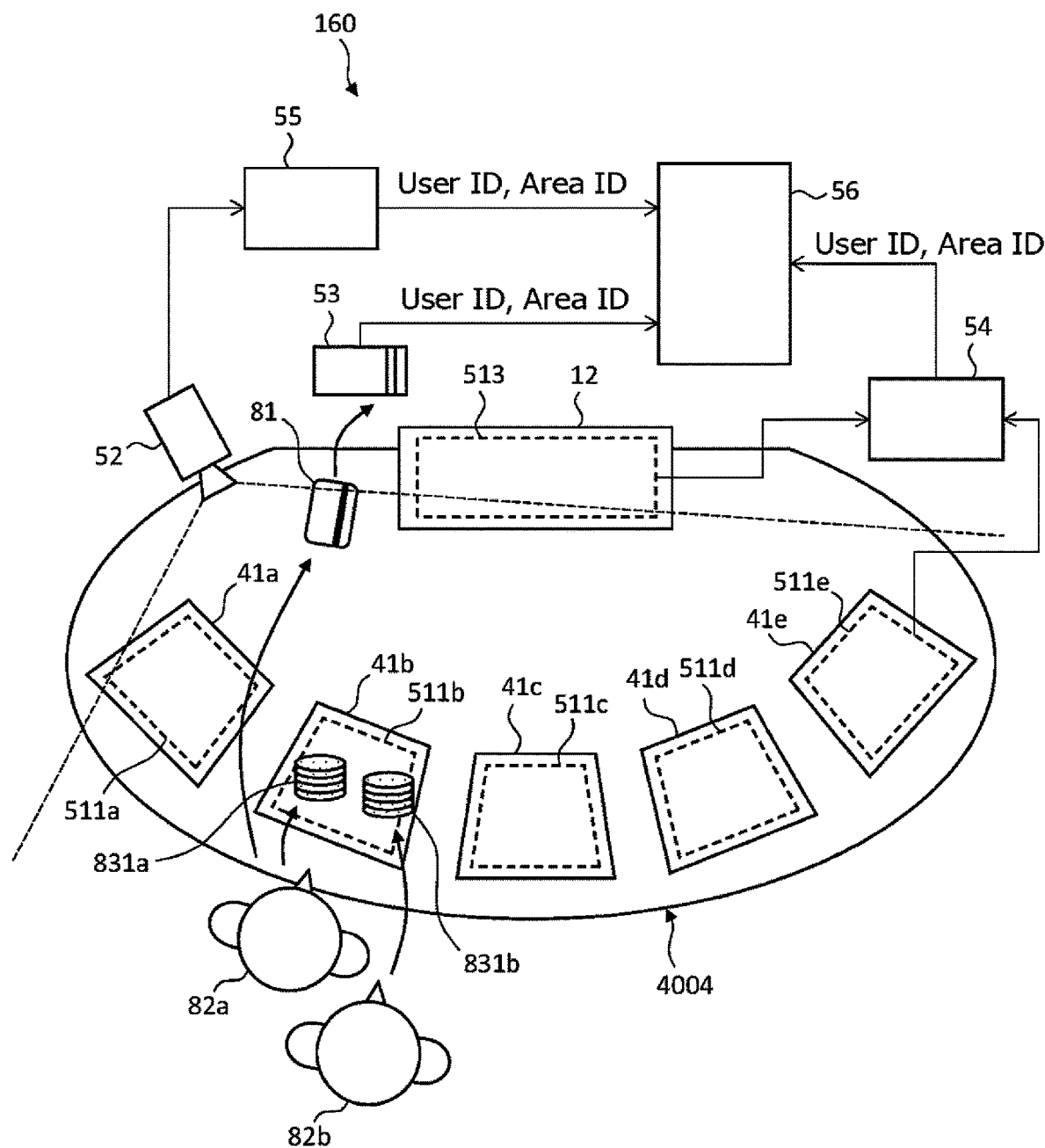
FIG. 34 shows the configuration of the management system according to a sixth example of the fourth embodiment.

FIG. 34 shows the configuration of the management system of the sixth example of the fourth embodiment. The management system 160 has the same configuration as in the second example. In baccarat, as described above, a plurality of playing positions are provided in the game table 4004, and a betting area 41 is provided for each playing position at a position corresponding to each playing position in the game table 4004. In principle, one player plays in one playing position.

However, if all the playing positions are filled, some players (back betting players) may appear from behind a player playing in a playing position (sitting player) and bet in the betting area 41 assigned to that sitting player, and some casinos or game tables 4004 allow this type of betting. The back bet will result in multiple game tokens 83 bets for the game with different user IDs in the same betting area. The management system 160 in this example allows tracing the holder of the game tokens 83 in such a case.

In the management system 160 of this example, as in the second example, the user ID of the game token 83 is stored in the rewritable area 22 of the RFID tag 2 of the game token 83, and no database is used. However, it has a player identification system that identifies the player.

In the example of FIG. 35, a bet chip 831a with user ID "P1" and a bet chip 831b with user ID "P2" are bet in the same betting area 41b. At this time, "P1" and "P2" are read from the betting area 41b as the user IDs of the game tokens 83.

FIGS. 36 to 38 illustrate examples of payouts when both players win the game. First, as shown in FIG. 35, a payout is made to the player 82a with the user ID "P1." At this time, the management system 160 is unable to distinguish whether the payout is made to the player 82a with user ID "P1" or to the player 82b with user ID "P2," and it is also unable to distinguish between multiple game tokens 83 for play in one betting area 41. The management control device 56 controls the RF control device 54 to rewrite the user ID to the selective information "P1 or P2" for all the game tokens 83 in the betting area 41*b*.

When the paid-out player 82*a* takes his own bet chip 831*a* and payout chip 832*a* from the betting area 41*b*, the betting area 41*b* remains with the bet chip 831*b* whose user ID is "P1 or P2," as shown in FIG. 37. The dealer confirms that the player 82*a* has taken the game tokens 83, and pays out the payout chip 832*b*, whose user ID is "D," to the bet chip 831*b*, as shown in FIG. 38. At this time, the management control device 56 controls the RF control device 54 to rewrite the user ID to "P1 or P2" for all game tokens 83 for play in the betting area 41.

As a result, players 82*a* and 82*b* who have placed bets in the same betting area 41 will both possess game tokens 83 with "P1 or P2" recorded as the user ID.

If these players 82*a* and 82*b* bet on the same betting area 41 using their game token 83 again, then both bet chips 831*a* and 831*b* will have "P1 or P2" recorded as the user ID. Alternatively, some betting chips may contain game tokens 83 whose user ID is "P1" or "P2." In these cases as well, when making a payout according to the game outcome, the management control device 56 controls the RF control device 54 to selectively write "P1 or P2" as the user ID of all game tokens 83 for play placed in the betting area 41 at the time of the payout.

When a bet chip 831 with a user ID of "P1 or P2" is collected in the chip tray 12, "D" representing a casino or dealer is written as the user ID.

Thereafter, if a player 82*a* or 82*b* alone bets in the betting area 41 a game token 83 in which the user IDs of a plurality of users are selectively recorded, and if the user ID of the player identified by the player identification system matches any of the selective user IDs, then the management control device 56 controls the RF control device 54 to rewrite the selective user ID of the game token 83 to the user ID matched.

For example, when a player 82*a* places a bet in the betting area 41 alone with the game token 83 in which "P1 or P2" is recorded as the user ID, the RF control device 54 reads the user ID "P1 or P2" from the bet chip 831 in the betting area 41, and the player identification system recognizes that the user ID of the player who placed the bet in the betting area 41 is "P1." In this case, since the user ID "P1" matches P1 in the "P1 or P2," the management control device 56 controls the RF control device 54 to rewrite the user ID of the bet chip 831 in the betting area 41 to "P1."

On the other hand, when a player who owns a game token 83 whose user ID is selectively recorded bets, and a player who has a user ID that is not in the selective player IDs bets in the same betting area 41 and receives a payout according to the game outcome, the user ID of the game tokens 83 is written to further include the user ID of that player in the choices.

For example, when a player 82*a* bets a game token 83 with "P1 or P2" recorded as the user ID in the betting area 41, and another player bets a game token 83 with "P3" recorded as the user ID in the same betting area 41, and the payment is made according to the game outcome, the management control device 56 controls the RF control device 54 to rewrite the user IDs of all the game tokens 83 including the payout chips in the betting area 41 to "P1, P2 or P3."

As described above, by allowing selective recording as the user ID, the present example allows tracing of the holder even when multiple players have bet on the same betting area. Furthermore, by using the player identification system, it is possible to definitively rewrite the selectively recorded user ID.

If multiple players are betting on the same betting area 41, and some players win and some players lose, the betting chips of the losing players will be collected first, since the betting chips of the losing players will be collected first, so "D" will be recorded as the user ID when the chip tray 12 reads the collected bet chips, and the above process can be performed for the payout chips 832 and the remaining bet chips to which the payout chips 832 are to be paid out.

Figure 39:
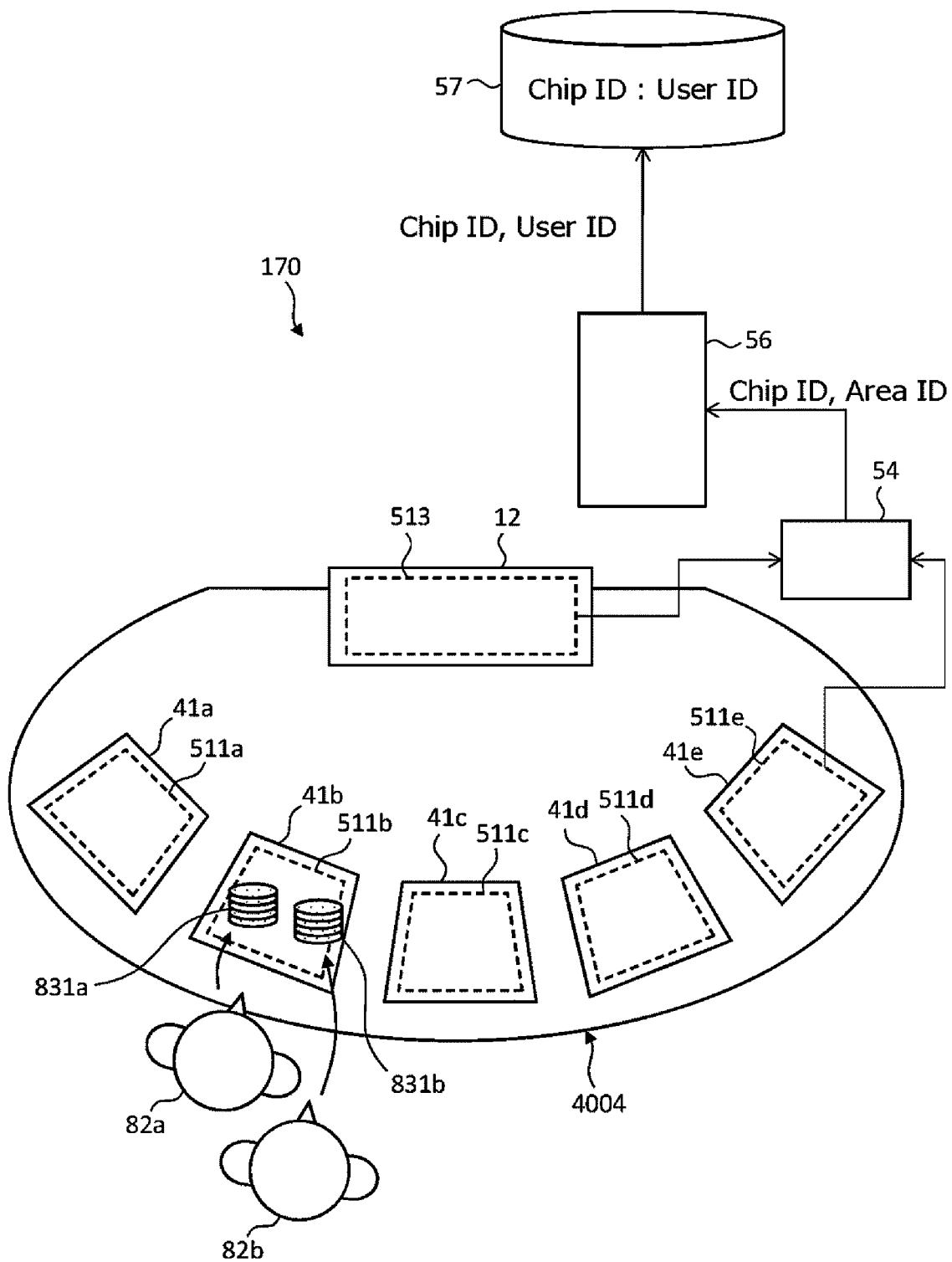
FIG. 39 shows the configuration of the management system according to a seventh example of the fourth embodiment.

FIG. 39 shows a configuration of the management system of the seventh example of the fourth embodiment. The management system 170 has the same configuration as the management system 130 of the third example. In the management system 170, it is also possible to trace the holder of the game tokens 83 even when multiple players bet on the same betting area 41.

Figure 40:
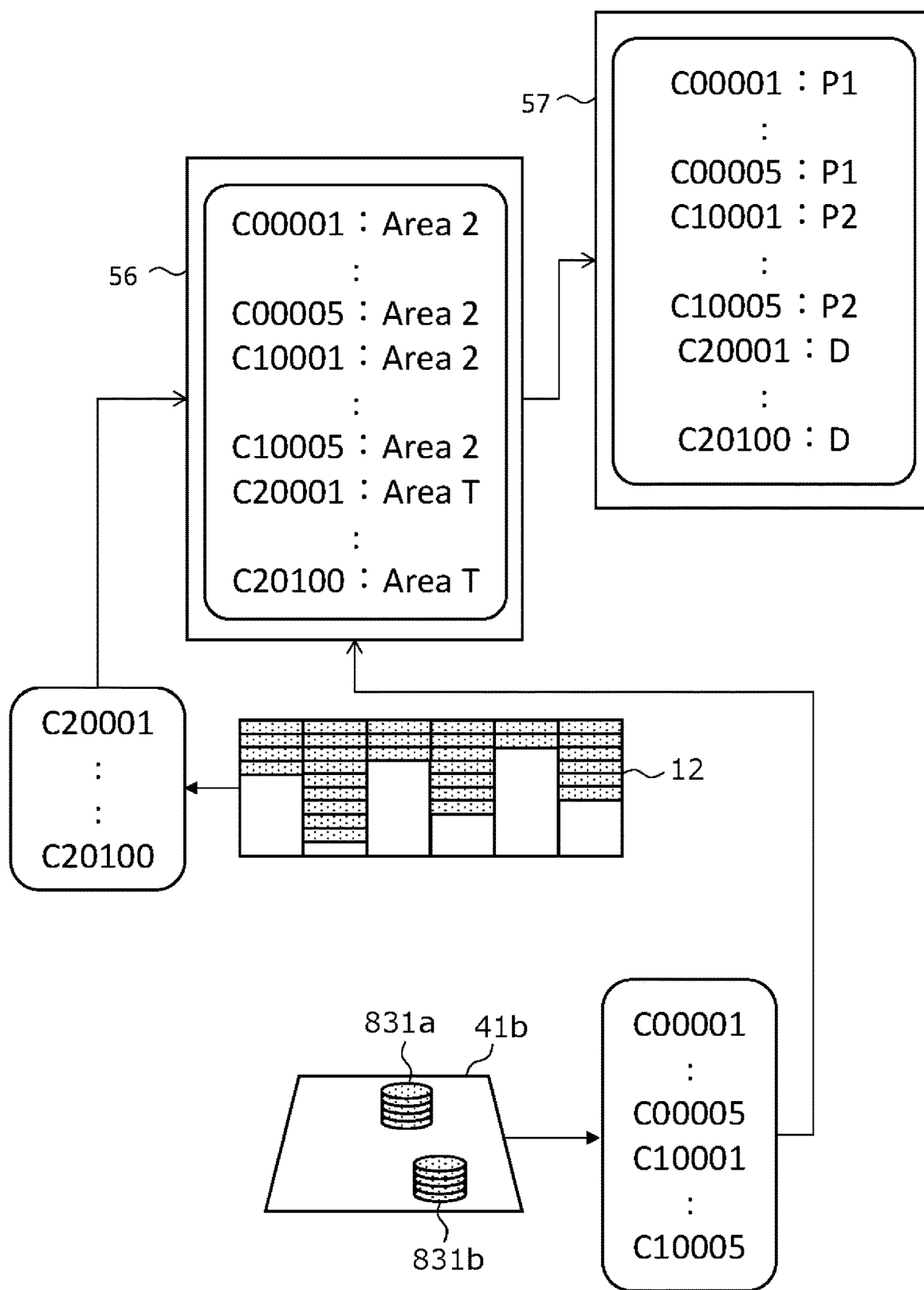
FIG. 40 shows an example of updating the database according to the seventh example of the fourth embodiment.

FIGS. 40 to 44 illustrate an example of updating the database 57. When a player 82*a* bets a bet chip 831*a* in a betting area 41*b* and a player 82*b* bets a bet chip 831*b* in the same betting area 41*b*, as shown in FIG. 40, in the RF control device 54, from this betting area 41*b*, as the user ID, the chip IDs "C00001" to "C00005" of the bet chips 831*a* and the chip IDs "C10001" to "C10005" of the bet chips 831*b* are read out from this betting area 41*b* and output to the management control device 56 as a combination with the area ID "Area 2" of the relevant betting area 41. In addition, the chip IDs "C20001" to "C20100" are read from the chip tray 12, and the combination with the area ID "Area T" of the chip tray 12 is obtained by the management control device 56.

As shown in FIG. 40, at this point, in the database 57, the chip IDs "C00001" to "C00005" are associated with the user ID "P1," the chip IDs "C10001" to "C10005" are associated with the user ID "P2," and the chip IDs "C20001" to "C20100" are associated with user ID "D."

Figure 41:
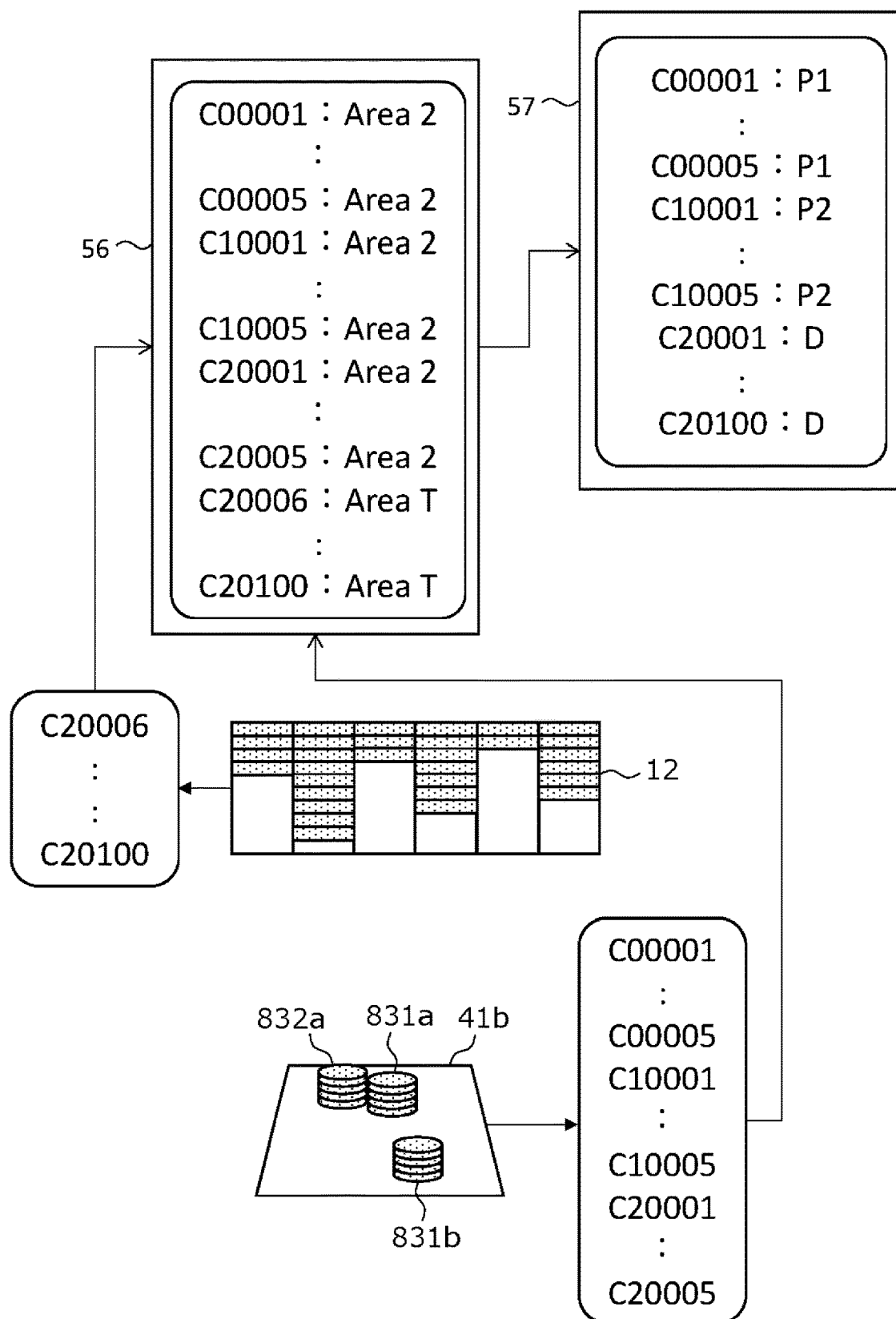
FIG. 41 shows an example of updating the database according to the seventh example of the fourth embodiment.
Figure 42:
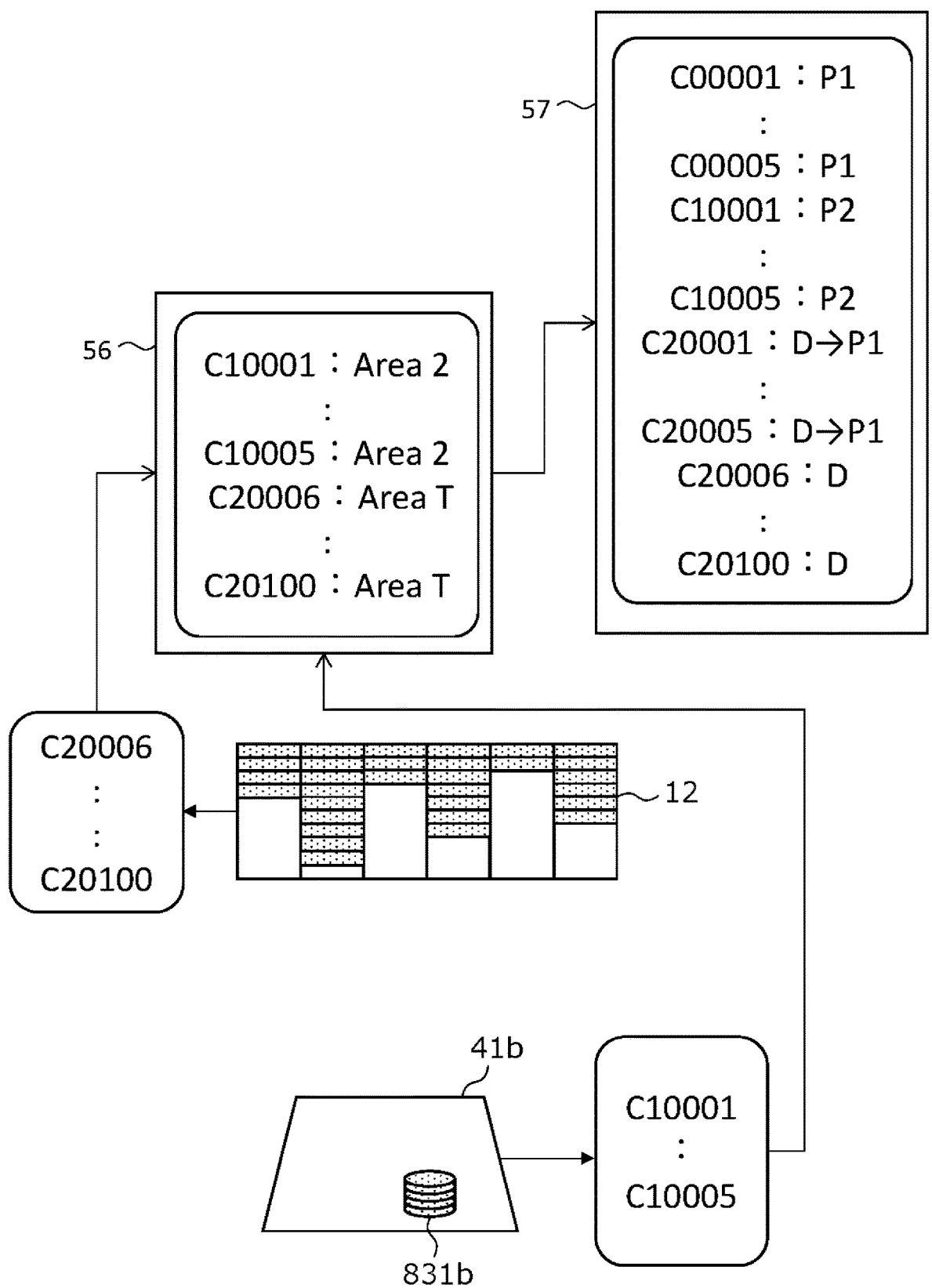
FIG. 42 shows an example of updating the database according to the seventh example of the fourth embodiment.

Assuming that both of these players 82*a* and 82*b* win according to the game outcome, a payout is first made by the dealer for either bet chip 831*a* or bet chip 831*b*, as shown in FIG. 41. At this time, in addition to the chip IDs "C00001" to "C00005" for bet chips 831*a* and "C10001" to "C10005" for bet chips 831*b*, the chip IDs "C20001" to "C20005" for payout chips 832*a* are read from the betting area 41*b* and output to the management control device 56 as a combination with the area ID "Area 2" of the betting area 41.

At this stage, the management control device 56 cannot yet determine whether the payout chip 832*a* has been paid out to the bet chips 831*a* with chip IDs "C00001" to "C00005" or to the bet chips 831*b* with chip IDs "C10001" to "C10005." Therefore, the database 57 is not updated.

Next, when the player 82*a* takes the bet chips 831*a* and the payout chips 832*a* that were paid out to the bet chips 831*a* from the betting area 41*b*, as shown in FIG. 41, only the chip IDs "C10001" to "C10005" of the remaining bet chips 831*b* are read from the betting area 41*b*. Based on this change, the management control device 56 determines that the payout chips 832*a* with chip IDs "C20001" to "C20005" read from the betting area 41*b* have been paid out for the bet chips 831*a* with chip IDs "C00001" to "C00005" and stores them in the database 57 is rewritten from "D" to "P1," i.e., from "D" to the user ID associated with the bet chips 831*a* that were removed from the betting area 41*b* along with the payout chips 832*a* with chip IDs "C20001" to "C20005."

Figure 43:
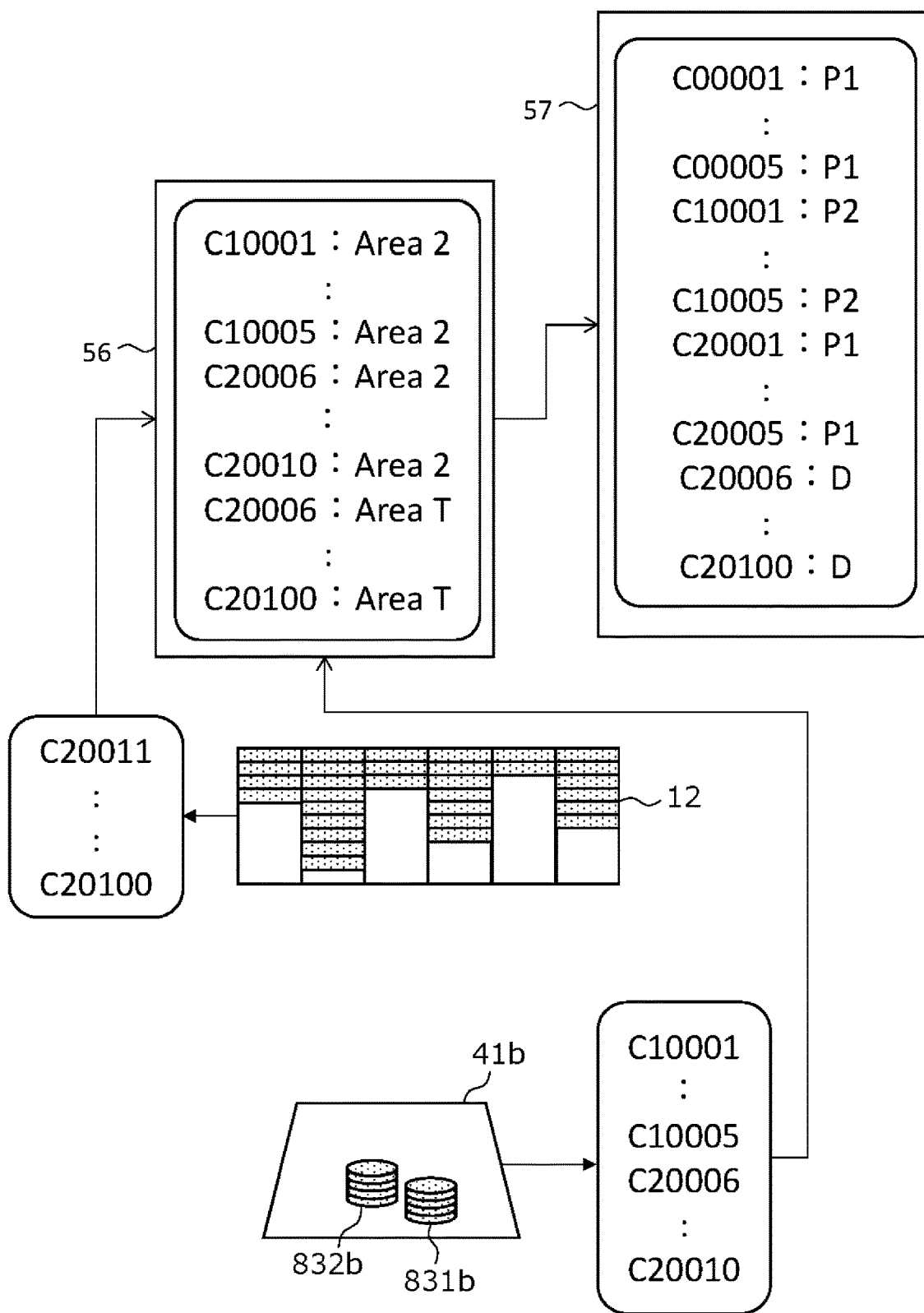
FIG. 43 shows an example of updating the database according to the seventh example of the fourth embodiment.

The dealer after confirming that the bet chip 831*a* and the payout chip 832*a* paid out to it are removed from the betting area 41*b*, as shown in FIG. 43, pays out the payout chips 832*b* to the bet chips 831*b* in the same betting area 41*b*. Thus, the chip IDs "C10001" to "C10005" of the bet chips 831*b* and the chip IDs "C20006" to "C20010" of the payout chips 832*b* are read from the betting area 41*b* and recorded in the management control device 56 in combination with the area ID "Area 2" of the betting area 41.

Figure 44:
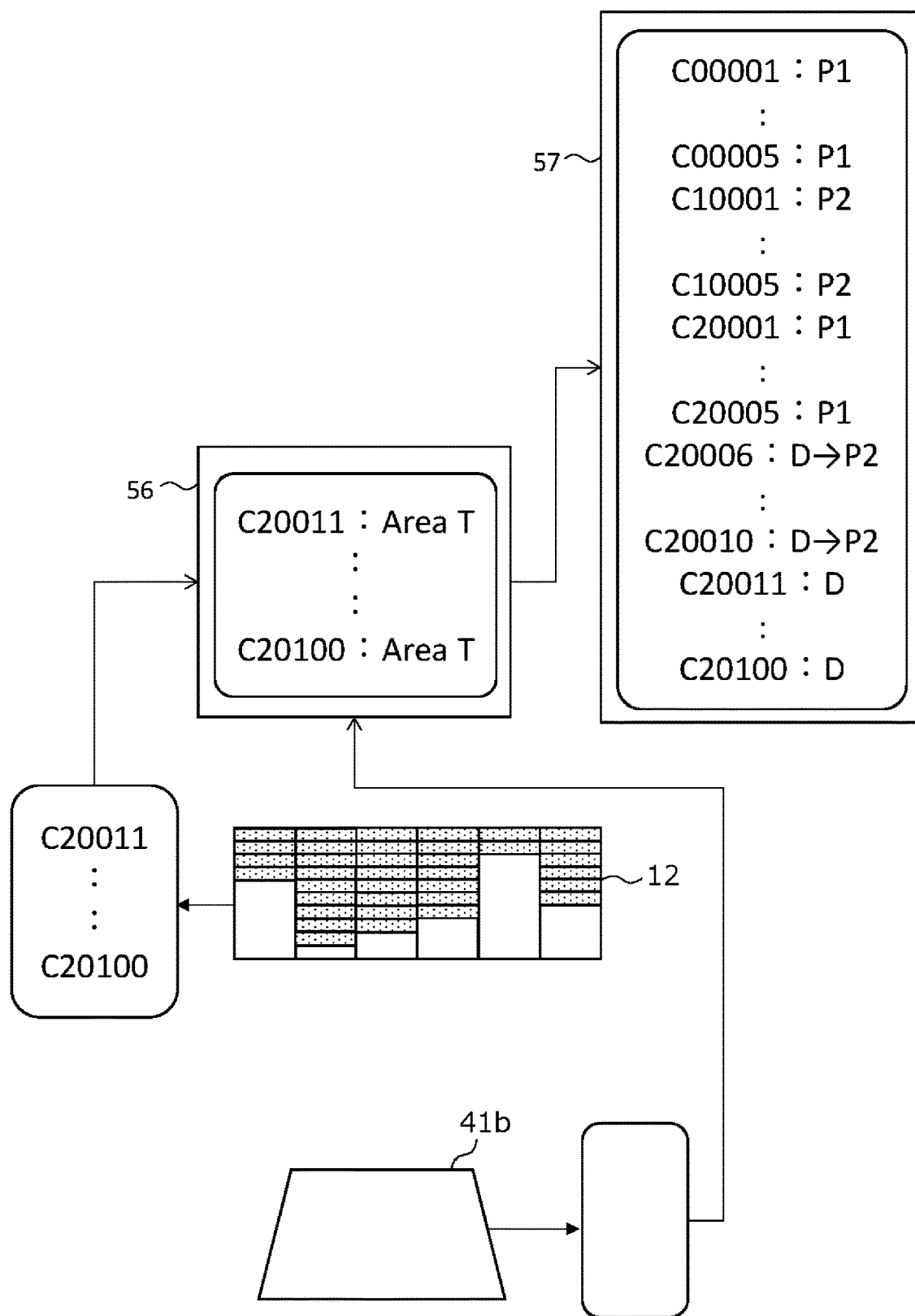
FIG. 44 shows an example of updating the database according to the seventh example of the fourth embodiment.

Thereafter, when player 82*b* takes this bet chip 831*b* and payout chip 832*b*, as shown in FIG. 44, no chip ID is read from betting area 41*b*, and only the chip ID read from chip tray 12 is input to the management control device 56. Based on this change, the management control device 56 determines that the payout chips 832*b* with the chip IDs "C20006" to "C20010" have been passed to the same players as those with the chip IDs "C10001" to "C10005," and updates the database 57 so that the user IDs associated with chip IDs "C20006" to "C20010" are the same as the user IDs associated with chip IDs "C10001" to "C10005."

As described above, according to the management system 170 in this example, the system detects that the bet chips 831 and the payout chips 832 have been removed from the betting area together and updates the database 57 so that the user IDs of the payout chips 832 are the same as the user IDs of the bet chips 831. Therefore, even when multiple players' game tokens 83 are bet in the same betting area 41, by paying out to those players in order, it is possible to determine to which player the payout chips 832 were paid out to update the database 57, making it possible to trace the holders of the game tokens.

Figure 45:
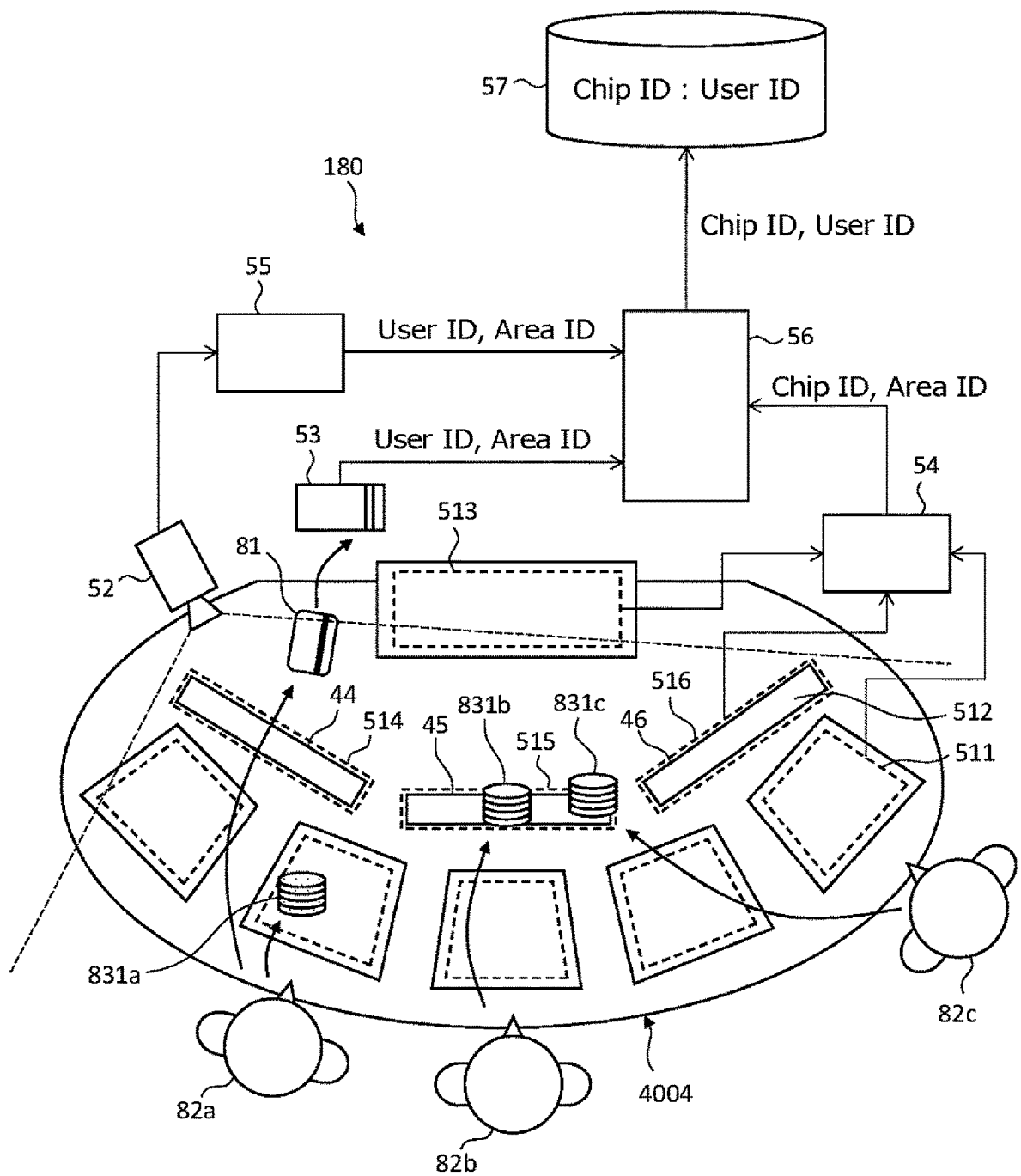
FIG. 45 shows the configuration of the management system according to an eighth example of the fourth embodiment.

FIG. 45 shows the configuration of the management system of the eighth example of the fourth embodiment. The management system 180 has the same configuration as the management system 140 of the fourth example. However, in the management system 180, a player pair area 44, a tie area 45, and a banker pair area 46 are provided as betting areas in the game table 4004. In addition, antennas 514, 515, and 516 are provided in the game table 4004 corresponding to the player pair area 44, tie area 45, and banker pair area 46.

Each of these areas 44 to 46 is divided into sections for each playing position, and when betting in these areas 44 to 46, a player places his/her betting chips in the position (section) corresponding to his/her playing position within these areas.

In other words, player pair area 44, tie area 45, and banker pair area 46 are each a shared betting area shared by multiple players. In the example of FIG. 45, players 82*a* to 82*c* are participating in the game, of which players 82*b* and 82*c* have placed bet chips 831*b* and 831*c*, respectively, in tie area 45.

In this example, the holders of the game tokens 83 can be traced in the same way as in the sixth or seventh example for the shared betting areas 44 to 46. Even if the management system 180 does not have the database 57, the tracing of the holder of the game token 83 can be performed in the same manner as in the sixth example, and even if the management system 180 does not have the player identification system, the tracing of the holder of the game token 83 can be performed in the same manner as in the seventh example for the shared betting area.

Figure 46:
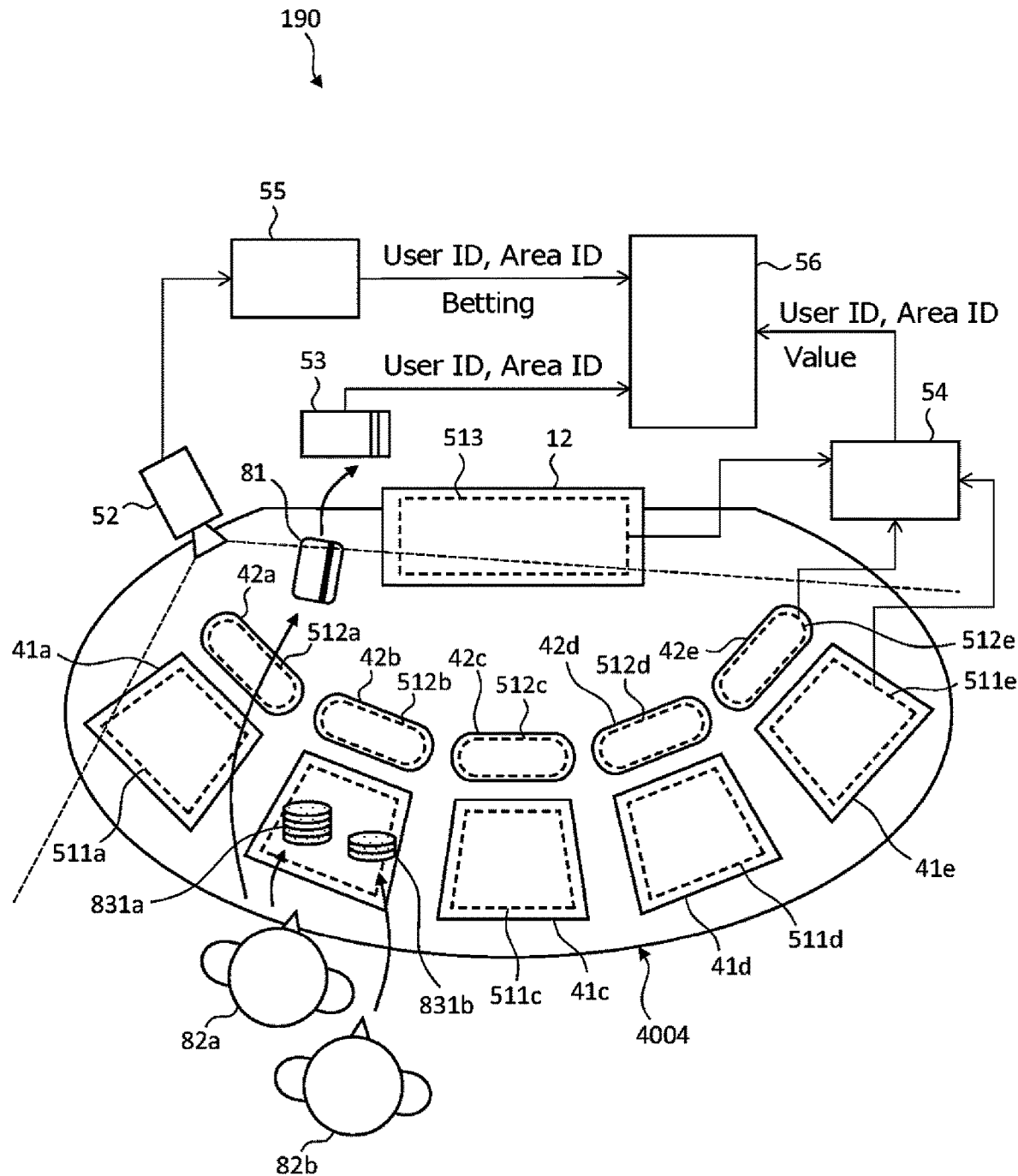
FIG. 46 shows the configuration of the management system according to a ninth example of the fourth embodiment.

FIG. 46 shows the configuration of the management system of the ninth example of the fourth embodiment. The management system 190 is equipped with a player identification system. In this example, the game tokens 83 is traced without using the database 57. The game table 4004 has pay areas 42*a* to 42*e* and their corresponding antennas 512*a* to 512*e*. In the fixed information 3 of the RFID tag 2 of the game token 83, information indicating the amount (value) of the game token 83 is stored, and the user ID of the holder is stored in the variable information 4.

In this example, the database 57 may be used, in which case the chip ID is stored in the game token 83, and the amount (value) of the game token 83 and the user ID of the holder are stored in the database 57 in association with the chip ID.

As shown in FIG. 47, when the bet chips 831*a* (five chips with the amount "100") of the player 82*a* and the bet chips 831*b* (two chips with the amount "1000") of the player 82*b* are placed in the betting area 41*b*, five bet chips 831*a* with the amount "100" and the user ID "P1" are read, and two game tokens 83 with the amount "1000" are read, from the betting area 41*b*, and those are output together with "Area 2" that is an area ID to the management control device 56.

The management control device 56 detects the betting amount for each player by calculating the total amount of betting chips for each betting area 41. In the case of FIG. 47, the management control device 56 detects that the bet amount for user ID "P1" is "500" and the bet amount for user ID "P2" is "2000."

Figure 48:
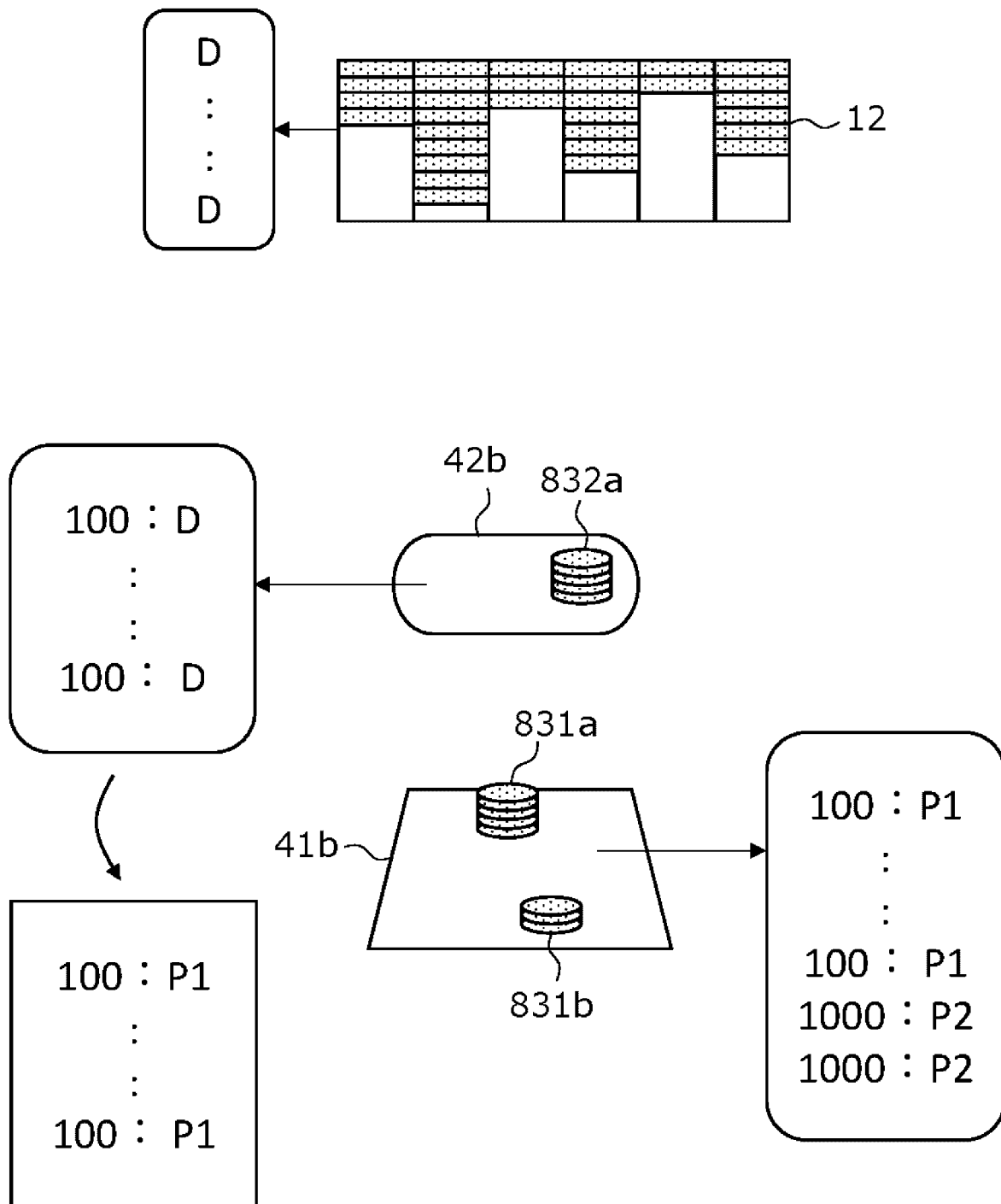
FIG. 48 shows an example of updating the variation information according to the ninth example of the fourth embodiment.

If both players 82*a* and 82*b* win as a result of the game, the dealer pays out (redeems) to each of the bet chips 831*a* and 831*b* in turn. As shown in FIG. 48, when paying out the payout chip 832*a* for the bet chip 831*a* first, the dealer places the payout chip 832*a* in the pay area 42*b*.

At this time, the RF control device 54 reads the game tokens 83 in the pay area 42*b*, reads that there are five game tokens 83 with the amount "100," and outputs this information to the management control device 56. The management control device 56 detects the payout amount by calculating the total amount of the payout chips 832*a* read in the pay area 42*b*.

The management control device 56 compares the payout amount of the payout chips 832*a* with the bet amount for each player in the betting area 41*b* to identify the player whose bet amount matches the payout amount. In the case of FIG. 48, five payout chips 832*a* with the amount "100" are read from the pay area 42*b*, and the payout amount is detected to be "500." The management control device 56 determines that this payout amount "500" matches the bet amount "500" of the bet chip 831*a* with the user ID "P1," and rewrites the user ID of the payout chip 832*a* to "P1."

Figure 49:
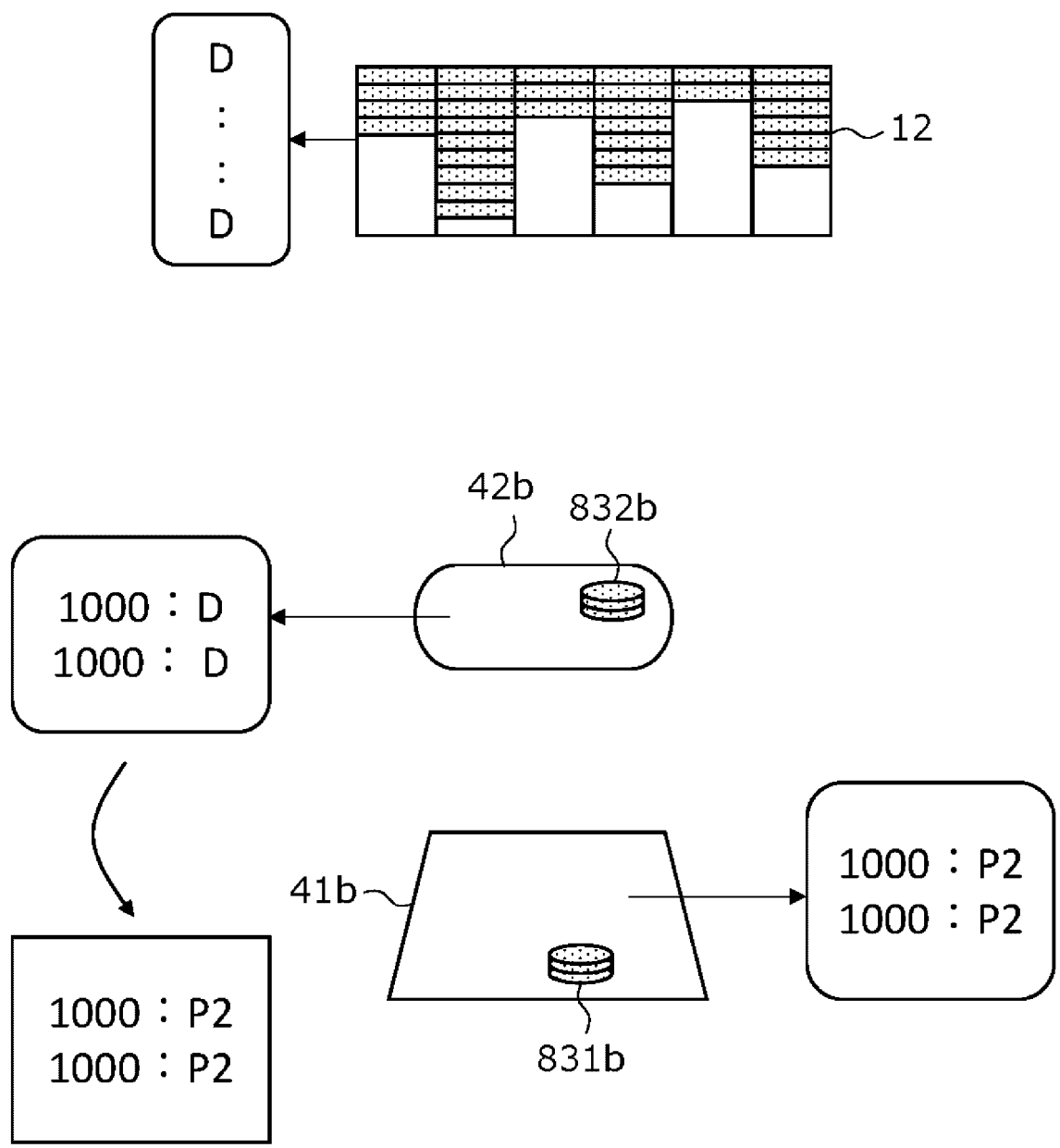
FIG. 49 shows an example of updating the variation information according to the ninth example of the fourth embodiment.

Then, when player 82*a* takes the payout chip 832*a* and the bet chip 831*a*, the bet chip 831*b* of the player 82*b* remains in the betting area 41*b*, as shown in FIG. 49. When the dealer places the payout chip 832*b* in the pay area 42*b* for paying out for the bet chip 831*b*, the management control device 56 detects the payout amount of the payout chip 832*b* by calculating the total amount of the payout chip 832*b*.

The management control device 56 compares the payout amount of the payout chip 832*b* with the bet amount for each player in the betting area 41*b*, and identifies the player whose bet amount matches the payout amount. In the case of FIG. 49, two payout chips 832*b* with the amount "1000" are read from the pay area 42*b*, and the payout amount is detected to be "2000." The management control device 56 determines that this payout amount "2000" matches the bet amount "2000" of the bet chip 831*b* with the user ID "P2," and rewrites the user ID of the payout chip 832*b* to "P2."

As described above, even if multiple players have placed bets in the same betting area 41, when their betting amounts are different, the management and control system 190 of this example determines which player the payout chips are being paid out to based on the betting amount and the payout amount of the payout chips.

In the above examples, if the player 82 is a non-member who is not registered as a member, the player 82 cannot be identified by the player identification system because such a non-member is not assigned a user ID. In addition, as described above, "Unknown" is recorded as the user ID for the game token 83 owned by the non-member, because a valid user ID cannot be stored in the RFID tag 2 or the database 57.

When paying out the payout chips 832 to a non-member player, the management system makes the user ID of the payout chip 832 to be "Unknown," and when the bet chips 831 are collected from a non-member player, the management system makes the user ID of the bet chip 831 being collected to be "D."

When a player who is a member and a player who is a non-member bet on the same betting area 41, if both players win the game, the dealer may perform pay out under a rule in which the payout chips are always paid out from the non-member first or always paid out from the member first.

For example, if the rule of always paying out non-members first is in operation, the management system rewrites the user ID as "Unknown" for the first payout chips 832 that is paid out, and rewrites the user IDs of the payout chips 832 that are later paid out to the user ID of the player who is a member, using the above example.

For example, if the rule of always paying out members first is in operation, the management system rewrites the user ID of the first payout chip 832 to the user ID identified from the bet chips 831, and for payout chips 832 that are paid out later, the user ID is rewritten as "Unknown.

When the dealer identifies a player using the card identification system, the dealer scans the member's card 81 by himself/herself and can know which player is a member, but when the player is identified using the face recognition system, the dealer cannot know which player is a member. Therefore, as a result of recognition by the face recognition system, visual information indicating the playing position or betting area where the user ID was recognized may be shown to the dealer by a monitor or the like.

Figure 50:
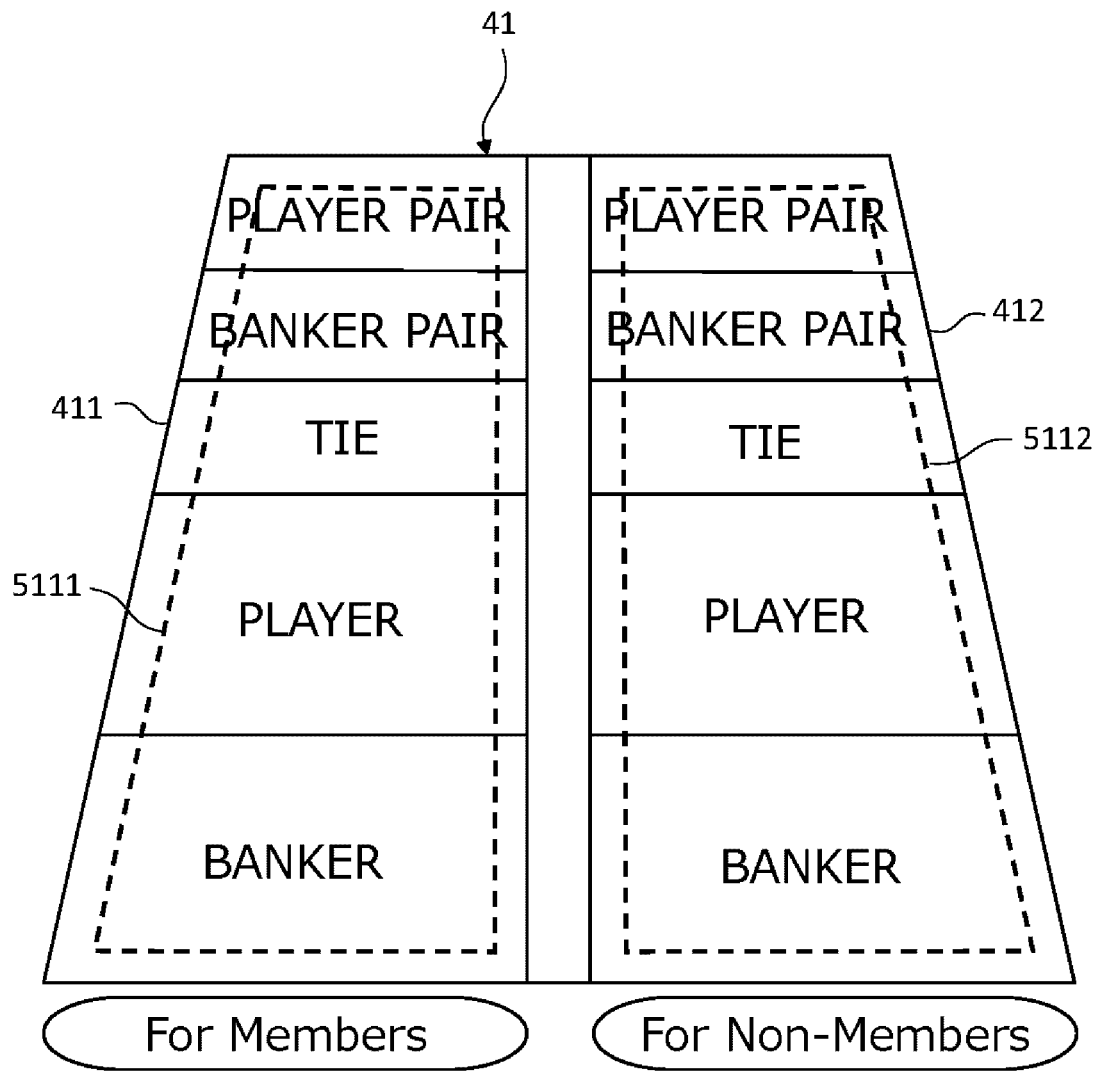
FIG. 50 shows an example of a betting area according to an eleventh example of the fourth embodiment.

FIG. 50 shows an example of a betting area in the eleventh example of the fourth embodiment. In this example, the betting area 41 of each playing position is divided into a betting area 411 for members and a betting area 412 for non-members, and the antennas are also divided into antennas 511 for members and antennas 5112 for non-members.

By controlling the RF control device 54, the management control device 56 rewrites the user ID of the game token 83 as in the first to ninth examples above for the bet chips 831 bet in the betting area 411 for members, and for the bet chips 831 bet in the betting area 412 for non-members. The user IDs of all payout chips 832 that are paid out to the bet chips 831 are rewritten to "Unknown."

According to this example, the game token 83 whose user ID assigned to the player is stored in itself or in the database 57 and the game token 83 whose user ID assigned to the player is not stored in itself or in the database 57 (the user ID is "Unknown") will not be mixed and read, thereby the game token 83 whose user ID assigned to the player is stored in itself or in the database 57 can be traced effectively.

In this example, instead of antennas 5111 and 5112, one antenna may be provided across the betting area 411 for members and the betting area 412 for non-members. In this case, when the game token 83 is bet in the betting area 411 for members and the betting area 412 for non-members, respectively, the dealer can recognize which betting chips 831 belong to the members and which betting chips 831 belong to the non-members.

When paying out to any of the betting chips 831, the dealer may perform the payout under the operating rule that the member's betting chips 831 are paid out first. In this way, the management system can determine that the payout chip 832 paid out first is the one paid out to the member. It is also possible for the dealer to pay out according to the operation rule of paying out the betting chips 831 of non-members first. In this case, the management system can determine that the payout chips 832 paid out first are those paid out to non-members.

Figure 51A:
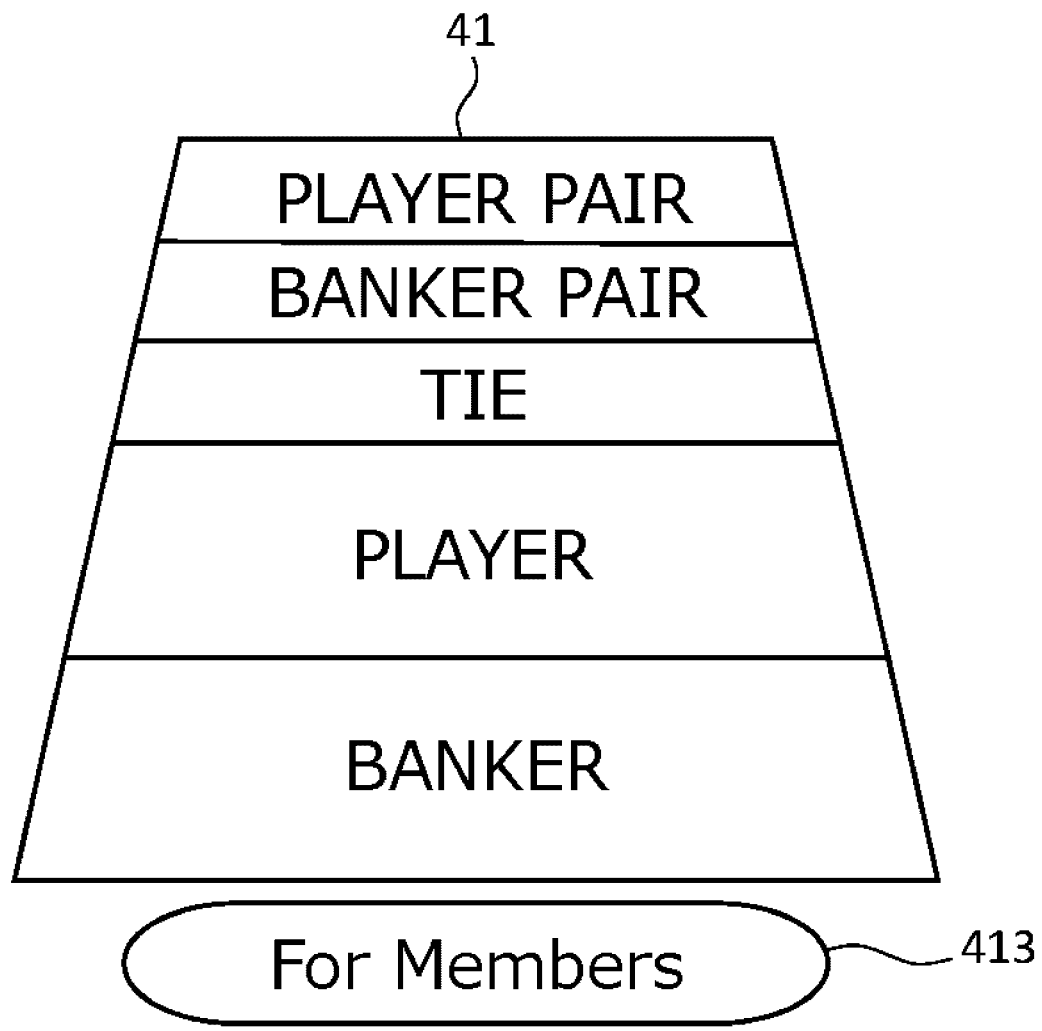
FIG. 51A shows another example of the betting area according to the eleventh example of the fourth embodiment.
Figure 51B:
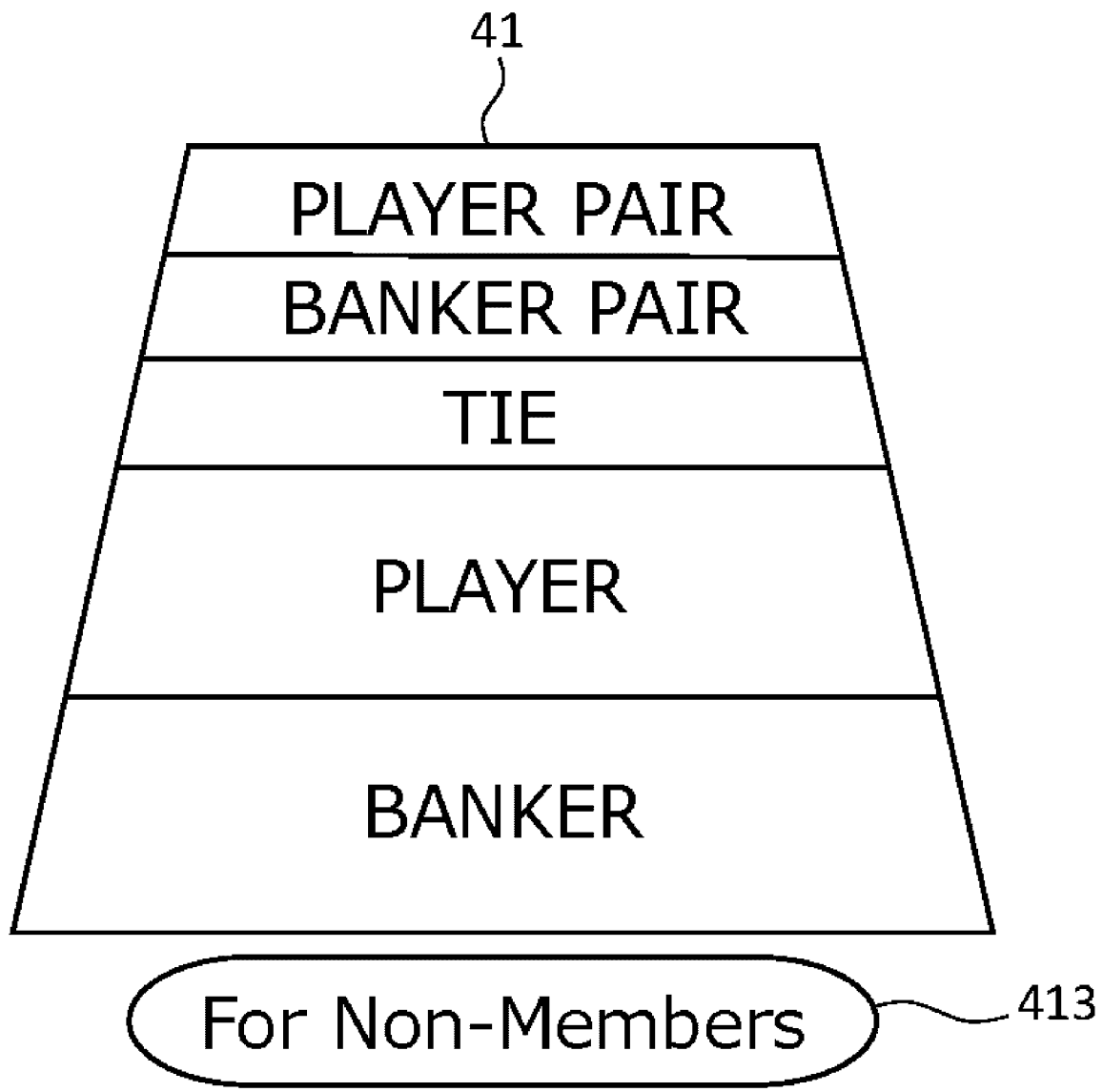
FIG. 51B shows another example of the betting area according to the eleventh example of the fourth embodiment.
Figure 52:
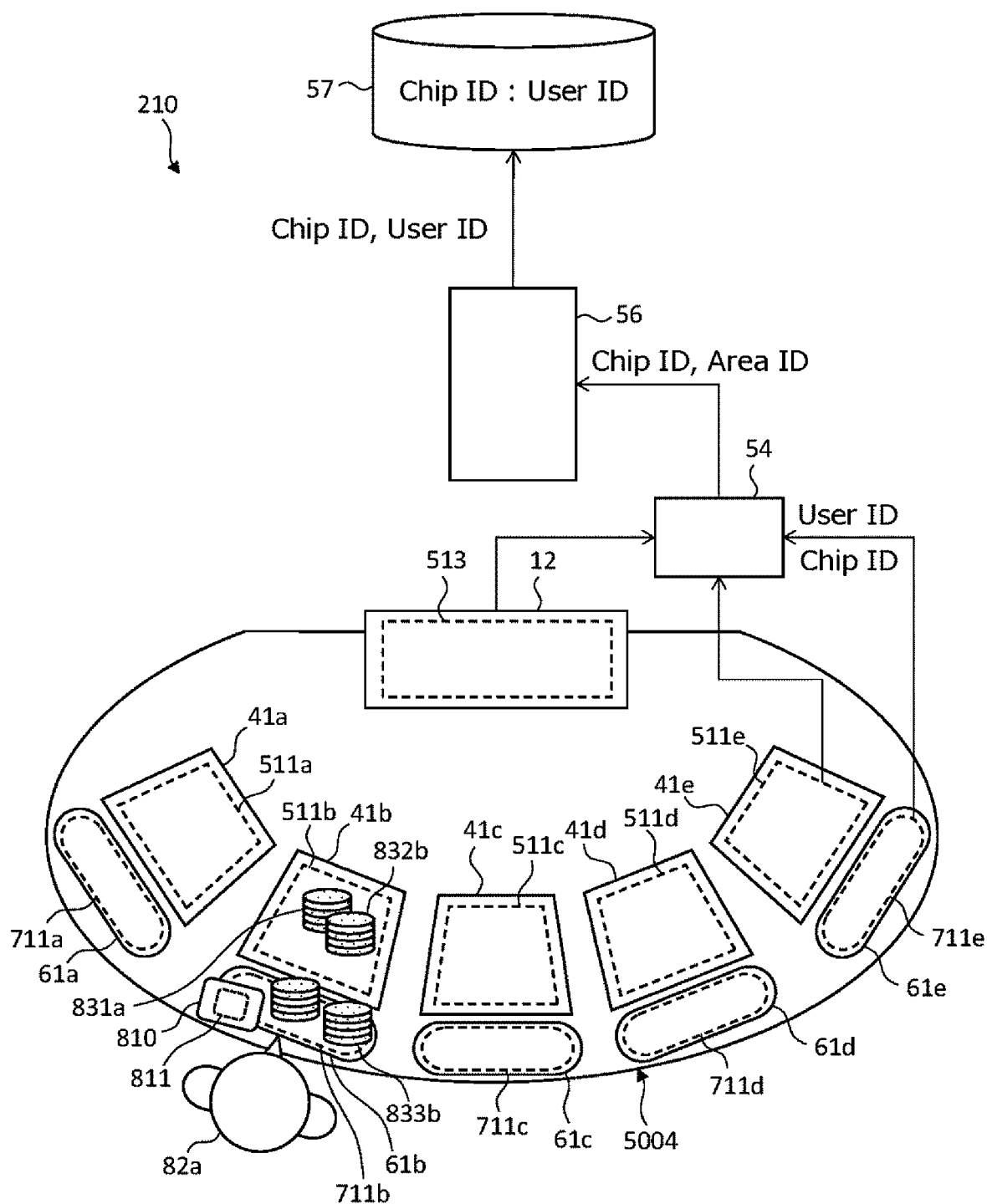
FIG. 52 shows the configuration of the management system according to a fifth embodiment.

FIGS. 51A and 51B show other examples of betting areas in the eleventh example of the fourth embodiment. In this example, the betting area 41 for each playing position is selectively set to either the betting area 41 for members, as shown in FIG. 51A, or the betting area 41 for non-members, as shown in FIG. 51B.

In the vicinity of each betting area 41, there is a display 413 that variably indicates whether the betting area 41 is set for members or for non-members, respectively. This display section 413 is installed under the raxa of the game table 4004, and the displayed information is visible to the player through the raxa.

The means of visually indicating whether each betting area 41 is set for members or non-members is not limited to the display 413 embedded under the raxa of the game table 4004. For example, a monitor installed on the game table 4004 that is visible to the players may indicate whether each betting area 41 is set for members or non-members.

By controlling the RF control device 54, the management control device 56 rewrites the user IDs of the bet chips 831 that are bet in the betting area 41 as in the first to ninth examples above when the betting area 41 set for the members, and rewrites all the user IDs of the payout chips 832 that are paid out to the bet chips 831 that have been bet in the betting area 41 to "Unknown" when the betting area 41 set for the non-members.

According to this example, the game token 83 whose user ID assigned to the player is stored in itself or in the database 57 and the game token 83 whose user ID assigned to the player is not stored in itself or in the database 57 (the user ID is "Unknown") will not be mixed and read, thereby the game token 83 whose user ID assigned to the player is stored in itself or in the database 57 can be traced effectively.

In the first to ninth examples above, it is also possible to trace the holder of the game token 83 when the game token 83 is exchanged between the dealer and the player at the game table 4003. In this case, the management system is provided with means for determining the progress of the game (i.e., whether a game phase is "betting," "playing," or "settlement"). As such progress determination means, the card distribution device 4003 can be used, but any other means may be used.

In the management system of this example, the management control device 56 controls the RF control device 54 to cause each antenna to read periodically at predetermined time intervals during betting. During betting, the management control device 56 determines that the game tokens 83 is being exchanged when the game tokens 83 whose user ID is "D" is read at one of the betting areas 41 or one of the pay areas 42 (hereinafter referred to as the "reading area of the game table 4004"), and when the game tokens 83 whose user ID is the user ID assigned to the member is read at the chip tray 12.

This is because, in terms of baccarat operation, during betting, the game token 83 cannot be moved from the chip tray 12 to the game table 4003 except for exchange, and the game token 83 of the player on the game table 4003 cannot be moved to the chip tray 12. If the game phase is "playing," such movement of the game token 83 for game use is a fraudulent act, and the management control device 56 may output an alarm when it detects such a movement of the game token 83 during the "playing."

If a game token 83 whose user ID is the user ID assigned to a member or "Unknown" is read by the chip tray 12 during betting, the management control device 56 determines that the game token 83 is a game token 83 (chip before exchange) that was placed on the game table 4004 by the player for exchange between chips.

Specifically, when the user ID is stored in the game token 83 itself, the management control device 56 determines that it is an exchange when the user ID assigned to the member or "Unknown" is read from the chip tray 12 during betting. In the case that the user ID is stored in the database 57, the management control device 56 determines that an exchange is taking place when the number of game tokens 83 read from the chip tray 12 decreases during betting. Alternatively, if the user ID is stored in the database 57, when the number of game token 83 read from the chip tray increases during betting, the management control device 56 may determines that an exchange is taking place.

In addition, if, a game token 83 whose user ID is "D," indicating that it is held by the casino or dealer, is read in the read area of the game table 4004 during betting, the management control device 56 determines that the game token 83 is a game token 83 (chip after the exchange) that is given to the player corresponding to the chip before the exchange.

Specifically, when the user ID is stored in the game token 83, the management control device 56 determines that it is an exchange when the user ID "D" is read from the reading area of the game table 4004 during betting, and when the user ID is stored in the database 57, the management control device 56 reads the reading area of the game table 4004 periodically during betting, and by referring to the database 57 at each reading, determines that the game token 83 whose user ID is "D" has been read from the reading area of the game table 4004.

The management control device 56 rewrites the user ID of the chip before exchange to "D" representing the casino or dealer, and rewrites the user ID of the chip after exchange to the user ID of the chip before exchange. Specifically, if the user ID is stored in the RFID tag 2 of the game token 83, the management control device 56 controls the RF control device 54 to rewrite the user ID stored in the corresponding chip before exchange and chip after exchange, and if the user ID is stored in the database 57 in association with the chip ID, the management control device 56 rewrites the user ID associated with the corresponding chip ID in the database 57.

After identifying the chip before exchange and chip after exchange, the management control device 56 may control the RF control device 54 to exchange their user IDs (if the user ID is stored in the game token 83) or update the database 57 to exchange their user IDs (if the user ID is stored in the database 57).

In the above embodiment, the member's card 81 is a magnetic card and the card reader 53 is a magnetic card reader that reads information from the magnetic stripe of the member's card 81, but alternatively, an RFID tag may be embedded in the member's card 81 and the user ID may be recorded in the RFID tag. In this case, an RFID reader consisting of an antenna and an RF control device 54 is used as the card reader 53. Such an antenna may also be provided at each playing position. In this case, the player does not hand his own member's card 81 to the dealer, but has it read at each playing position. From each antenna, the user ID read from the member's card 81 is transmitted to the RF control device 54, along with information identifying the playing position. Furthermore, the antennas 511 in the betting area 41 and the RF control device 54 may be used as RFID readers for reading the member's card 81. In this case, the player can have the antenna 511 read the user ID by placing the member's card 81 in the betting area 41 at his own playing position.

By the first to eleventh examples of the fourth embodiment described above, the following techniques are disclosed.

(A1) A management system that manages a game token, comprising: a holder identification device configured to, when the game token is used, identify a holder of the game token by referring to a memory device that stores a holder of the game token; a player identification device configured to, when the game token is used, identify a player who used the game token; and a control device configured to, for the game token used, store the player identified by the player identification device as the holder in the memory device when the holder identified by the holder identification device and the player identified by the player identification device do not match.

(A2) The management system according to (A1), wherein the control device stores the fact that there is a discrepancy in the memory device when, for the game token used, the holder identified by the holder identification device and the player identified by the player identification device do not match.

(A3) The management system according to (A1), wherein the player identification system identifies the player who used the game token by face recognition or by reading an ID card.

(A4) The management system according to (A1), wherein said memory device is a database or an RFID tag embedded in the game token.

(A5) A management system that manages a game token, comprising: a memory device configured to store a holder of the game token; a player identification device configured to identify a player who receives payout of the game token; and a control device configured to store the player as the holder in the memory device for the game token paid out.

(A6) The management system according to (A5), further comprising an identification device configured to a betting area assigned to the player, wherein the control device determines to which player the game token is paid out by identifying to which betting area the game token to be paid out is paid out.

(A7) The management system according to (A5), wherein in case that in the betting area, the game token for which the player identified by the identification device is stored as the holder and the game token in which the player identified by the identification device is not stored as the holder are wagered, the control device stores, in the memory device, the player identified by the identified device as the holder of the game token which is paid out to the game token for which the player identified by the identification device as the holder.

(A8) The management system according to (A5), further comprising a detection device configured to detect amount of the game token paid out, wherein in case that in the betting area, the game token for which the player identified by the identification device is stored as the holder and the game token in which the player identified by the identification device is not stored as the holder are wagered, the control device stores the player identified by the identification device as the holder of the game token paid out in the betting area after detecting, by the detection device, an amount corresponding to payout to the game token for which the player identified by the identification device is not stored as the holder.

(A9) The management system according to (A5), further comprising a detection device configured to detect amount of the game token paid out, wherein in case that in the betting area, the game token for which the player identified by the identification device is stored as the holder and the game token in which the player identified by the identification device is not stored as the holder are wagered, the control device stores in the memory device the player identified by the identification device as the holder of the game token first detected by the detection device for the betting area.

(A10) The management system according to any of (A6) to (A9), wherein the betting area comprises: an area for betting the game token for which the player identified by the identification device is stored as the holder; and an area for betting the game token for which the player identified by the identification device is not stored as the holder.

(A11) The management system according to any of (A6) to (A10), further comprising an output device configured to output visual information for distinguishing the betting area in which the game token for which the player identified by the identification device is stored as the holder is bet and the betting area in which the game token for which the player identified by the identification device is not stored as the holder is bet.

(A12) A management system that manages a game token, comprising: a memory device configured to store a holder of the game token; and a player identification device configured to identify a plurality of candidate players who may receive a stack of the game tokens to be paid out; and a control device configured to store the plurality of candidate players as the holders for each of the gaming tokens constituting the stack to be paid out.

(A13) The management system according to (A12), wherein the player identification device identifies a plurality of players who receive the payouts as a result of betting on the same betting area as the plurality of candidate players.

(A14) The management system according to (A12), wherein the player identification device configured to identify a player betting the game token, the management system further comprises a holder identification device configured to identify the plurality of candidate players stored as the holder in the memory device for the bet game tokens, wherein
the control device, when the betting player identified by the player identification device matches any of the plurality of the candidate players identified by the holder identification device, determine and stores it in the memory the matched candidate player as the holder.

(B1) A management system that manages chips storing identification information, which are used in games on a game table, comprising: a first identification device configured to read the identification information stored in betting chips placed in a betting area on the game table; a second identification device configured to acquire the identification information stored in the payout chips that are paid out for the betting chips; a memory device configured to store the identification information in association with the holder of the chip that stored the identification information; and a control device configured to store in the memory device the holder associated with the identification information read from the bet chip by said first identification device as the holder associated with the identification information of the payout chip acquired by the second identification device.

(B2) The management system according to (B1), wherein the second identification device is the first identification device, and acquires the identification information stored in the payout chip by reading the identification information stored in the payout chip placed in the betting area.

(B3) The management system according to (B1), wherein the second identification device is a device configured to read the identification information stored in the plurality of chips in the chip tray of the dealer, and is configured to obtain the identification information stored in the payout chips from the difference between the plurality of identification information read before the payout chips are dispensed and the plurality of identification information read after the payout chips are dispensed.

(B4) The management system according to (B1), wherein the second identification device acquires the identification information stored in the payout chip by reading the identification information stored in the payout chip placed in a payout area different from the betting area on the game table.

(B5) The management system according to (B1), wherein the first identification device periodically reads the identification information, and when the first identification device no longer reads the identification information read from the betting chip by the first identification device, the control device stores the holder associated with the identification information no longer read by the first identification device in the memory device as the holder associated with the identification information of the payout chip acquired by the second identification device.

(B6) The management system according to (B1), wherein the second identification device acquires the identification information by periodically reading the identification information stored in the payout chip, and when the second identification device no longer reads the identification information that the second identification device has read from the payout chip, the control device changes the holder associated with the identification information that the first identification device has read from the bet chip to the holder associated with the identification information that is no longer read.

(B7) A management system that manages chips that store identification information used in games at a game table, comprising: a first identification device configured to acquire the identification information stored in chips before the exchange that are placed on the game table by a player for exchange between chips; and a second identification device configured to acquire the identification information stored in the chips after the exchange that are given to the player corresponding to the chips before the exchange; a memory device configured to store the identification information in association with the holder of the chip that stored the identification information; and a control device configured to store the holder associated with the identification information of the chip before the exchange obtained by the first identification device in the memory device as the holder associated with the identification information of the chip after the exchange obtained by the second identification device.

(B8) The management system according to (B7), wherein the control device further stores the holder associated with the identification information of the chip before the exchange obtained by the second identification device in the memory device as the holder associated with the identification information of the chip after the exchange obtained by the first identification device.

(B9) The management system according to (B7), wherein the first identification device is a reader configured to read the identification information of a plurality of the chips in a chip tray of a dealer and acquire increased identification information as the identification information stored in the chips before the exchange.

(B10) The management system according to (B7), wherein the second identification device is a reader configured to read the identification information of the plurality of chips in the chip tray of the dealer and acquire decreased identification information as the identification information stored in the chips after the exchange.

(B11) A management system that manages an exchange of chips storing identification information used in a game at a game table, comprising: a reading device configured to read the identification information stored in the chips placed in a reading area on the game table for exchange; a memory device configured to store the identification information and the holder of the chip that stored the identification information in association with each other; and a control device configured to, when associated with the identification information stored on a first chip read by the reading device is different from the holder associated with the identification information stored on a second chip, which is different from the first chip, read by the reading device, store the holder associated with the identification information stored on a first chip read by the reading device as the holder associated with the identification information stored on a second chip, in the memory device.

The following describes a game table reading system that reads RIFD tags at game tables. The following description is based on the case where the game table is a baccarat table for playing baccarat games, but the embodiment can be applied to any game table, not limited to baccarat tables.

Figure 53:
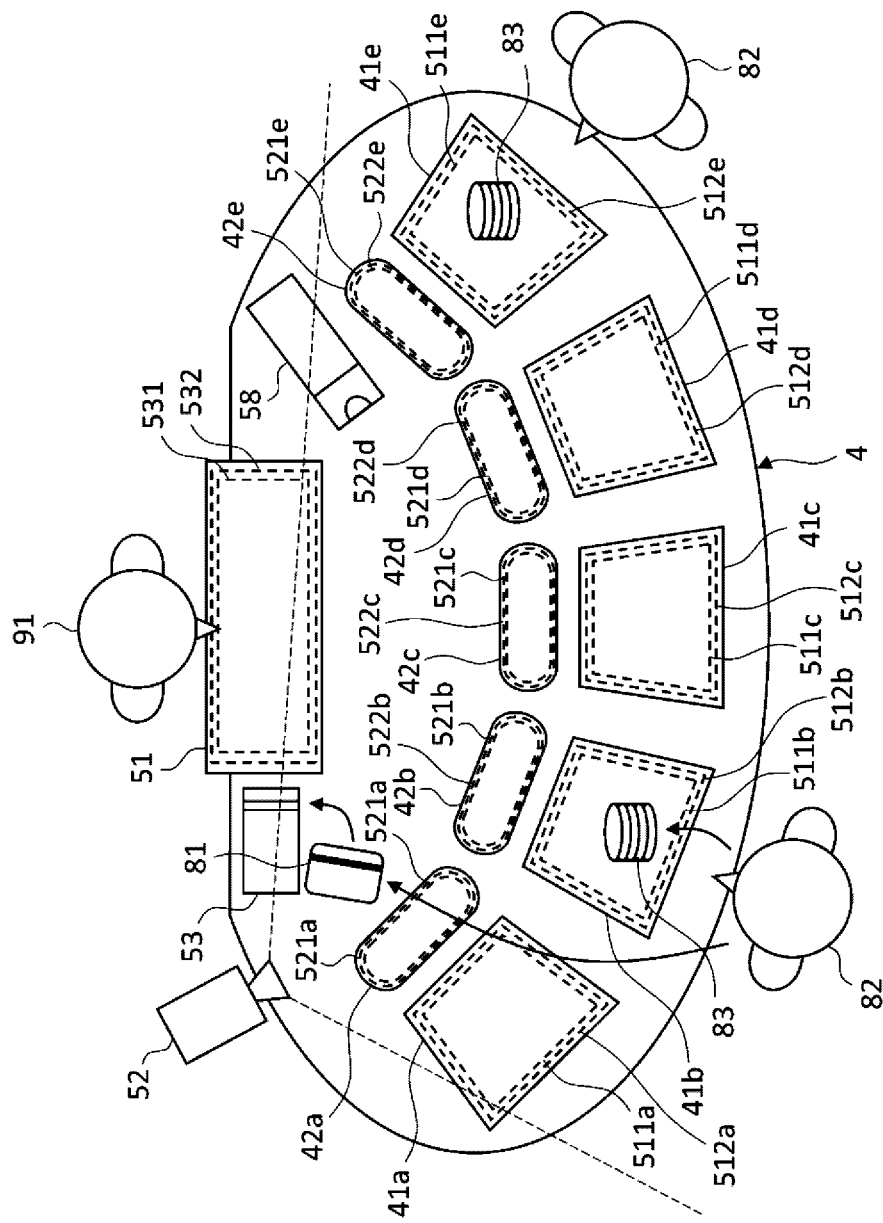
FIG. 53 shows an overall overview of the game table reading system of the sixth embodiment of the present disclosure.

FIG. 53 shows a game table for the sixth embodiment of the present disclosure. The game table (hereinafter referred to simply as "table") 6004 has a shape of approximately an oval or semicircle. One side of the table 6004 is a dealer position (facing the chip tray 51 to be described later) where the dealer is located, and the other side has a plurality of play positions where players are located when playing a game. In the example of FIG. 53, five play positions are provided on the lower side of the table 6004.

In the dealer position, a chip tray 51 is provided to accommodate game tokens 83 in the possession of the dealer in a form embedded in the table 6004. The chip tray 51 has two levels, and the upper level can be removed to replenish or remove the game tokens 83 for the lower level.

An RFID tag 831 is embedded in the game token 83 (see FIG. 56), and the RFID tag 831 stores at least chip identification information (hereinafter referred to as "chip ID") to uniquely identify the game token. The RFID tag 831 may also store information representing the value of the game token.

In each play position, a betting area 41a to 41e (hereinafter collectively referred to as "betting area 41") is provided for a player playing in the play position to place a bet by placing a game token 83 on the betting target. The betting areas 41 are laid out on the top surface of the table 6004. The adjacent betting areas 41 are separated by one or two lines. The distance between adjacent betting areas 41 is relatively close, and at the closest the distance is 0-15 cm, which is smaller than the diameter of a game token 83, for example.

Although not shown in the diagram, the betting areas 41a to 41e for each play position include a player pair area for betting on a pair being formed in the player's hand, a banker pair area for betting on a pair being formed in the banker's hand, and a tie area for betting on a tie between the player's hand and the banker's hand. The tie area for betting that the player's hand will tie with the banker's hand, the player area for betting that the player's hand will win, and the banker area for betting that the banker's hand will win are located close to each other so that they do not overlap. In the following, player pair area, banker pair area, tie area, player area, and banker area are referred to as "betting target areas" respectively. The adjacent betting target areas are separated by one or two lines. Alternatively, there may be no lines between adjacent betting target areas, and each betting target area may be delimited by painting adjacent betting target areas a different color from each other, or by painting the betting target area a different color from the background. The distance between adjacent betting target areas is relatively close, and at the closest the distance is 0-10 cm, which is smaller than the diameter of the game token 83, for example.

In each play position, pay areas 42a to 42e (hereinafter collectively referred to as "pay areas 42") are provided for reading payout chips when the dealer pays out the game token 83 to the player. The pay areas 42 are drawn on the top surface of the table 6004. Adjacent pay areas 42 are separated from each other by one or two lines. Alternatively, there may be no lines between adjacent pay areas 42, and each pay area 42 may be delimited by painting adjacent pay areas 42 in different colors from each other or by painting pay areas 42 in a different color from the background. The distance between adjacent pay areas 42 is relatively close, and at its closest the distance is 0-10 cm, which is smaller than the diameter of the game token 83, for example.

In the betting areas 41a to 41e, reading antennas 511a to 511e (hereinafter collectively referred to as "reading antennas 511") are provided for reading the RFID tags 831 built into the game tokens 83 placed in the betting areas 41a to 41e, respectively. The chip tray 51 is provided with a reading antenna 531 for reading the RFID tag 831 embedded in the game tokens 83 stored in the chip tray 51. As described above, the chip tray 51 is a dual level type, and the reading antenna 531 may be provided on the back side of the upper tray, for example.

In addition, the betting areas 41a to 41e have read-restriction antennas 512a to 512e (hereinafter collectively referred to as "read-restriction antennas 512") for restricting or obstructing the reading of RFID tags 831 embedded in the game tokens 83 placed in the betting areas 41a to 41e, respectively, by reading antennas in other areas. In the pay areas 42a to 42e, the read-restriction antennas 522a to 522e (hereinafter collectively referred to as "read-restriction antennas 522") are provided to restrict or obstruct the RFID tags 831 embedded in the game tokens 83 placed in the pay areas 42a to 42e from being read by the reading antennas in other areas. The chip tray 51 is provided with read-restriction antennas 532 for restricting or obstructing the reading of RFID tags 831 embedded in game tokens 83 stored in the chip tray 51 by reading antennas in other areas.

The reading antennas 511 and read-restriction antennas 512 of the betting area 41 are shaped along the outer edge of the betting area 41, the reading antennas 521 and read-restriction antennas 522 of the pay area 42 are shaped along the outer edge of the pay area 42, and the antenna 531 and the read-restriction antenna 532 of the chip tray 51 are shaped along the outer edge of the chip tray 51, but the shape of the antennas is not limited to these. In the example of FIG. 53, the read-restriction antenna is provided inside the reading antenna. However, the positional relationship between the reading antenna and the read-restriction antenna is not limited to this, and the read-restriction antenna may be provided outside the reading antenna, or the reading antenna and the reading antenna may intersect in plan view. In addition, a plurality of read-restriction antennas may be provided for one reading antenna, or conversely, one read-restriction antenna may be provided for a plurality of reading antennas.

A card distribution device 58 is placed on table 6004. The card distribution device 58 accommodates a plurality of decks of cards. The dealer 91 can pull out cards one by one from the card distribution device 58. The card distribution device 58 has the function of reading the suit and rank of the withdrawn cards. The card distribution device 58 determines the game outcome according to the rules of the baccarat game, based on at least the rank of the withdrawn card. The card distribution device 58 displays the determined game outcome by means of a lamp or the like, and also outputs data indicating the game outcome to the outside world. In this way, the card distribution device 58 also functions as a game outcome determination device.

The table 6004 is further provided with a camera 52 and a card reader 53. The camera 52 photographs the face of the player 82 playing in the play position and the game tokens 83 on the table 6004. A camera for photographing the face of the player and a camera for photographing the game tokens 83 on the table 6004 may be provided separately.

The card reader 53 reads the information stored in the member's card 81 by scanning the member's card 81 held by the registered player (member). The card reader 53 reads the information stored in the member's card 81 by scanning the member's card 81 held by the registered player (member). The member's card 81 has a built-in RFID tag, and the RFID tag stores at least the user ID assigned to the corresponding player. The card reader 53 has an operation panel (not shown) in which the dealer 91 specifies the play position. When the dealer 91 scans the member's card 81 with the card reader 53, the dealer 91 specifies the play position. As a result, the card reader 53 outputs the combination of the play position and the user ID. The card reader 53 is also equipped with a cancel operation unit (not shown). When the player 82 leaves the table, the dealer 91 specifies the play position and operates the cancel operation unit. As a result, the card reader 53 outputs the play position and the cancel instruction.

When a player 81 plays baccarat at the table 6004 as described above, the player 82 first sits at one of the play positions at the table 6004 and hands his or her member's card 81 to the dealer 91. The dealer 91 scans the member's card 81 using the card reader 53. The player 81 places a bet by placing a game token 83 in one of the betting target areas including the player area, the banker area, the tie area, the player pair area, and the banker pair area in the betting area 41 provided in his play position.

When the betting of all players 82 are completed, the dealer 91 closes the betting and withdraws the cards from the card distribution device 58 one by one. In baccarat, four cards are first drawn in the following order: player's hand, banker's hand, player's hand, and banker's hand. At this point, if no player pair is formed, the betting chips bet on the player pair are collected by the dealer 91 in the chip tray 51. If a banker pair is not formed at this point, the betting chips bet on the banker pair are collected by the dealer 91 in the chip tray 51.

The dealer 91 draws the fifth and subsequent cards as necessary, according to the rules of baccarat. When the game outcome is finally determined, the dealer 91 collects the losing player's betting chips 83 in the chip tray 51 and then pays out the game tokens 83 from the chip tray 51 for the winning player's betting chips 83, according to the game outcome. During the payout, the dealer 91 first places the game tokens 83 in the pay area 42 of the play position where the betting chips 83 to be paid out were bet, and then places the game tokens 83 to be paid out next to the betting chips 83. The winning player receives the game tokens (payout chips) thus placed next to the betting chips 83 along with the betting chips. The dealer 91 presses the game start button on the card distribution device 58 when starting the next game (i.e., when starting the betting for the next game).

Figure 54:
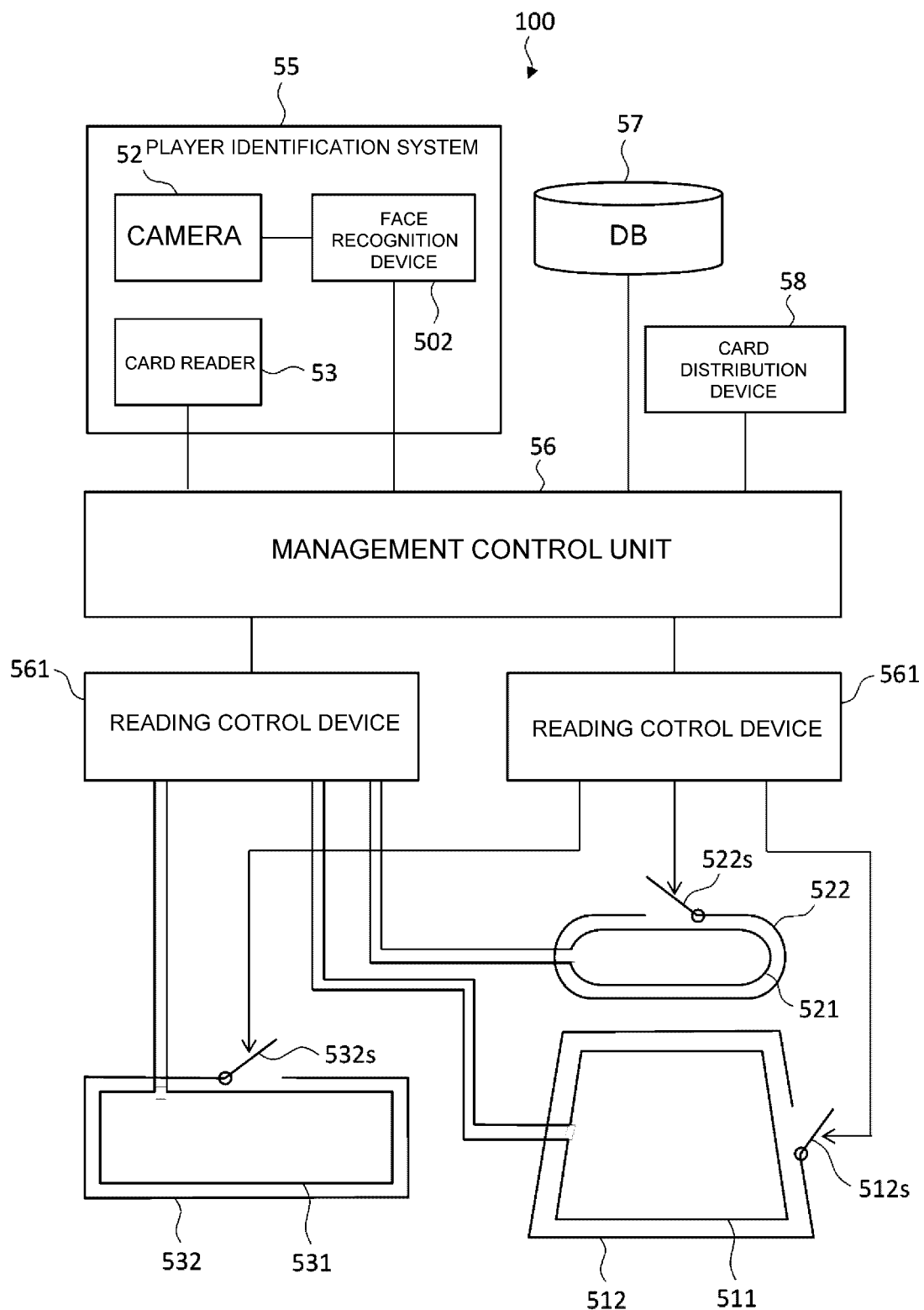
FIG. 54 shows a block diagram of the game table reading system of the sixth embodiment of the present disclosure.

FIG. 54 is a block diagram of a game table reading system of the sixth embodiment of the present disclosure. The game table reading system 100 has a card distribution device 58, a player identification system 55, a reading control device 561, a read-restriction control device 562, a management control device 56, a database 57, reading antennas 511, 521, 531, and read-restriction antennas 512, 522, 532.

The player identification system 55 is equipped with a camera 52, a card reader 53, and a face recognition device 502. The face recognition device 502 authenticates a player based on an image of the player's face captured by the camera 52. The face recognition device 502 may use machine learning techniques to perform face recognition. Based on the position of the player's face, the face recognition device 502 also identifies the position of the authenticated player, i.e., the play position of the authenticated player. In this embodiment, the player can be identified by the face recognition system including the camera 52 and the face recognition device 502, and the player can also be identified by using the card reader 53 to read the member's card 81, but the player can be identified by any one of these means.

The card distribution device 58 outputs the progress of the game (i.e., dealing in progress, between the end of the game and the next game, betting in progress, etc.) to the management control device 56 based on the button operation and the rank of the withdrawn card read, and also outputs the game outcome (player hand wins, banker hand wins, tie, player hand forms pair, banker hand forms pair, etc.) are output to the management control device 56.

The reading control device 561 reads the RFID tag 831 in the read area corresponding to the reading antenna by controlling the reading antennas 511, 521, and 531. The read-restriction control device 562 controls the read-restriction antennas 521, 522, and 523 to prevent RFID tags in the read area corresponding to the read-restriction antenna from being read by the reading antennas corresponding to other read areas.

The management control device 56 controls the reading control device 561 and the read-restriction control device 562 to read the RFID tags in the plurality of read areas in order, referring to the information stored in the database 57 as necessary, according to the progress of the game from the card distribution device 58. The management control device 56 updates the database 57 by storing the information read from the RFID tags at the reading antennas in the database 57 in association with the player identified by the player identification system 555. Each of the reading antennas 511, 521, and 531 is assigned antenna identification information (antenna ID) to uniquely identify the reading antenna in question.

The reading control device 561 transmits the information read by the reading antennas 511, 521, and 531 and the antenna ID of the reading antenna to the management control device 56 as a set. The reading control device 561 may be provided for each reading antenna, in which case, each reading control device 561 may transmit reader identification information (reader ID) for uniquely identifying the reading control device 561 to the management control device 56 instead of the antenna ID.

As shown in FIG. 54, the reading antennas 511, 521, and 531 are in the form of loops that are partially open in the corresponding read areas, and one end and the other end of the open ends are all connected to the reading control device 561. The reading control device 561 reads the RFID tag by forming an electromagnetic field in the read area by applying an electric current to the reading antenna.

One end and the other end of the reading antennas 511, 521, and 531 are connected via a switch (not shown) in the reading control device 561, respectively. The reading control device 561 controls the opening and closing of these switches. Specifically, the reading control device 561 opens the switches of the reading antennas 511, 521, and 531 in the read area where reading is not performed, thereby opening the loop of the reading antennas 511, 521, and 531 so that induced current due to the electromagnetic field generated by the reading antennas 511, 521, and 531 in adjacent other read areas will not flow to the reading antennas 511, 521, and 531 that do not perform reading.

The read-restriction antennas 512, 522, and 532 have a loop shape that encloses the corresponding read area, and have switches 521s, 522s, and 532s that close or open the loop. The read-restriction control device 562 opens and closes the switches 521s, 522s, and 532s. The read-restriction antennas 512, 522, and 532 function to restrict reading when the switches 521s, 522s, and 532s are closed to form a closed loop (short-circuited), and do not restrict reading when the switches 521s, 522s, and 532s are opened to open the loop.

Figure 55:
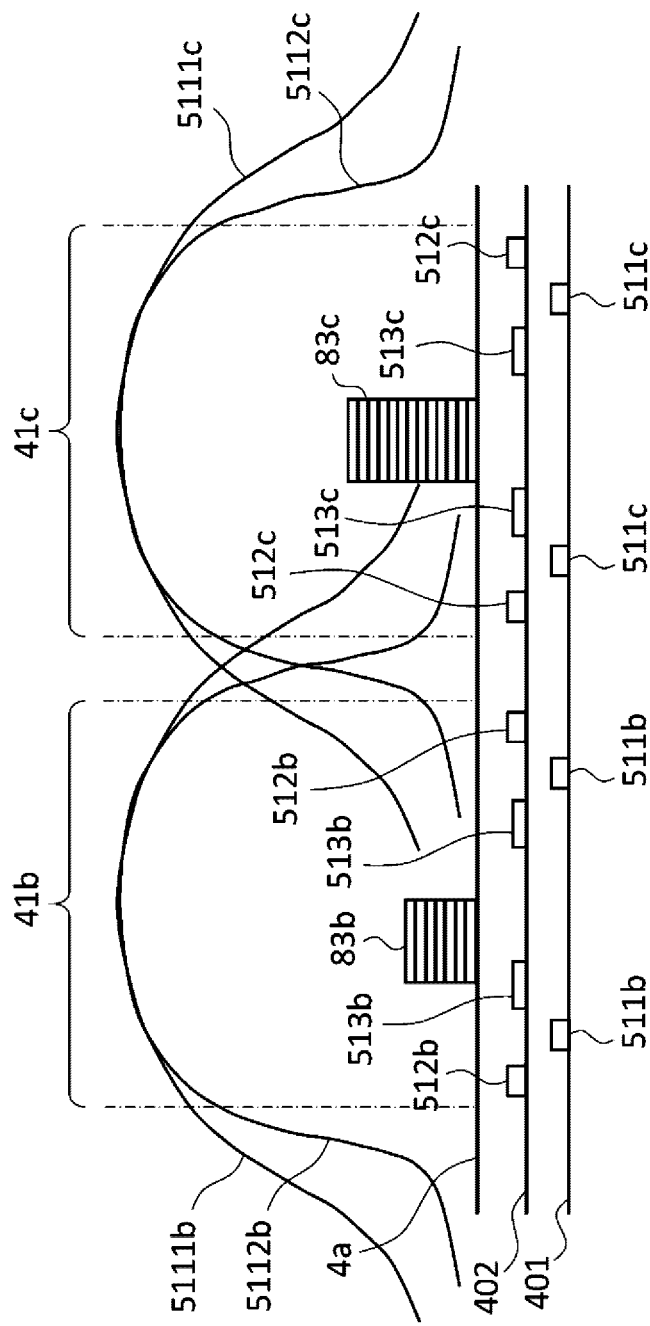
FIG. 55 is a cross-section of the betting area, the reading area of the sixth embodiment of the present disclosure.

FIG. 55 is a cross-section of the read areas, betting area 41b and 41c. Underneath the surface 6004a of the table 6004 is a substrate 401 for distributing the reading antennas 511 and 521, and a substrate 402 for distributing the read-restriction antennas 512 and 522, which are stacked on top of each other. In this embodiment, the substrate 401 is provided below the substrate 402, but the order of installation can be changed as necessary. The vertical distance between the reading antennas 511, 521 and the read-restriction antennas 521, 522 is set appropriately based on the strength of the electromagnetic waves, the shapes of the reading antennas 511, 521 and the read-restriction antennas 521, 522, and the like. Alternatively, the reading antennas 511, 521 and the read-restriction antennas 512, 522 may be provided on the same substrate.

When reading is being performed for read area 41b, in read area 41c adjacent to read area 41b, the switch 512s of read-restriction antenna 512c is closed and a closed loop is formed. In the read-restriction antenna 512c, an electromagnetic field for restriction (for obstruction) is formed by the induced electromotive force of the electromagnetic field formed by the reading antenna 511b of the adjacent read area 41b, and the electromagnetic field of the reading antenna 511b is shaped by this electromagnetic field for restriction, and the reading antenna 511b restricts (obstructs) the reading of the game tokens 83c placed in the adjacent read area 41c. The game tokens 83b placed in the read area 41b corresponding to the energized reading antenna 41b is read by the reading antenna 41b.

FIG. 55 shows the intensity distribution 5111b of the electromagnetic field generated by the reading antenna 511b for reading the betting area 41b and the intensity distribution 5111c of the electromagnetic field generated by the read-restriction antenna 511c when reading the betting area 41b. FIG. 55 also shows the intensity distribution 5112b of the electromagnetic field generated by the reading antenna 511b when the electromagnetic field is weakened by the electromagnetic field generated in the adjacent betting area 41c by the read-restricted antenna 512c, and the intensity distribution 5112c of the electromagnetic field generated by the reading antenna 511c when the electromagnetic field is weakened by the electromagnetic field negated in the adjacent betting area 41c by the read-restriction antenna 512b.

As shown in FIG. 55, even when an electromagnetic field having an intensity distribution 5111b is generated by the reading antenna 511b to read the RFID tag 831 of the game tokens 83b in the betting area 41b, by closing the switch of the read-restriction antenna 512c of the adjacent betting area 41c, an induced current flows through the antenna 512, thereby generating an electromagnetic field for reading interference, and as a result, the electromagnetic field with intensity distribution 5111b generated by the reading antenna 511b is shaped to be sufficiently small and flattened in the adjacent betting area 41c, like the electromagnetic field with intensity distribution 5112b. This prevents the reading antenna 511b from reading the RFID tag 831 of the substitute coin 83c for the game in the betting area 41c.

Aluminum tapes 513b and 513c as shielding members or blocking means for blocking electromagnetic waves from adjacent read areas are attached to the substrate 402. The shielding member may be in a form other than tape, such as a plate, film, sheet, coating film, foil, or the like. The material of the shielding member may be other than aluminum, for example, it may be silver, gold, copper, nickel, or the like, or the material may be contain aluminum, silver, gold, copper, or nickel. Furthermore, the shielding member may be in the form of a mesh. In addition to the read-restriction antennas 512b and 512c, this shielding member can also restrict reading by the reading antennas in adjacent read areas.

In the example of FIG. 55, the shielding member was provided on the substrate 402 for distributing the read-restriction antennas 513 and 512c, but the shielding member may be provided on the substrate 401 for distributing the reading antennas 511 and 521. Alternatively, the shield member may be provided on the opposite side of the read-restriction antennas 512b and 512c in the substrate 402, or on the opposite side of the reading antennas 511b and 511c in the substrate 401. Alternatively, the shielding member may be provided on a different plane from the substrate 401 and the substrate 402.

The game table reading system 100 of this embodiment uses a database 57 to manage the game tokens 83. The database 57 associates and stores the information of the RFID tag embedded in the game token 83 with the predetermined related information. The management control device 56 updates the database 57 based on the relationship between the information of the RFID tag read by the reading antennas 511, 521, and 531 and the read area where the RFID tag was read, namely, the betting area 41, the pay area 42, and the chip tray 51. In this way, the management control device 56 updates the database 57 for managing the game token 83 according to the information of the RFID tags of the game token 83 read at each read area of the game table 6004.

Figure 56:
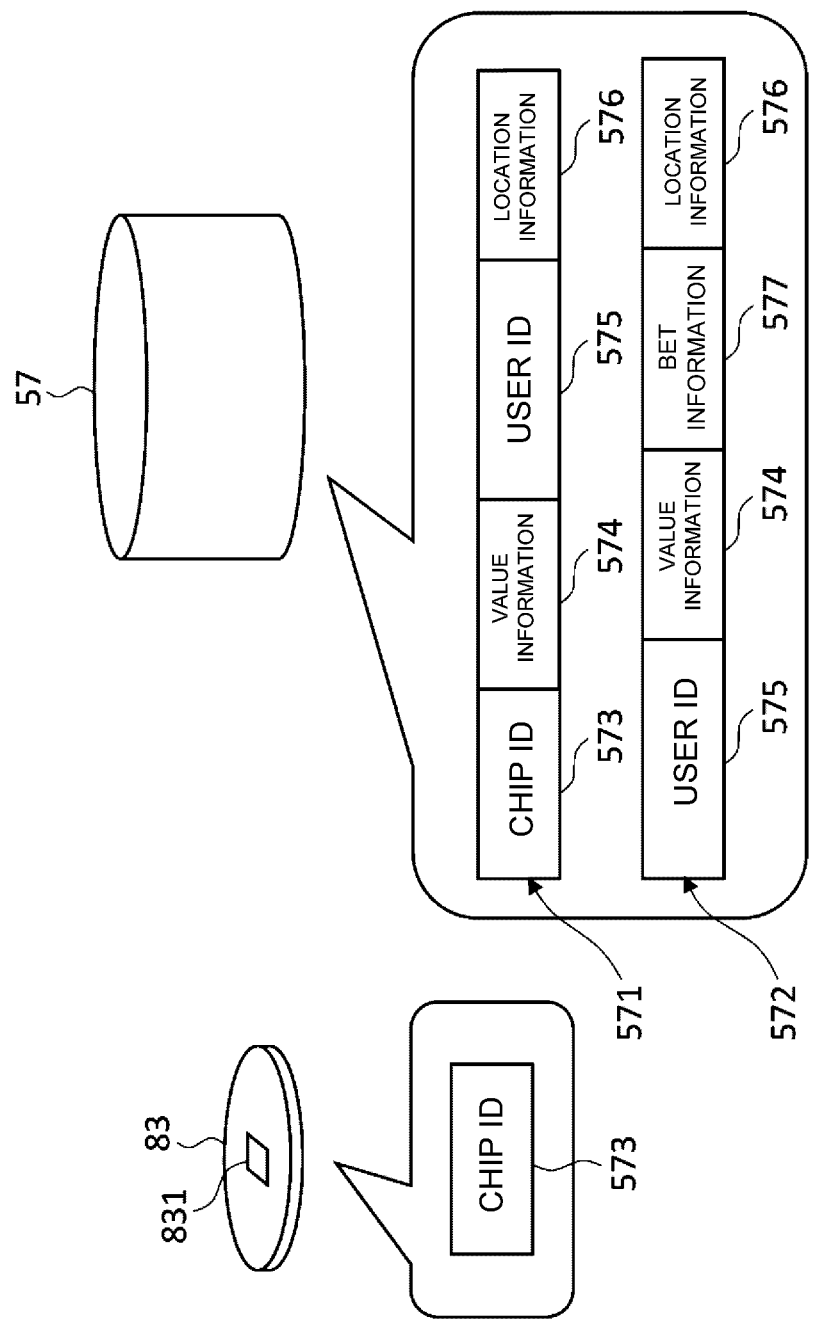
FIG. 56 shows the game token and the data structure of the database of the sixth embodiment of the present disclosure.

The management of the game token 83 by the database 57 will be described below. FIG. 56 shows the data structure of the game token 83 and database 57. As described above, the game token 83 has a built-in RFID tag 831. The database 57 has two types of tables, including a chip management table 571 for managing the game tokens 83 and a user management table 572 for managing users.

The chip ID 573 is associated with the value information 574 of the game token 83, the user identification information (user ID) 575 that uniquely identifies the user holding the game token, and the location information 576 that indicates the location of the game token 83. While the value information 574 does not change with respect to the chip ID 573, the user ID 575 and location information 576 associated with the chip ID 573 change as the game token 83 is used in the casino. Therefore, the database 57 may store a certain amount of past user ID and location information in addition to the latest user ID and location information for the chip ID 573, or only the latest user ID and location information may be stored.

In the user management table 572, for each user, for the user ID 575 of the user, the following information is associated as related information: the value information 574 of the game token owned by the user, the betting information 577 indicating the history of bets placed by the user in the game, and the location information 577 indicating the location of the user. The value information 574, bet information 577, and location information 576 associated with the user ID 575 change as the game token 83 is used in the casino. Therefore, the database 57 may store certain historical value information, bet information, and location information in addition to the latest value information, bet information, and location information for the user ID 575, or it may store only the latest value information, bet information, and location information.

The game table reading system 100 manages the game token 83 by updating the chip management table 571 and the user management table 572 in the database 57 based on the information of the RFID tag 831 read by the reading antenna. Any of the methods described in the above embodiment can be adopted for the specific method of managing the game token 83 using the database 57. In the following, the management of the game token 83 in this embodiment will be described, including explanations that overlap with those described above.

In the following description, the management control device 56 updates the database 57, wherein the management control device 56 updates the database according to the information on the RFID tag 831 read by each reading antenna and the status of the game when it is read. The management control device 56 obtains information on the status of the game (in game, betting, settlement, pausing, etc.) from the card distribution device 58 in this embodiment.

First, the management control device 56 updates the chip management table 571 in the database 57 so that the user ID of the user who won the game is associated with the chip ID of the game token 83 that is paid out to the user who won the game. In addition, the management control device 56 updates the chip management table 571 in the database 57 so that the user ID assigned to the dealer is associated with the chip ID of the game token 83 bet by the user who lost the game. In this way, even if the holder of the game token 83 changes as the game token 83 is used in a game, the game token held by each user can be identified by referring to the database 57.

The management control device 56 updates the database 57 so as to associate the chip ID of the game token 83 read at the pay area 42 with the user ID of the user playing at the play position corresponding to the pay area 42. The user IDs of the users playing at each play position can be identified by the player identification system 55 in accordance with the form described above.

The management control system 56 specifically records, in the chip management table 571 of the database 57, the user ID of the user in the play position of the pay area 42 in question for the record of the chip ID of the game token 83 read in the pay area 42. By updating the database 57 in this way, the change of holder from dealer to user due to payout can be reflected in the database 57.

The management control device 56 updates the user management table 572 so that the value of the game token 83 that is paid out to the user who won the game is added to the value information 574 associated with the user ID 575 of the user who won the game, and the value of the game token 83 that is collected from the user who lost the game is subtracted from the value information 574 associated with the user ID 575 of the user who lost the game. By updating the database 57 in this way, the value of the game token 83 possessed by each user, that is, the amount of value possessed, can be managed in the database 57.

In addition, when the chip ID of the game token 83 to be paid out is read in the pay area 42, the management control device 56 updates the database 57 so that the chip ID of the game token 83 to be paid out is associated with the user ID associated with the game token 83 bet in the betting area 41 corresponding to the pay area 42.

Alternatively, the management control device 56 updates the database 57 so that when the chip ID of the game token 83 to be paid out is read in the betting area 41, the user ID associated with the game token 83 bet in the betting area 41 is associated with the chip ID of the game token 83 to be paid out. This allows the database 57 to be updated so that the holder of the bet game token 83 and the holder of the game token 83 paid out to the bet game token 83 are the same.

In addition, when all the play positions are used and there is a player who places a back bet, that is, when multiple players are betting on one play position, the management control device 56 manages the game tokens 83 in the following manner. That is, if the player identification system 55 is able to identify the user IDs of both of the two users who are simultaneously in the same play position, the management control device 56 manages the game token 83 for each user in the same manner as described above. If the user ID of one of the two users playing at the same time in the same play position is identified and the user identification information of the other one cannot be identified, the dealer pays out according to the operation rule that the payout is made first to the player whose user ID is identified. The management control device 56 updates the database 57 so as to associate the chip ID of the game token 83 that is paid out to that play position first with the user ID identified by the player identification system 55. The management control device 56 associates "unknown" as the user ID with the chip ID of the game token 83 that is paid out later.

The reading antenna and the reading control device 561 for reading the RFID tag 831 embedded in the game token 83 may be installed at various locations in the casino facility. In this case, the reading control devices 561 may be provided at each location within the casino facility, and the management control device 56 may be in communication with a plurality of those reading control devices 561. As described above, from the reading control device 561, the antenna ID of the reading antenna or the reader ID of the reading control device 561 is transmitted to the management control device 56 along with the information of the RFID tag 831 read by the reading antenna. The management control device 56 has a table in which each antenna ID or each reader ID is associated with information on the location of the corresponding reading antenna (location information, e.g., cage number, table number, chip tray number, gate number, etc. for identifying cages, tables, chip trays, gates, etc.).

When the management control device 56 receives the antenna ID (or reader ID) along with the read chip ID from the reading control device 561, it updates the location information 474 associated with the chip ID in the chip management table 571 of the database 57 accordingly. In addition, the management control device 56 updates the location information 576 associated with the chip ID in the user management table 572 in the same way.

As a result, by referring to the database 57, it is possible to know where each game token 83 is located and where each user is located. In addition, by storing past information as location information in the chip management table 571 and the user management table 572, it is possible to know the history of the movement of the game token 83 and the user.

In addition, the management control device 56 obtains the information of the user ID of the user playing there for each play position from the player identification system 55, and when the game token 83 is placed in the betting area 41 during betting and the bet is placed, the management control device 56 obtains the chip ID, which is the information of the RIFD tag. The management control device 56 uses this user ID and chip ID to update the user management table 572 in the database 57. Specifically, the management control device 56 obtains the value information 574 of the acquired chip ID 573 by referring to the chip management table 571, and adds the value of the value information 574 to the betting information of the acquired user ID in the user management table 572.

In this manner, the management control device 56 updates the database 57 so as to add the value of the game token 83 read by the reading antenna 511 in the betting area 41 to the betting information 577 associated with the user ID 575 of the user identified for the play position corresponding to the reading antenna 511. By updating the database 57 in this manner, the value of the game token 83 that has been bet, i.e., the bet amount, can be managed in the database 57 for each user. The bet amount may be managed as a corresponding incentive point.

The information stored in the RFID tag 831 of the game token 83, i.e., the chip ID 573, is also used to determine the authenticity of the game token 83. When the reading antenna reads the information on the RFID tag 831, the management control device 56 checks the information in the database 57 and determines that the game token 83 is defective or fraudulent if the information is not in the database 57, that is, if the check is unsuccessful. If the management control device 56 determines that the game token 83 is defective or fraudulent, it outputs a warning. In this way, a warning can be output when an illegal game token 83 is used at the game table 6004. The output warning may be output in real time (i.e., at the timing when a defect or fraud is determined) in a form that can be perceived visually or audibly, or it may be recorded in a recording device together with information on the situation (table number, date and time, etc.) when the fraud or defect occurred.

Figure 57:
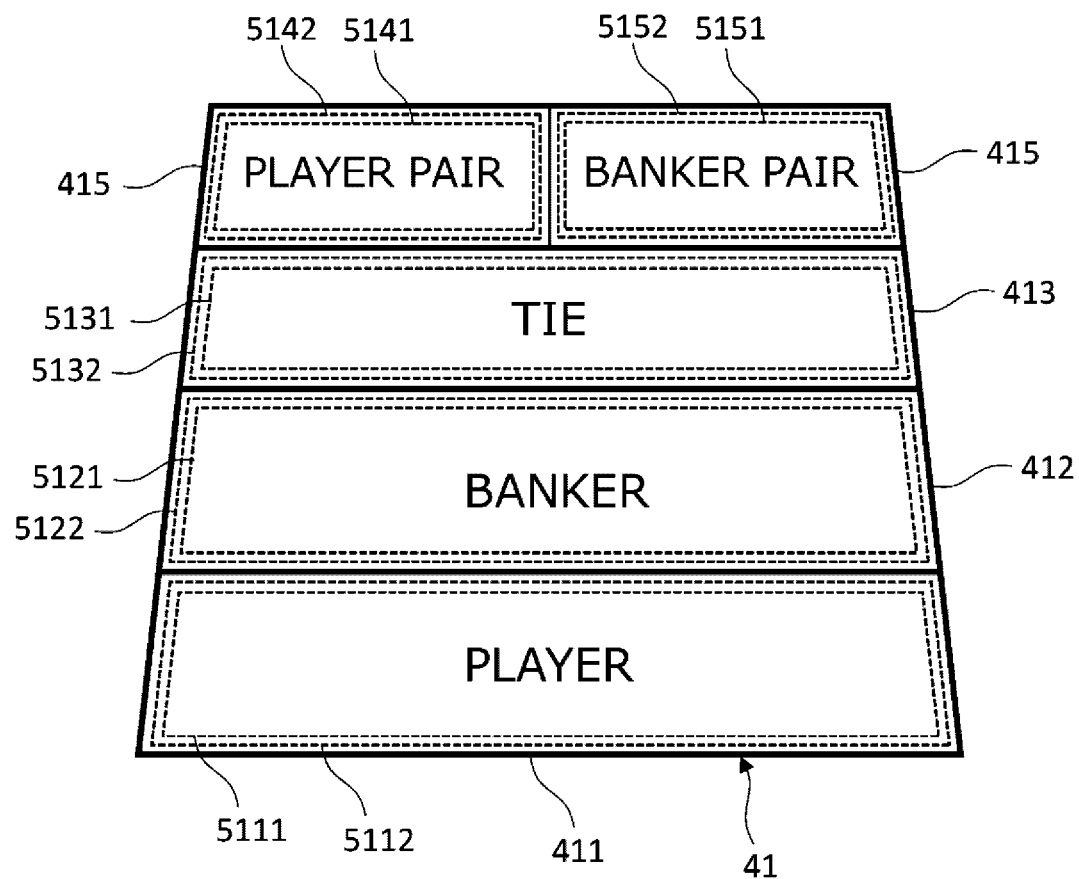
FIG. 57 shows another example of the reading antenna and the read-restriction antenna of the sixth embodiment of the present disclosure.

FIG. 57 shows another example of a reading antenna and a read-restriction antenna. In this example, a reading antenna is provided for each player position and for each betting target, i.e., for each player, banker, and side bets such as ties and pairs. As shown in FIG. 57, each betting area 41 has a plurality of betting target areas, including a player area 411 a banker area 412, and side bet areas including a tie area 413, a player pair area 414, and a banker pair area 415, which are located in close proximity to each play position.

The betting target areas, each of which is a read area, are provided with a reading antenna and a read-restriction antenna, which allows each betting target area to be read separately. In other words, the player area 411 is equipped with a reading antenna 5111 and a read-restriction antenna 5112, the banker area 412 is equipped with a reading antenna 5121 and a read-restriction antenna 5122, the tie area 413 is equipped with a reading antenna 5131 and a read-restriction antenna 5132, the player pair area 414 is equipped with a reading antenna 5131 and a read-restriction antenna 5142, and the bunker pair area 415 is provided with a reading antenna 5151 and a read-restriction antenna 5152.

In this way, each betting target area in each play position is provided as a separate read area and a reading antenna is provided for each of them, so that it can be determined to which betting target the player has bet the game token 83 in each play position. Thus, in this example, even if multiple read areas are crowded as shown in FIG. 57, the game table reading system 100 can read the RFID tag 831 for each of those read areas. The management control device 56 can determine which player in which play position won the game, i.e., which play position should be paid out, based on the information on the game outcome at the card distribution device 58 and the betting targets obtained from each play position. If the result of this determination and the actual payout do not match, the management control device 56 can detect this and output a warning.

Figure 58:
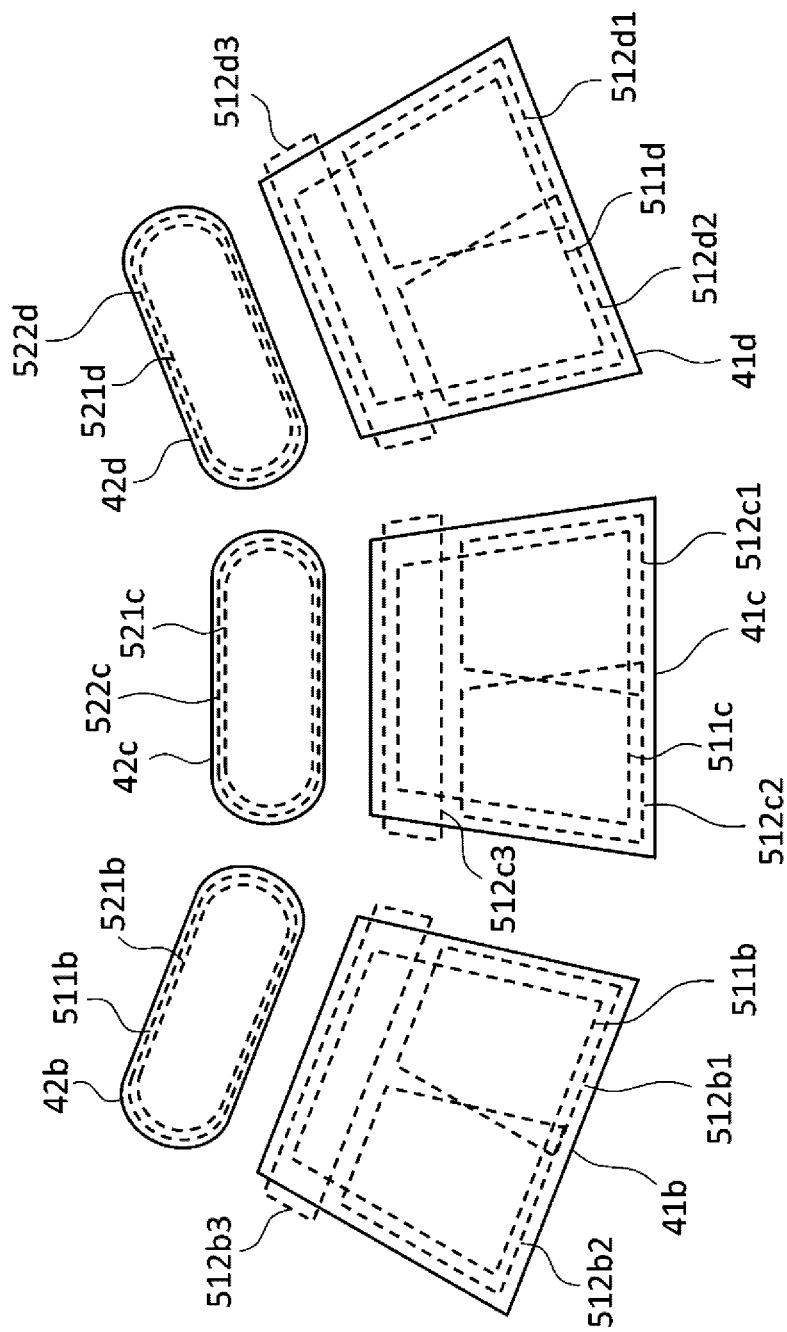
FIG. 58 shows another example of the read-restriction antenna of the sixth embodiment of the present disclosure.

FIG. 58 shows another example of a read-restriction antenna. In FIG. 58, only the betting areas 41*b*, 41*c*, 41*d* and their corresponding pay areas 42*b*, 42*c*, 42*d* are shown. In this example, there are multiple read-restriction antennas in one read area, the bet area. These multiple read-restriction antennas each shape the electromagnetic field generated by the reading antennas of a plurality of other adjacent read areas, respectively.

Specifically, for example, in the read area, betting area 41*c*, three read-restriction antennas 512*c*1, 512*c*2, and 512*c*3 are provided in addition to the reading antenna 511*c* that reads the entire betting area 41*c*. The read-restriction antenna 512*c*1 prevents the RFID tag 831 of the game token 83 placed in the betting area 41*c* from being read by the reading antenna 511*d* of the betting area 41*d* adjacent to the right side. The read-restriction antenna 512*c*2 prevents the RFID tag 831 of the game token 83 placed in the betting area 41*c* from being read by the reading antenna 511*b* of the betting area 41*b* adjacent to the left side. The read-restriction antenna 512*c*3 prevents the RFID tag 831 of the game token 83 placed in the betting area 41*c* from being read by the reading antenna 521*c* of the pay area 42*c* adjacent to the upper side.

When the reading control device 561 controls the reading antenna 511*d* to read the betting area 41*d*, the read-restriction control device 562 closes the switch of the read-restriction antenna 512*c*1 of the betting area 41*c* to cause the read-restriction antenna 512*c*1 to generate electromagnetic waves for obstructing the reading antenna 511*b* from reading the RFID tags 831 in the betting area 41*c*. When the reading control device 561 controls the reading antenna 511*b* to read the betting area 41*b*, the read-restriction control device 562 closes the switch of the read-restriction antenna 512*c*2 of the betting area 41*c* to cause the read-restriction antenna 512*c*2 to generate electromagnetic waves for obstructing the reading antenna 511*b* from reading the RFID tags 831 in the betting area 41*c*. When the reading control device 561 controls the reading antenna 511*c* to read the betting area 41c, the read-restriction control device 562 closes the switch of the read-restriction antenna 512c3 of the betting area 41c to cause the read-restriction antenna 512c3 to generate electromagnetic waves for obstructing the reading antenna 511c from reading the RFID tags 831 in the betting area 41c.

In this way, the read-restriction control device 562 closes the switches of the corresponding read-restriction antennas to generate disturbing electromagnetic waves in synchronization with the reading control device 561 driving the reading antennas in sequence to read.

As described above, according to the game table reading system 100, even when a plurality of read areas are set at relatively close intervals from each other on the game table 6004, it is possible to determine which read area those RFID tags 831 are in. Specifically, even when the plurality of betting areas are set at close distances from each other, the provision of a read-restriction antenna in each betting area 41 can prevent the reading antenna from reading RFID tags 831 in neighboring betting areas 41 and pay areas 42. Also, when a pay area 42 is provided corresponding to each of the plurality of betting areas 41 and a reading antenna is provided there, it is possible to prevent the reading of RFID tags 831 of neighboring pay areas 42 and betting areas 41.

In the sixth embodiment described above, the read-restriction antennas 512, 522, and 532 generated an electromagnetic field to interfere with the reading of the corresponding read area by the induced current by the electromagnetic field generated by the reading antennas 511, 521, and 531 of the adjacent read area. However, instead, the electromagnetic field for interference may be generated by applying an electric current from the read-restriction control device 562. In this case, too, the read-restriction antennas 512, 522, and 532 may be provided with switches to open their loops, and controlled to open their switches to open the loops when the reading antennas 511, 521, and 531 installed in the same read area perform reading.

EXPLANATION OF REFERENCE

41 Betting area
42 Pay area
51 Chip tray
52 Camera
53 Card reader
56 Management control unit
57 Database
58 Card distribution device
81 Member's card
82 Player
83 Substitute currency for games
91 Dealers
100 Game table reading system
511, 521, 531 Reading antennas
512, 522, 532 Read-restriction antenna
561 Reading control device
562 Read-restriction control device
831 RFID tag
6004 Game table

The invention claimed is:

1. A game table reading system, comprising:
 a game table on which one or more areas are laid out, each area of the one or more areas:
  is associated with a different player position of one or more player positions,
  is defined by a visible perimeter on the game table, and
  includes a plurality of sub-areas arranged in a stack of rows, wherein at least one row of the stack of rows includes multiple sub-areas;
 a plurality of reading antennas installed corresponding to each of the one or more areas, and, for each area of the plurality of areas, the plurality of reading antennas are configured to read radio-frequency identification (RFID) tags embedded in game tokens placed in each of the plurality of sub-areas of the area;
 a read-restriction antenna configured to restrict, for a reading antenna of the plurality of reading antennas of an area of the one or more areas, readings by the reading antenna so that the reading antenna does not read the RFID tags of the game tokens in sub-areas other than the sub-area corresponding to the reading antenna; and
 a management control device configured to, when the RFID tag is read by the reading antenna, identify a position where the game token whose RFID tag is read is placed according to the sub-area to which the reading antenna corresponds.

2. The game table reading system according to claim 1, wherein each area of the one or more areas has the plurality of sub-areas where each sub-area of the plurality of sub-areas is substantially the same shape.

3. The game table reading system according to claim 1, further comprising a plurality of the read-restriction antennas including the read-restriction antenna, each read-restriction antenna installed corresponding to a different sub-area of the area.

4. The game table reading system according to claim 1, wherein the plurality of sub-areas are betting target areas.

5. The game table reading system according to claim 1, further comprising:
 a database in which information of the RFID tag and related information are stored in association with each other; and
 a management control device configured to update the database based on a relationship between information of the RFID tag read by the reading antenna and the reading area where the RFID tag was read.

6. The game table reading system according to claim 5, wherein:
 the information on the RFID tag includes chip identification information of the game token,
 the related information includes user identification information of a user in possession of the game token, and
 the management control device is configured to update the database so that the chip identification information of the game token, which is paid out to the user who wins the game, is associated with the user identification information of the user who won the game.

7. The game table reading system according to claim 6, wherein the management control device is configured to update the database so that, when the chip identification information of the game token to be paid out is read in the sub-area, the chip identification information of the game token to be paid out is associated with the user identification information associated with the game token bet in the sub-area.

8. The game table reading system according to claim 5, wherein:
 the information on the RFID tag includes information for determining authenticity of the game token, and
 the game table reading system is configured to refer to the database to match the information for determining authenticity read by the reading antenna, and outputs a warning when the matching is unsuccessful.

9. The game table reading system according to claim 1, further comprising a shielding member configured to shape an electromagnetic field generated by the reading antenna so that the electromagnetic field weakens outside the reading area corresponding to the reading antenna.

10. The game table reading system according to claim 9, wherein the shielding member is a plate, tape, film, coating film, or sheet, the shielding member including aluminum, silver, copper, gold, or nickel.

11. The game table reading system according to claim 9, wherein the shielding member is provided in the same plane as the reading antenna.

12. The game table reading system according to claim 9, wherein the shield member is provided in the same plane as the read-restriction antenna.

13. The game table reading system according to claim 9, wherein the shielding member is configured to shape the electromagnetic field generated by the reading antenna so that the electromagnetic field flattens outside the reading area corresponding to the reading antenna.

14. The game table reading system according to claim 9, the game table comprises a plurality of read-restriction antennas corresponding to one read area to shape the electromagnetic field generated by a plurality of reading antennas each corresponding to a plurality of other read areas adjacent to the one read area.

15. The game table reading system according to claim 1, wherein the plurality of sub-areas are betting target areas for baccarat.

16. The game table reading system according to claim 1, wherein each area of the one or more areas includes a single sub-area of the plurality of sub-areas that is defined by a sub-area perimeter that includes at least a portion of three sides of the visible perimeter that defines the area.

17. The game table reading system according to claim 1, wherein each area of the one or more areas includes a single sub-area of the plurality of sub-areas that is defined by a sub-area perimeter that includes at least a portion of on two adjacent sides of the visible perimeter that defines the area.

18. The game table reading system according to claim 1, wherein each area of the one or more areas includes at least one sub-area of the plurality of sub-areas that has two adjacent sides that each touch a different sub-area of the plurality of sub-areas.

* * * * *